US010508743B2

(12) United States Patent
Wakayama et al.

(10) Patent No.: US 10,508,743 B2
(45) Date of Patent: Dec. 17, 2019

(54) FLOW RATE CONTROL DEVICE AND VEHICLE

(71) Applicant: Nidec Copal Corporation, Tokyo (JP)

(72) Inventors: Tomihiro Wakayama, Tokyo (JP); Tomonori Shinozaki, Tokyo (JP); Kenichi Watabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 119 days.

(21) Appl. No.: 15/514,896

(22) PCT Filed: Sep. 28, 2015

(86) PCT No.: PCT/JP2015/077252

§ 371 (c)(1),
(2) Date: Mar. 28, 2017

(87) PCT Pub. No.: WO2016/052372

PCT Pub. Date: Apr. 7, 2016

(65) Prior Publication Data

US 2017/0211707 A1 Jul. 27, 2017

(30) Foreign Application Priority Data

Sep. 30, 2014 (JP) ................................ 2014-201985
Sep. 30, 2014 (JP) ................................ 2014-201986
(Continued)

(51) Int. Cl.
*F16K 3/03* (2006.01)
*F02D 9/02* (2006.01)
*F02D 9/14* (2006.01)

(52) U.S. Cl.
CPC ................. *F16K 3/03* (2013.01); *F02D 9/02* (2013.01); *F02D 9/14* (2013.01)

(58) Field of Classification Search
CPC ..... F16K 3/03; F02K 1/11; F02D 9/02; F02D 9/14; G03B 9/06; G03B 9/22
(Continued)

(56) References Cited

U.S. PATENT DOCUMENTS 3,127,786 A * 4/1964 Wooley .................. F16K 21/04 251/253
3,787,022 A 1/1974 Wilcox
(Continued)

FOREIGN PATENT DOCUMENTS

DE 3147640 A1 9/1982
JP S57137773 A 8/1982
(Continued)

OTHER PUBLICATIONS

International Search Report (English and Japanese) and PCT Written Opinion (Japanese) dated Dec. 28, 2015 issued in corresponding PCT International Application No. PCT/JP2015/077252.

*Primary Examiner* — Michael R Reid
(74) *Attorney, Agent, or Firm* — Troutman Sanders LLP

(57) ABSTRACT

The flow rate controlling device according to the present invention comprises: a base that has an opening portion a ring member that is provided encompassing the opening portion and that can rotate around the opening portion a motor for rotating the ring member, and a plurality of blade members that are supported on the base to the outside of the opening portion in the radial direction, and that can rotate around rotary shafts that are parallel to the axis of the opening portion, wherein: groove portions are formed in the ring member; protruding portions that can slide within the groove portions are formed on the blade members; and the motor rotates the ring member to slide the protruding portions within the groove portions to rotate the plurality of blade members to open and close the opening portion.

17 Claims, 54 Drawing Sheets

(30) Foreign Application Priority Data

| | | |
|---|---|---|
| Dec. 26, 2014 | (JP) | 2014-265934 |
| Dec. 26, 2014 | (JP) | 2014-266255 |
| Jun. 26, 2015 | (JP) | 2015-129231 |
| Aug. 4, 2015 | (JP) | 2015-154530 |

(58) Field of Classification Search
USPC .......................................................... 251/212
See application file for complete search history.

(56) References Cited

U.S. PATENT DOCUMENTS

| | | | | |
|---|---|---|---|---|
| 4,513,948 | A | 4/1985 | Konig | |
| 4,893,225 | A * | 1/1990 | Solomon | F21V 9/40 362/293 |
| 6,375,155 | B1 * | 4/2002 | Janssens | F16L 55/10 251/212 |
| 8,316,820 | B1 | 11/2012 | Cammarata | |
| 8,430,140 | B2 * | 4/2013 | Ognjanovski | B60K 15/0406 141/350 |
| 8,910,920 | B1 * | 12/2014 | Daniels | F16K 3/03 123/188.1 |
| 2006/0112773 | A1 * | 6/2006 | Hedtke | F16K 3/03 73/861.61 |
| 2007/0116453 | A1 * | 5/2007 | Uchiyama | G03B 7/093 396/246 |
| 2008/0192326 | A1 * | 8/2008 | Mizumaki | G02B 5/005 359/234 |
| 2009/0114861 | A1 * | 5/2009 | Luebbers | F16K 3/03 251/129.11 |

FOREIGN PATENT DOCUMENTS

| | | | |
|---|---|---|---|
| JP | H0439470 | A | 2/1992 |
| JP | H0687842 | U | 12/1994 |
| JP | H09229208 | A | 9/1997 |
| JP | 2010112391 | A | 5/2010 |

* cited by examiner

FIG. 24 (a)
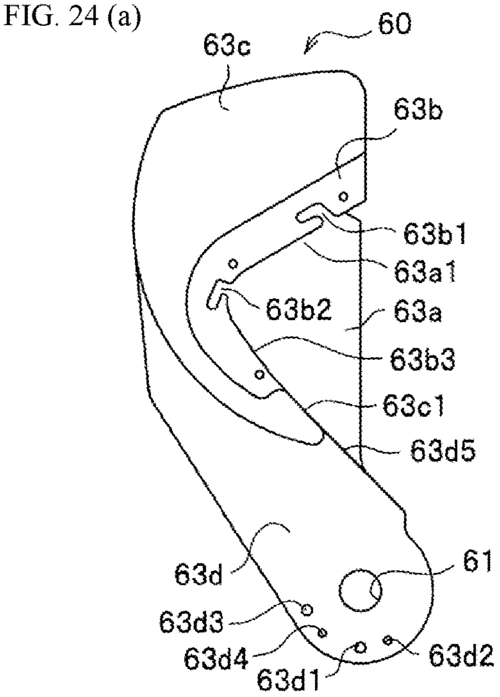
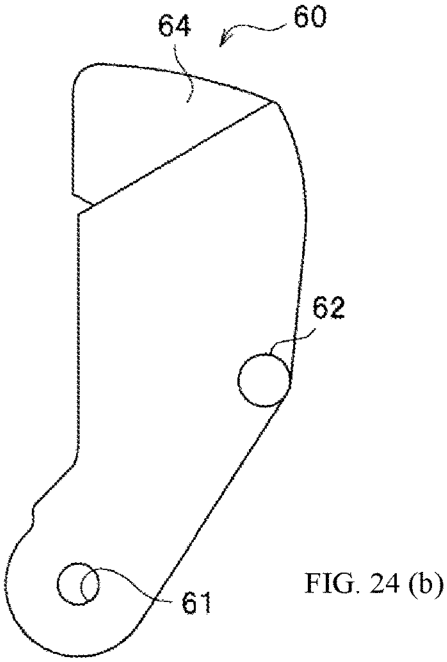
FIG. 24 (b)
FIG. 24 (c)
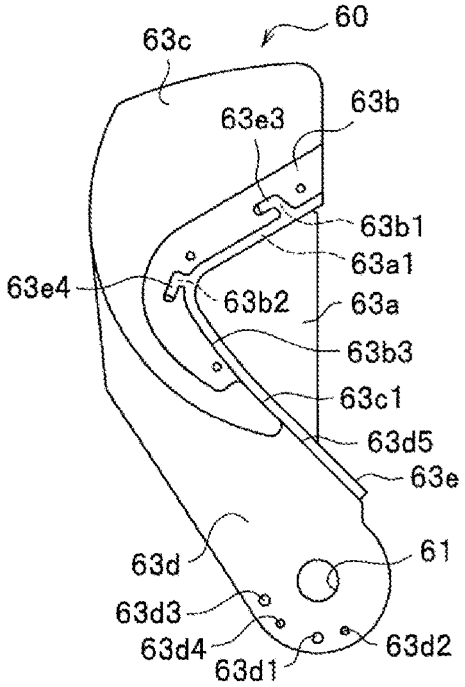

FLOW RATE CONTROL DEVICE AND VEHICLE

CROSS-REFERENCE TO RELATED APPLICATIONS

This is a U.S. national phase application under 35 U.S.C. § 371 of International Patent Application No. PCT/JP2015/077252, filed Sep. 28, 2015, and claims benefit of priority to Japanese Patent Application Nos. 2014-201985, filed Sep. 30, 2014, 2014-201986, filed Sep. 30, 2014, 2014-265934, filed Dec. 26, 2014, 2014-266255, filed Dec. 26, 2014, 2015-129231, Jun. 26, 2015, and 2015-154530, filed Aug. 4, 2015. The entire contents of these applications are hereby incorporated by reference.

FIELD OF TECHNOLOGY

The present invention relates to a flow rate controlling device for controlling a rate of flow of a fluid, and to a vehicle equipped with this flow rate controlling device.

BACKGROUND

Conventionally a butterfly valve has been known as a device to open and close a fluid flow path to control a flow rate (see, for example, Japanese Unexamined Patent Application Publication No. 2004-293452 and Japanese Unexamined Patent Application Publication No. 2010-106738). The butterfly valve controls the flow rate of the fluid through the orientation of a valve unit by opening and closing a flow path through rotating the valve unit, which is shaped as a disk that is provided in the flow path, around an axis that is perpendicular to the flow path.

Conventionally, as a flow rate controlling device there has been a throttle device for an internal combustion engine as set forth in Japanese Unexamined Patent Application Publication No. 2004-293452, below.

FIG. 56 is a lateral sectional view of the vicinity of a conventional throttle valve of a throttle device for an internal combustion engine as set forth in Japanese Unexamined Patent Application Publication No. 2004-293452.

In the throttle device for the internal combustion engine in Japanese Unexamined Patent Application Publication No. 2004-293452, a throttle valve 201 that is secured on a throttle shaft 202 is attached so as to be able to rotate within an air intake path that is formed within a bore inner tube 252 that has a circular cross-sectional shape, in a throttle body 205. A boss-shaped protruding portion 256 is provided in a center portion of the air intake path, where a fully closed stopper 207 and a fully opened stopper 208 are formed integrally at the two end surfaces of the boss-shaped protruding portion 256.

The air intake path is placed in the fully opened state by rotating the throttle valve 201 to contact the fully opened stopper 208 (referencing reference symbol 201 of the solid line in FIG. 56). On the other hand, the air intake path is placed in the fully closed state by rotating the throttle valve 201 to contact the fully closed stopper 207 (referencing reference symbol 201 of the dotted line in FIG. 56).

SUMMARY OF THE INVENTION

The throttle device for the internal combustion engine set forth the Japanese Unexamined Patent Application Publication No. 2004-293452 is provided with a throttle valve 201, a throttle shaft 202, and a boss-shaped protruding portion 256 that has a fully closed stopper 207 and a fully opened stopper 208, in a suction duct that is formed within a bore inner tube 252. Because of this, even when the air intake path is in the fully opened state (reference symbol 201 of the solid line in FIG. 56), there will still remain a member that causes resistance in the center of the air intake path.

Consequently, this produces resistance in the air that flows in the air intake path, producing a loss of suction. Because of this, this may have an adverse effect when the engine is producing the prescribed performance.

The throttle device of the internal combustion engine set forth in Japanese Unexamined Patent Application Publication No. 2010-106738 is structured similarly to that of Japanese Unexamined Patent Application Publication No. 2004-293452.

In this butterfly valve, the valve unit, and the like, is always located within the flow path, and thus there is a problem in that this will produce loss when in the fully opened state.

There is also a problem in the fully closed state in that it is not possible to control the flow rate accurately, because the flow will not be completely cut off, due to a gap that is produced with the flow rate path by, for example, the valve unit, rather than being completely cut off.

Moreover, because a valve unit is exposed to high pressures within the flow path, there is the need for durability. Additionally, the operation of the valve unit within the high pressure within the flow path must be smooth, and, additionally, the operation must be stable, unaffected by the fluid pressure.

Moreover, it is necessary to detect malfunctions of the valve unit accurately. If the operation of the valve unit cannot be detected accurately, then the operation will continue when proper operation cannot be detected. Moreover, if this valve were applied to a detecting device, manufacturing will continue even when there is a problem (even when there are defective products).

Note that accurately detecting malfunctions of valve units enables inspections of service lives of valves.

The present invention was created in contemplation of these situations, and the object is to provide a flow rate controlling device that is able to reduce the loss when fully opened, and a vehicle that is equipped with this flow rate controlling device.

Another object is to provide a flow rate controlling device that is able to improve the performance in cutting off the flow path in a fully closed state, and to provide a vehicle equipped with this flow rate controlling device.

In order to solve these problems, the example flow rate controlling device is a flow rate controlling device, provided in a pipe, for controlling a flow rate of a fluid that flows through said pipe, comprising: a base, having an opening portion through which the fluid can flow; a ring member, provided encompassing the opening portion, when viewed from the direction of flow of the fluid, able to rotate around the opening portion; a motor for rotating the ring member; and a plurality of blade members, supported on the base to the outside of the opening portion, in the radial direction, able to rotate around rotary shafts that are parallel to the axis of the opening portion, wherein: groove portions are formed in either the ring member or the blade members; protruding portions able to slide within the groove portions are formed in the other of the ring member and the blade members; and the motor rotates the ring member to cause the protruding portions to slide within the groove portions to cause the plurality of blade members to rotate to open and close the opening portion.

Given this structure, a plurality of blade members open and close an opening portion through rotating around rotation shafts that are parallel to the axis of the opening portion, reducing the cross-sectional area of the members located within the flow path when in a fully opened state, thereby enabling a reduction in the loss of the flow path. This also enables a miniaturization of the size (dimensions) of the flow rate controlling device in the direction through which the fluid flows, when compared to that of the conventional butterfly valve.

The structure may be one wherein: the plurality of blade members is positioned to the outside of the opening portion in the radial direction.

This structure enables the achievement of a fully opened state through the plurality of blade members, which are the valve unit, being retracted completely from the flow path.

The structure may be one wherein: a rib that forms a cylindrical shape is provided protruding from the base on the upstream side of the fluid, from around the opening portion; the ring member is provided encompassing the rib; and in the fully opened state, a portion of each of the plurality of blade members is positioned at a location overlapping the rib.

This structure enables prevention of the inner edges of the blade members contacting the outer peripheral surfaces of the ribs, due to the effects of the fluid, or the like, that would prevent the blade members from rotating in the closing direction, and, in a closed state, the blade members will be biased toward the tip end faces of the rib, by the fluid, thus enabling the amount of outflow of the fluid from the opening portion to be controlled suitably.

The structure may be one wherein: in the fully closed state, one of the blade members overlaps another of the blade members.

This structure enables the cross-sectional shape of the flow path to be set suitably when in a partially closed state, enabling the change in flow rate through opening and closing to be set suitably, such as linearly, and also enabling an increase in the performance of cutting off the flow path when in a fully closed state.

The structure may be one wherein: two thin-wall portions are formed in the blade member, where, in the fully closed state, thin-wall portions of two adjacent blade members overlap each other.

This structure enables an improvement in performance in cutting off the flow path when in a fully closed state, and enables the blades to be made thinner in the direction of the flow path.

The structure may be one wherein: an elastic member that contacts the thin-wall portion of the tip end of a blade member when in the fully closed state is provided on the thin-wall portion of the blade member.

This structure enables a further increase in the performance in cutting off the flow path in a fully closed state.

The structure may be one wherein: in the fully closed state, at least a portion between one blade member and another blade member is sealed by an elastic member.

This structure enables an improvement in the performance in sealing the flow path, and in cutting off the flow path, in a fully closed state.

An example flow rate controlling device is a flow rate controlling device, provided in a pipe, for controlling a flow rate of a fluid that flows through said pipe, comprising: a base, having an opening portion through which the fluid can flow; a plurality of blade members that can extend into and retract from the opening portion, supported rotatably on the base, outside of the opening portion in the radial direction; a ring member that is connected to the blade members and able to rotate around the opening portion; a motor for rotating the ring member; and a biasing member, attached to the base, for biasing the ring member to enable movement of the blade member in the direction in which the fluid flows.

Given this structure, a plurality of blade members open and close an opening portion through rotating around rotation shafts that are parallel to the axis of the opening portion, reducing the cross-sectional area of the members located within the flow path when in a fully opened state, thereby enabling a reduction in the loss of the flow path. This also enables a miniaturization of the size of the flow rate controlling device in the direction through which the fluid flows, when compared to that of the conventional butterfly valve. Moreover, because a biasing member is provided so as to enable the blade members to move in the direction in which the fluid flows, this can improve the performance in cutting off the flow path when in a fully closed state.

The structure may be one wherein: the biasing member is attached to a rotary shaft of a blade member, which is attached to the base.

This structure enables miniaturization of the device as a whole through attaching a spring to the rotary shaft.

The structure may be one wherein: groove portions are formed in either the ring member or the blade members; protruding portions able to slide within the groove portions are formed in the other of the ring member and the blade members; and in the protruding portion, the location of contact with the groove portion has at least an essentially spherical shape.

In this structure, the protruding portion has at least a spherical shape in the location that makes contact with the groove portion, enabling a stabilized and smooth operation of the blade members through the state of contact of the protruding portion with the groove portion not changing, regardless of the orientation of the blade members.

The structure may be one wherein: groove portions are formed in either the ring member or the blade members; protruding portions able to slide within the groove portions are formed in the other of the ring member and the blade members; and in the protruding portion, the location of contact with the groove portion has a shape that has essentially the same curvature.

In this structure, the protruding portion is of a shape that has a curvature that is essentially the same as the location that makes contact with the groove portion, enabling a stabilized and smooth operation of the blade members through the state of contact of the protruding portion with the groove portion not changing, regardless of the orientation of the blade members.

Groove portions maybe formed in either the ring member or the blade members; protruding portions able to slide within the groove portions may be formed in the other of the ring member and the blade members; and in the protruding portion, the location of contact with the groove portion may have a shape that has curvature.

In this structure, the protruding portion is of a shape that has a curvature that is the same as the location that makes contact with the groove portion, enabling a stabilized and smooth operation of the blade members through the state of contact of the protruding portion with the groove portion not changing, regardless of the orientation of the blade members.

First detecting means for detecting respective positions of the individual blade members and second position detecting means for detecting a position of the ring member may be provided.

This structure enables detection of whether or not each blade member is operating properly.

The first position detecting means have position adjusting means for adjusting a position that is detected in the fully closed state may be provided.

This structure enables detection of the position wherein the blade members are reliably in a fully closed state.

The first position detecting means may detect a fully opened state, a fully closed state, and an intermediate state between the fully opened state in the fully closed state, of the blade member; and the second position detecting means may detect a position of the ring member when the blade members are in a fully opened state, and a position of the ring member when the blade members are in a fully closed state.

This structure enables reliable detection of whether or not the individual blade members operate properly between the fully opened state and the fully closed state.

The first position detecting means may comprise: a position detected portion, provided on a blade member, having a light-blocking portion that blocks light and a light-passing portion that passes light; and a sensor for detecting the light-blocking portion and the light-passing portion (for example, a sensor for detecting light or magnetism).

This structure enables the movements of the blade members to be ascertained clearly using sensors.

An elastic member, provided on the blade member, for deforming elastically when the blade members are fully closed, for blocking a space between the blade members may be provided, wherein the elastic member may have a shape so as to engage with the blade member.

This structure enables prevention of the elastic members from coming out of the blade members, through a shape that engages with the blade members.

Securing means may be provided for covering a length-direction end portion of the elastic member.

This structure enables reliable prevention of the elastic members from coming out of the blade members, through retention of the elastic members by the first retaining member and the second retaining member.

The plurality of blade members may be provided overlapping in a plurality of layers.

This structure enables miniaturization of the flow rate controlling device through enabling the blade members to be made smaller, through the provision of a plurality of blade members stacked in a plurality of layers.

Deformable sealing means may be provided for sealing a gap between the blade members, through elastic deformation through the full closure when the plurality of blade members is fully closed.

This structure improves the tightness of the seal when fully closed, through the provision of deformable sealing means for sealing the gaps between the blade members when fully closed, through elastic deformation through the closure.

Movable sealing means may be provided for sealing between overlapping blade members for sealing a space between overlapping adjacent blade members where the plurality of blade members is fully closed and for moving further to the outside than the position when fully closed when the plurality of blade members is not fully closed.

This structure improves the degree of sealing when fully closed.

Blade member rotation operation detecting means may be provided for detecting a rotation operation of the blade member.

This structure improves reliability and maintainability of the flow rate controlling device through enabling detection of whether or not the blade members are operating properly.

An example flow rate controlling device is a flow rate controlling device, provided in a pipe, for controlling a flow rate of a fluid that flows through said pipe, comprising: a base member, having an opening portion through which the fluid flows; a plurality of blade members, supported movably on the outside of the opening portion of the base member, able to move from the inside of the opening portion to the outside, or from the outside to the inside, to open and close the opening portion; and moving means for moving the plurality of blade members.

In this structure, a plurality of blade members move from the inside to the outside of the opening portion, thus making it possible for the members to not exist in the flow path wherein the opening portion is formed. This enables a reduction in the loss in the flow path.

One blade member may have a protruding portion and another blade member may have a recessed portion; and when the opening portion is in a fully closed state, the protruding portion of the one blade member overlaps the recessed portion of the other blade member in the opening portion, to close the space in the direction of flow of the fluid.

This structure enables an extreme reduction of the gap when fully closed, through closing the gap in the direction in which the fluid flows, through overlapping of a protruding portion of one blade member with a recessed portion of another blade member when the opening portion is in a fully closed state.

At least one of the plurality of blade members has a closing member for closing, through deformation, between the plurality of blade members when the opening portion is in a fully closed state.

This structure enables a reduction in the space when the opening portion is in a fully closed state due to at least one of the plurality of blade members having a closing member for closing, through deformation, the space between the plurality of blade members when the opening portion is in a fully closed state.

Moreover, the present invention may be embodied as a vehicle that is provided with the flow rate controlling device.

The present invention enables the provision of a flow rate controlling device able to reduce the loss when fully open, and the provision of a vehicle provided with this flow rate controlling device.

BRIEF DESCRIPTION OF THE DRAWINGS

FIG. 4 (*b*) is a perspective diagram when a blade member is viewed from the downstream side; FIG. 4 (*c*) is a perspective diagram when a blade member according to a modified example is viewed from the upstream side; and FIG. 4 (*d*) is a perspective diagram when a blade member according to a modified example is viewed from the downstream side.

FIG. 13 (*b*) is a right side view of FIG. 13 (*a*). FIG. 13 (*c*) is a diagram wherein the blade member is viewed at an angle facing from the downstream side to the upstream side of the flow of the fluid. FIG. 13 (*d*) is a diagram wherein the blade member is viewed at an angle facing from the downstream side to the upstream side of the flow of the fluid. FIG. 13 (*e*) is a view of FIG. 13 (*c*) in the direction of the arrow B.

FIG. 19 (*b*) is a perspective diagram wherein the flow rate controlling device according to the further example is viewed from the downstream side of the pipe; and FIG. 19 (*c*) is a perspective diagram wherein the interior of the flow rate controlling device according to the further embodiment is viewed with the first base of the upstream side removed.

FIG. 21 (*b*) is a view of FIG. 21 (*a*) in the direction of the arrow E; FIG. 21 (*c*) is a diagram of the blade member viewed from the downstream side; and FIG. 21 (*d*) is a view of the blade member viewed in the direction of the arrow F.

FIG. 22 (*b*) is a perspective diagram of the blade member viewed from the downstream side.

FIG. 23 (*b*) is a diagram of the elastic member, viewed from the upstream side.

FIG. 24 (*a*) and FIG. 24 (*b*) are diagrams, viewed from the upstream side and the downstream side, respectively, in a state wherein the elastic member, the first retaining member, and the second retaining member have been removed; and FIG. 24 (*c*) is a diagram from the upstream side in a state wherein the elastic member is attached to the blade member.

FIG. 27 (*b*) is a plan view showing the interior of the flow rate controlling device from the upstream side with the first base removed when the flow rate controlling device is in a fully opened state.

FIG. 28 (*b*) is a plan view showing the positional relationship between the detected gear and the sensor when the blade members are in an intermediate state between the fully opened state and the fully closed state. FIG. 28 (*c*) is a plan view showing the positional relationship between the detected gear and the sensor when the blade members are in the fully closed state.

FIG. 29 (*b*) is a plan view showing the interior of the flow rate controlling device, from the upstream side, with the first base removed, with the flow rate controlling device in an intermediate state between fully opened and fully closed.

FIG. 30 (*b*) is a plan view showing the interior of the flow rate controlling device, from the upstream side, with the first base removed, with the flow rate controlling device in the fully opened state.

FIG. 32 (*b*) is a plan view of the internal structure of a flow rate controlling device according to the yet further example according to the present invention in an opened state, with the first base on the upstream side removed.

FIG. 34 (*b*) is a plan view of the internal structure of a flow rate controlling device according to the yet further example according to the present invention in a closed state, with the first base on the upstream side removed.

FIG. 35 (*b*) is a plan view of the internal structure of a flow rate controlling device according to the yet further example according to the present invention in the intermediate state between the opened and closed state, with the first base on the upstream side removed.

FIG. 37 (*b*) is a plan view illustrating the first blade member; and FIG. 37 (*c*) is a side view illustrating the first blade member.

FIG. 38 (*b*) is a plan view illustrating the second blade member; and FIG. 38 (*c*) is a side view illustrating the second blade member.

FIG. 41 (*b*) is a plan view illustrating the first blade member.

FIG. 42 (*b*) is a plan view illustrating the second blade member.

FIG. 45 (*b*) is a perspective diagram when the flow rate controlling device is open.

FIG. 46 (*b*) is a front view illustrating the structure when the flow rate controlling device is open.

FIG. 49 (*b*) is a view of FIG. 49 (*a*) in the direction of the arrow D.

FIG. 54 (*b*) is a front view illustrating the structure when the flow rate controlling device according to the third modified example is open.

FIG. 55 (*b*) is a front view illustrating the structure when the flow rate controlling device according to the other example of the third modified example is open.

Examples according to the present invention will be explained in detail below, referencing the appropriate drawings.

Figure 1:
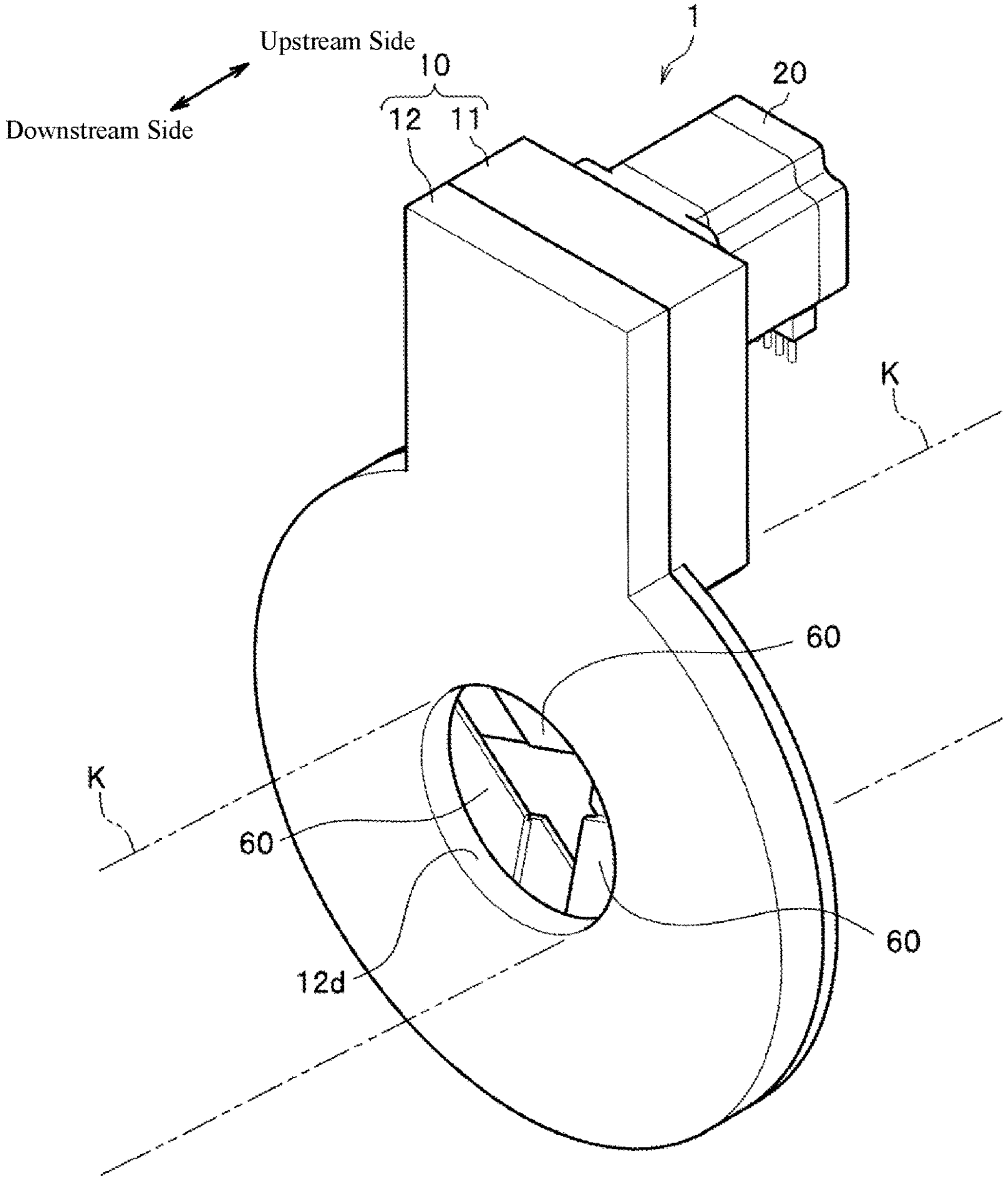
FIG. 1 is a perspective diagram illustrating a flow rate controlling device according to an example according to the present invention.
Figure 2:
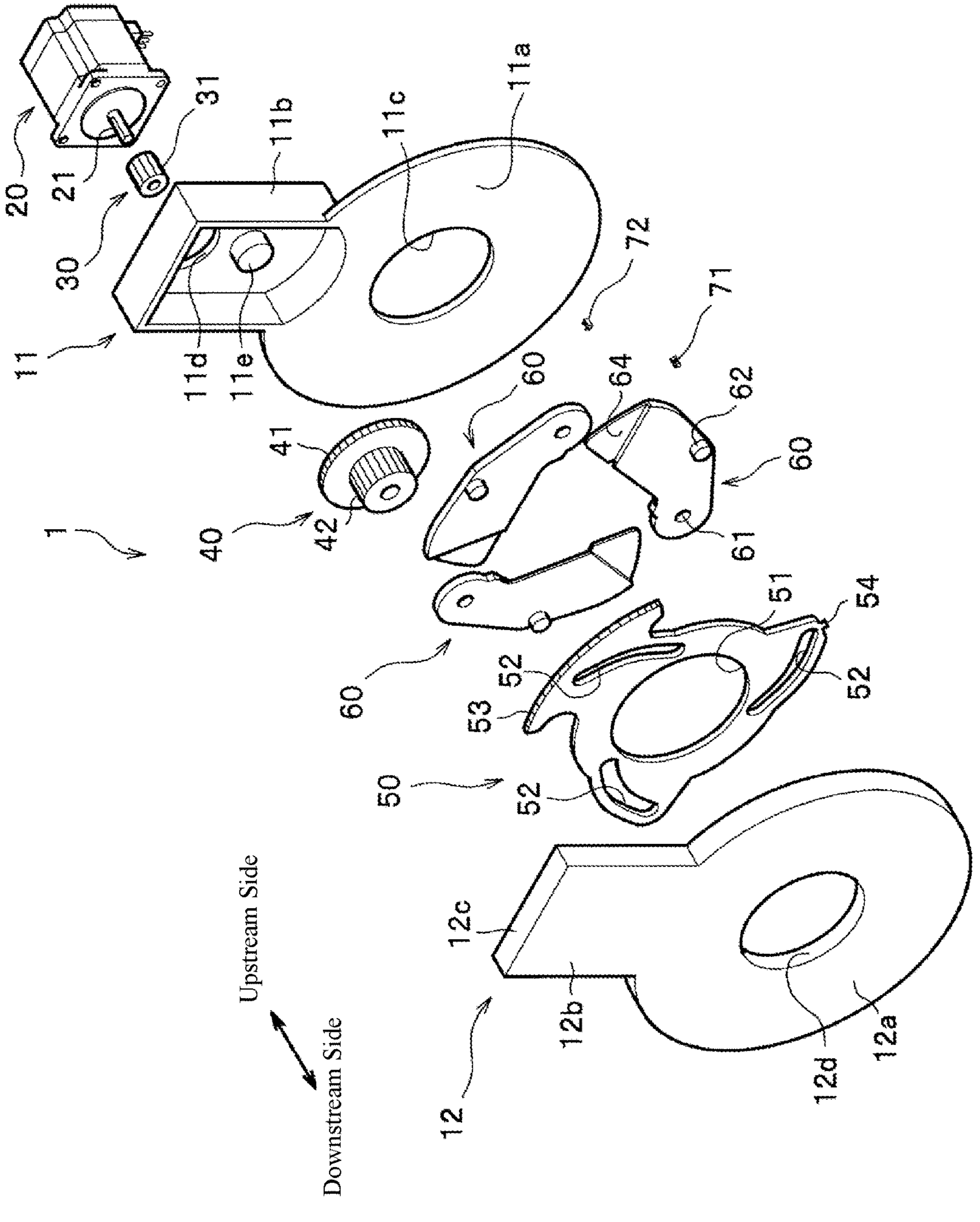
FIG. 2 is an exploded perspective diagram illustrating the flow rate controlling device.
Figure 3:
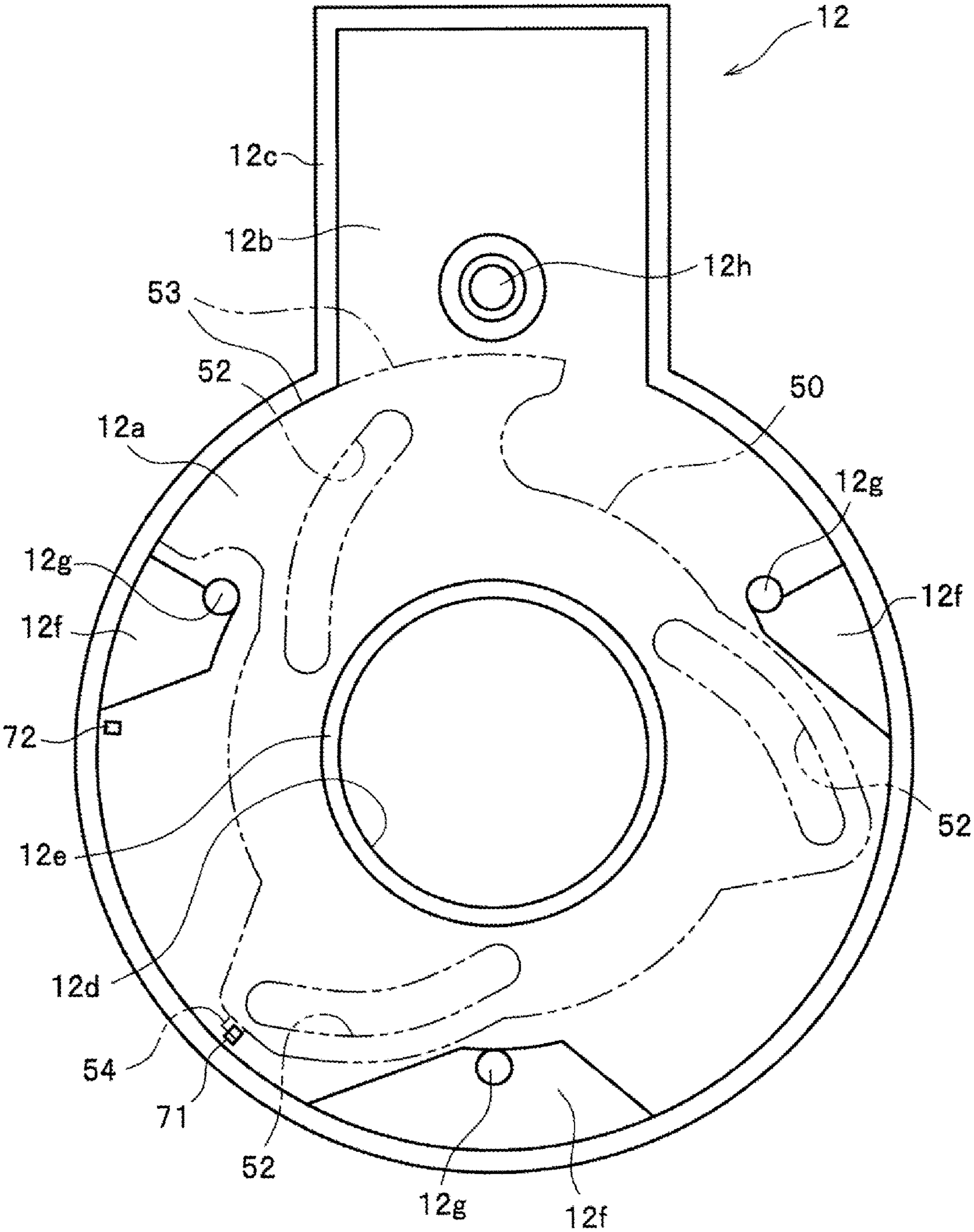
FIG. 3 is a plan view wherein a second base, a ring member, and a sensor are viewed from the upstream side.
Figure 4:
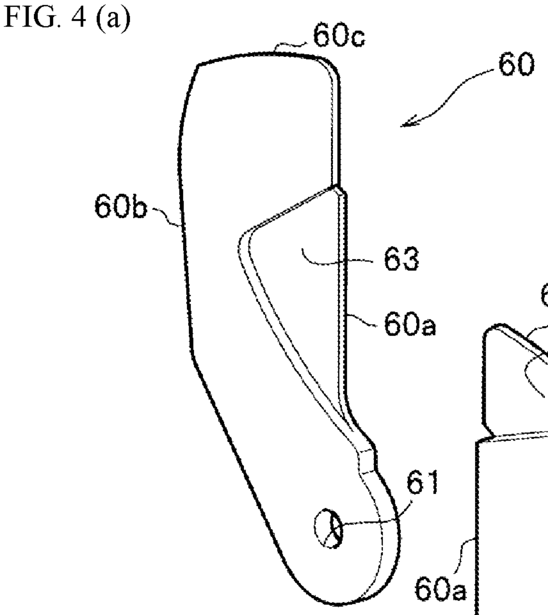
FIG. 4 (*a*) is a perspective diagram wherein a blade member is viewed from the upstream side.
Figure 4:
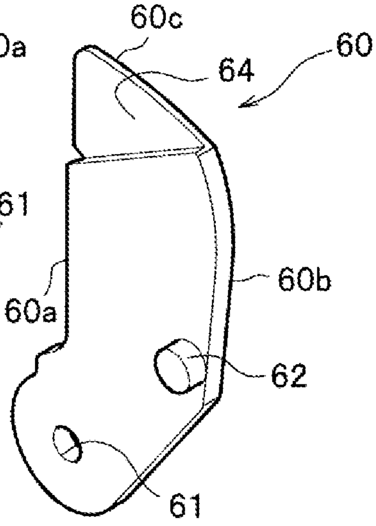
Figure 4:
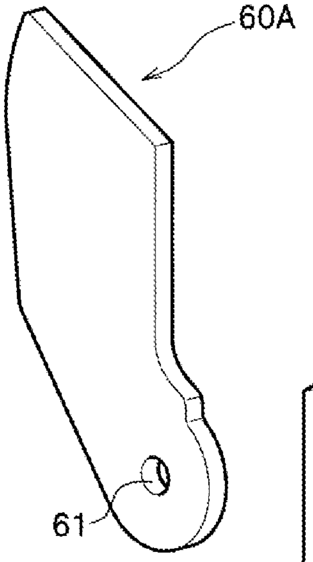
Figure 4:
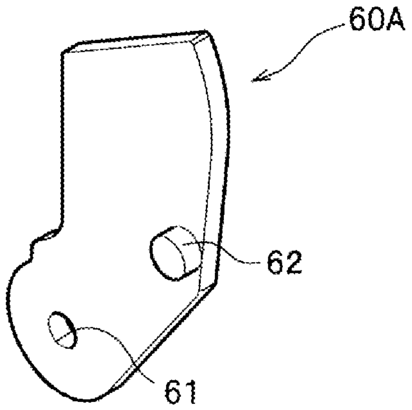

An example according to the present invention will be explained in detail, referencing the appropriate drawings, using, as an example, a case wherein the flow rate controlling device according to the present invention is applied to inspection equipment for an airflow sensor. FIG. 1 is a perspective diagram illustrating a flow rate controlling device according to this example according to the present invention. FIG. 2 is an exploded perspective diagram illustrating the flow rate controlling device. FIG. 3 is a plan view wherein a second base, a ring member, and a sensor are viewed from the upstream side. FIG. 4 (*a*) is a perspective diagram wherein a blade member is viewed from the upstream side; FIG. 4 (*b*) is a perspective diagram when a blade member is viewed from the downstream side; FIG. 4 (*c*) is a perspective diagram when a blade member according to a modified example is viewed from the upstream side; and FIG. 4 (*d*) is a perspective diagram when a blade member according to a modified example is viewed from the downstream side. In FIG. 3, the ring member is indicated by the double dotted lines.

<Flow Rate Controlling Device>

As illustrated in FIG. 1, the flow rate controlling device 1 according to this example of the present invention is provided in a pipe K, and is a valve device for controlling the flow rate of a fluid that flows through the pipe K from the upstream side toward the downstream side. As illustrated in FIG. 1 in FIG. 2, the flow rate controlling device 1 is provided with a base 10, a motor 20, a pinion 30, a reduction gear 40, a ring member 50, a plurality of blade members 60 (which, in this example, is three blade members), and sensors 71 and 72.

<Base>

The base 10 is structured through combining an upstream side first base 11 and a downstream side second base 12, and securing through bonding, or the like. The space within the base 10 forms a flow path through which a fluid flows. Within the base 10, the fluid flows from an opening portion 11*c* of the first base 11 toward an opening portion 12*d* of the second base 12. That is, the axial direction of the opening portions 11*c* and 12*d* is the direction in which the fluid flows. An output shaft 21 of a motor 20, a pinion 30, a reduction gear 40, a ring member 50, a plurality of blade members 60, and sensors 71 and 72 are contained within the base 10.

<First Base>

As illustrated in FIG. 2, the first base 11 is a member made from a metal (for example, aluminum) that is provided integrally with a circular wall portion 11*a* to which an upstream side pipe K is attached, and a boss-shaped housing portion 11*b*, equipped on the outside of the pipe K, in which are contained a pinion 30 and a reduction gear 40.

An opening portion 11*c* that forms a circular shape is formed in a center portion of the circular wall portion 11*a*. The opening portion 11*c* is the inlet for the fluid into the flow rate controlling device 1. A hole portion 11*d* that forms a circular shape is formed in the housing portion 11*b*. An output shaft 21 of the motor 20 is inserted into the hole portion 11*d*. A shaft portion 11*e* that forms a circular column shape is provided extending from the downstream side face (the inner side face) of the housing portion 11*b*. The shaft portion 11*e* is a protruding portion of a circular column shape, inserted into a cylinder portion of the reduction gear 40, to support the reduction gear 40 rotatably, where, in this example, this is formed using a bearing, such as a ball bearing or an oil-including metal bearing.

<Second Base>

The second base 12 is a member that is made out of a metal (for example, aluminum), provided integrally with a disk wall portion of 12*a* to which the downstream side pipe K is attached, a rectangular wall portion 12*b* for blocking the open face of the housing portion 11*b*, provided on the outside of the pipe K, and a peripheral wall portion 12*c* that is provided extending toward the upstream side from the peripheral edges of the disk wall portion 12*a* and the rectangular wall portion 12*b*. The height to which the peripheral wall portion 12*c* stands is essentially equal to the total of the thicknesses of the ring member 50 and the blade members 60.

As illustrated in FIG. 3, an opening portion 12*d* that forms a circular shape is formed in the center portion of the disk wall portion 12*a*. The opening portion 12*d* has the same diameter as the opening portion 11*c* of the first base 11, and is provided positioned facing the opening portion 11*c*, and is the outlet for the fluid from the flow rate controlling device 1. A rib 12*e* that that is formed in a round cylindrical shape is provided extending toward the interior of the base 10 around the opening portion 12*d* of the upstream side face (the inner side face) of the disk wall portion 12*a*. A plurality of support portions 12*f* (which, in this example is three support portions 12*f*) are formed, with equal spacing in the circumferential direction, on the outer edge portion of the upstream side face (the inner side face) of the disk wall portion 12*a*. Shaft portions 12*g* that are formed in circular column shapes, are provided extending from the respective plurality of support portions 12*f*. The shaft portions 12*g* are examples of rotational shafts for the blade members 60 that are parallel to the axis of the opening portion 12*d*, and are circular column-shaped protruding portions that are inserted into the inserting portion 61 of the blade member 60 to support the blade member 60 so as to be able to rotate, and, in this example, are formed using bearings such as ball bearings or oil-including metal bearings, or the like. The height to which the support portions 12*f* extend is essentially equal to the thickness of the ring member 50, and the height to which the shaft portions 12*g* extend is essentially equal to the thickness of the blade member 60.

A shaft portion 12*h* that is formed in a circular column shape is provided extending from the upstream side face (the inner side face) of the rectangular wall portion 12*b*. The shaft portion 12*h* is provided at a location that faces the shaft portion 11*e* of the first base 11, and is a protruding portion of a circular column shape that is inserted into the cylinder portion of the reduction gear 40 to support the reduction gear 40 so as to be able to rotate, and, in this example, is formed using a bearing such as a ball bearing or an oil-including metal bearing, or the like.

In this example, the inner diameters of the opening portions 11*c* and 12*d*, and of the rib 12*e* may be set as appropriate depending on the application of the flow rate controlling device 1, and in a case wherein the flow rate controlling device 1 is used for testing an airflow sensor for a vehicle, may be, for example, 70 mm, depending on the volume of the exhaust of the vehicle. Moreover, as a whole, the round cylinder part of the flow rate controlling device 1 may be structured so that it can be provided within the pipe K.

<Motor>

As illustrated in FIG. 2, the motor 20 is the power source for rotating the ring member 50, and, in this example, is a stepping motor. The motor 20 is installed on the upstream side face (the outside face) of the housing portion 11*b* of the first base 11 so as to cover the hole portion 11*d*. The output shaft 21 of the motor 20 is disposed within the housing portion 11*b*. Note that the motor 20 may be attached to the downstream side face of the rectangular wall portion 12*b* of the second base 12. Moreover, the motor 20 is not limited to a stepping motor, but rather instead may be an AC motor, a DC motor, or the like.

<Pinion>

The pinion 30 is a member made from a metal (for example, stainless steel) that is fitted on the outside of the output shaft 21 of the motor 20, to rotate together with the output shaft 21. The pinion 30 is provided with outer teeth 31 that mesh with the outer teeth 41 of the reduction gear 40.

<Reduction Gear>

The reduction gear 40 is an example of a reduction mechanism, and is a member that is made of metal (for example, stainless steel) for reducing the speed of the output of the motor 20 and transmitting the power to the ring member 50. The reduction gear 40 is supported rotatably by the shaft portion 11*e* on the first base 11 side and the shaft portion 12*h* on the second base 12 side. The reduction gear 40 is provided with outer teeth 41, provided on a large diameter portion, for meshing with the outer teeth 31 of the pinion 30, and outer teeth 42, provided on a small diameter portion, for meshing with the outer teeth 53 of the ring member 50.

<Ring Member>

The ring member 50 is a member made from a metal (such as, for example, aluminum), and is able to rotate around the opening portion 12*d*. The ring member 50 is a driving ring for rotating a plurality of blade members 60 through the power of the motor 20, and, in this example, is provided between the side face of the second base 12 on the inside of the circular wall portion 12*a* and the plurality of blade members 60. As illustrated in FIG. 3, a hole portion 51 that forms a circle shape is formed in the center portion of the ring member 50. The inner diameter of the hole portion 51 is set to be essentially identical to the outer diameter of the rib 12*e* of the second base 12, and the ring member 50 is fitted onto the rib 12*e* at the hole portion 51.

A plurality of groove portions 52 (which, in this example, is three groove portions 52, corresponding to the number of blade members 60) that extend in the circumferential direction is formed on the ring member 50 so as to surround the hole portion 51. Viewed from the upstream side, the groove portions 52 are disposed in front of the corresponding shaft portion 12*g*, in the clockwise direction, and are formed bent so as to be nearer to the radial-direction center of the opening portion 12*d* the further in the counterclockwise direction.

Outer teeth 53 that mesh with the outer teeth 42 of the reduction gear 40 are formed on a portion of the peripheral edge of the ring member 50. A detected piece 54, as an example of a detected portion, is provided extending toward the outside in the radial direction of the ring member 50, on a peripheral edge of the ring member 50.

The shape of the ring member 50, and the positions and shapes of the plurality of support portions 12*f* of the second base 12 are set so that the ring member 50 and the plurality of support portions 12*f* do not come into contact, even when the ring member 50 is rotated.

<Blade Member>

The plurality of blade members 60 are members that are made from a metal (for example, aluminum), for opening and closing the flow path. In this example, the plurality of blade members 60 is disposed between the circular wall portion 11*a* of the first base 11 and the ring member 50, within a single plane that is perpendicular to the direction in which the fluid flows. As illustrated in FIGS. 4 (*a*) and (*b*), an inserting portion 61 is formed from a recessed portion or a hole portion (which, in this example, is a hole portion) in a base end portion of the blade members 60 (the back end in the clockwise direction when viewed from the upstream side). The inserting portion 61 is located to be the axis of rotation of the blade member 60 when a shaft portion 12*g* of the second base 12 is inserted therein.

A protruding portion 62 that forms a circular column shape is provided extending toward the ring member 50 in the center portion of the blade member 60. The protruding portion 62 is a protruding portion of a circular column shape that can slide within the groove portion 52, and is formed using a bearing such as a ball bearing or and oil-including metal bearing, or the like. The height to which the protruding portion 62 protrudes is set so as to be no more than the thickness of the ring member 50.

A thin-wall portion 63 that forms an essentially triangular-shape is formed on the inside, in the radial direction, of the center portion of the blade member 60. In the thin-wall portion 63, the upstream side part of the blade member 60 is removed. A thin-wall portion 64 that forms an essentially triangular-shape is formed at a tip end portion of the blade member 60. The thin-wall portion 64, a downstream side part of the blade member 60 is removed. The shapes of the thin-wall portions 63 and 64 are set so as to enable the thin-wall portion 63 of one blade member 60 and the thin-wall portion 64 of another blade member 60 to overlap, without the blade members 60 contacting each other when overlapping.

Figure 5:
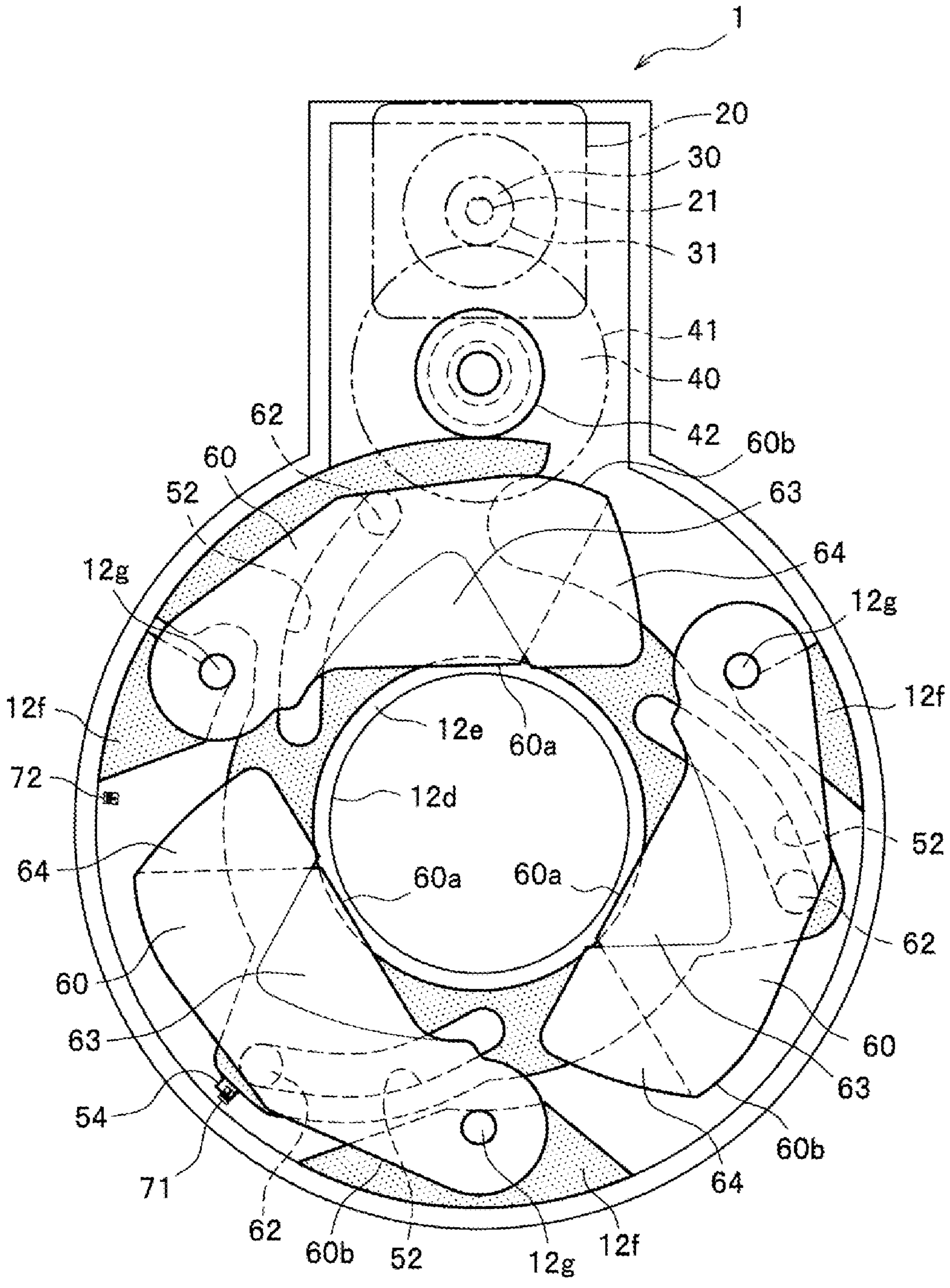
FIG. 5 is a schematic diagram illustrating a fully opened state of the flow rate controlling device.

The shape of the inner edge (the edge that is on the inside in the radial direction of the opening portion 12*d*) 60*a* of the blade member 60 is set so that, in the fully opened state that is illustrated in FIG. 5, the inner edge 60*a* will overlap the rib 12*e*. The shape of the outer edge (the edge that is on the outside in the radial direction of the opening portion 12*d*) 60*b* of the blade member 60 is set so that the outer edge 60*b* will not contact the peripheral wall portion 12*c* when in the fully opened state illustrated in FIG. 5 and so that the outer edge 60*b* will be positioned further to the outside, in the radial direction of the opening portion 12*d*, than the rib 12*e* when in the fully closed state, illustrated in FIG. 7. The shape of the tip end edge 60*c* of the blade member 60 forms a rounded shape, where the shape of the thin-wall portion 63 of the blade member 60 is set so that two blade members 60 can overlap without making contact when the flow rate controlling device 1 is opened and closed.

<Sensor>

As illustrated in FIG. 2, the sensors 71 and 72 are examples of detected portions for detecting the detected piece 54 of the ring member 50. In this example, the sensors 71 and 72 are each provided with a light-emitting portion and a light-receiving portion, which mutually facing each other, where the detected piece 54 is detected through the reception of light by the light-receiving portion being blocked by the detected piece 54 being positioned between the light-emitting portion and the light-receiving portion. The sensor 71 is provided in a position wherein the detected piece 54 can be detected when the flow rate controlling device 1 is in the fully opened state. The sensor 72 is provided in a position wherein the detected piece 54 can be detected when the flow rate controlling device 1 is in a fully closed state. A controlling portion, not shown, can stop driving of the motor 20 based on the detection results by the sensors 71 and 72, and can correct the initial state of the motor 20 based on the detection result by the sensor 71. Note that the method for detecting the detected piece 54 is not limited to the sensors 71 and 72.

Example of Operation

Figure 6:
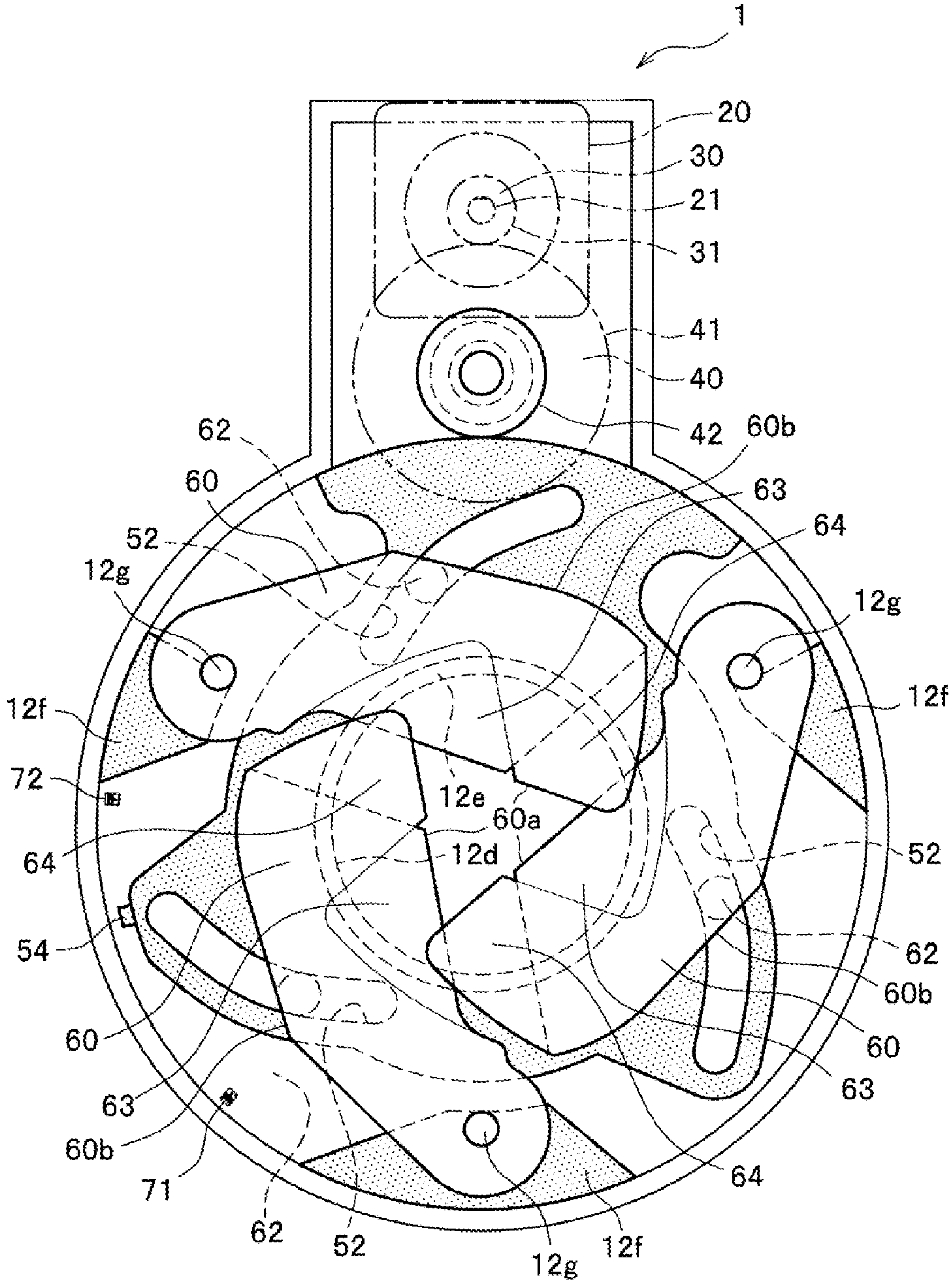
FIG. 6 is a schematic diagram illustrating a partially closed state of the flow rate controlling device.
Figure 7:
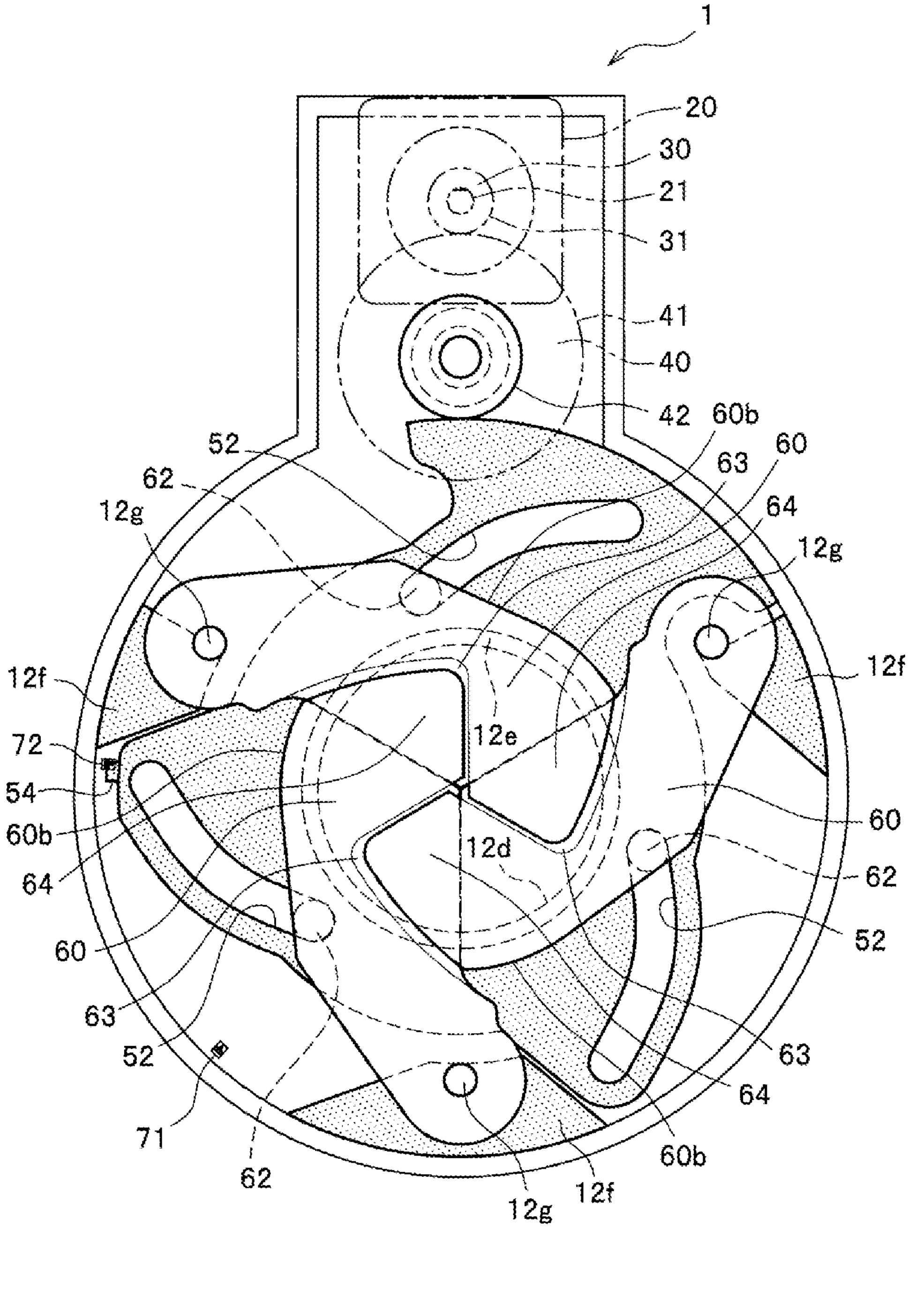
FIG. 7 is a schematic diagram illustrating a fully closed state of the flow rate controlling device.

An example of operation of the flow rate controlling device 1 will be explained next using FIG. 5 through FIG. 7 (referencing FIG. 1 through FIG. 4 as appropriate). FIG. 5 is a schematic diagram illustrating a fully opened state of the flow rate controlling device. FIG. 6 is a schematic diagram illustrating a partially closed state of the flow rate controlling device. FIG. 7 is a schematic diagram illustrating a fully closed state of the flow rate controlling device. FIG. 5 through FIG. 7 are plan views, viewed from the upstream side, with the first base 11 of the flow rate controlling device 1 remove, in order to explain the orientations of the ring member 50 and the plurality of blade members 60 within the flow rate controlling device 1. In FIG. 5 through FIG. 7, the motor 20, the pinion 30, and the large-diameter portion of the reduction gear 40 are indicated by double dotted lines. The ring member 50 and the support portion 12*f*, which is provided extending to a height that is the same as that of the ring member 50, are marked with dots.

<Fully Opened State>

As illustrated in FIG. 5, in the fully opened state, the protruding portions 62 of the blade members 60 are positioned at the front end portions, in the clockwise direction, of the groove portions 52, corresponding thereto. The detected piece 54 of the ring member 50 is positioned at a location that can be detected by the sensor 71.

A portion of the inner edge 60*a* of the blade member 60 (the end portion in the inner radial direction) is positioned at a location that overlaps the rib 12*e*. This is to prevent the inner edge 60*a* of the blade member 60 from contacting the outer peripheral surface of the rib 12*e*, which would prevent the blade member 60 from rotating in the closing direction, when the blade member 60 is biased in the direction of the ring member 50 by the fluid that flows within the base 10.

<Closing Operation>

When, upon a command from a controlling portion, not shown, the output shaft 21 of the motor 20 rotates in the forward direction (rotating clockwise when viewed from the upstream side), the power of the motor 20 is transmitted to the ring member 50 through the pinion 30 and the reduction gear 40, so that the ring member 50 rotates clockwise, when viewed from the upstream side (FIG. 5→FIG. 6). Here the blade members 60 will revolve in the clockwise direction, with the shaft portion 12*g* as the rotary shaft, through the protruding portions 62 sliding within the groove portions 52 from the clockwise-direction front end portions to the clockwise-direction back end portions.

As the closing operation progresses, as illustrated in FIG. 6, the thin-wall portions 64 of the blade members 60 overlap in the thin-wall portions 63 of the blade members 60 that are on the front sides thereof in the clockwise direction. In the state prior to overlapping of the thin-wall portions 63 and 64, the cross-sectional shape of the flow path for the fluid forms a shape wherein the circular opening portion 12*d* is truncated by three arches. In the state wherein the thin-wall portions 63 and 64 are overlapping, the cross-sectional shape of the flow path of the fluid will form an essentially triangular shape, formed by the inner edges 60*a* of the three blade members 60.

<Fully Closed State>

Moreover, as the closing operation progresses further, as illustrated in FIG. 7, the protruding portions 62 arrive at the clockwise-direction back end portions of the groove portions 52, and the three blade members 60 close the opening portion 12*d* (the rib 12*e*) completely. In the fully closed state, the detected piece 54 of the ring member 50 is positioned at a location that is detectable by the sensor 72, and the controlling portion stops the motor 20 based on the detection result of the sensor 72.

Note that in this example, the thicknesses of the main unit part of the blade member 60 and the thin-wall portions 63 and 64 thereof are set to dimensions that are able to ensure clearance between the blade members 60, so as to not make contact, when two blade members 60 are overlapped. Moreover, in the fully closed state, a gap will remain, which forms a small Y shape, between the three blade members 60 in the center portion of the opening portion 12*d*. This is a measure to prevent damage that would occur due to the blade members 60 colliding.

Moreover, in the thin-wall portion 63, the upstream side is removed so that, in the blade members 60, the positions that slide over the surface of the tip end of the rib 12*e* when opening or closing will be on the same plane.

<Opening Operation>

When, upon a command from a controlling portion, not shown, the output shaft 21 of the motor 20 rotates in the reverse direction (rotating counterclockwise when viewed from the upstream side), the power of the motor 20 is transmitted to the ring member 50 through the pinion 30 and the reduction gear 40, so that the ring member 50 rotates counterclockwise, when viewed from the upstream side (FIG. 7→FIG. 6→FIG. 5). Here the blade members 60 will revolve in the counterclockwise direction, with the shaft portion 12*g* as the rotary shaft, through the protruding portions 62 sliding within the groove portions 52 from the clockwise-direction back end portions to the clockwise-direction front end portions. In the fully opened state, the detected piece 54 of the ring member 50 is positioned at a location that is detectable by the sensor 71, and the controlling portion stops the motor 20 based on the detection result of the sensor 71.

In the flow rate controlling device 1, the flow rate of the fluid can be controlled by setting the opening of the flow path (the opening portion 12*d*) essentially continuously between the fully opened state illustrated in FIG. 5 and the fully closed state illustrated in FIG. 7, based on commands from the controlling portion.

Figure 8:
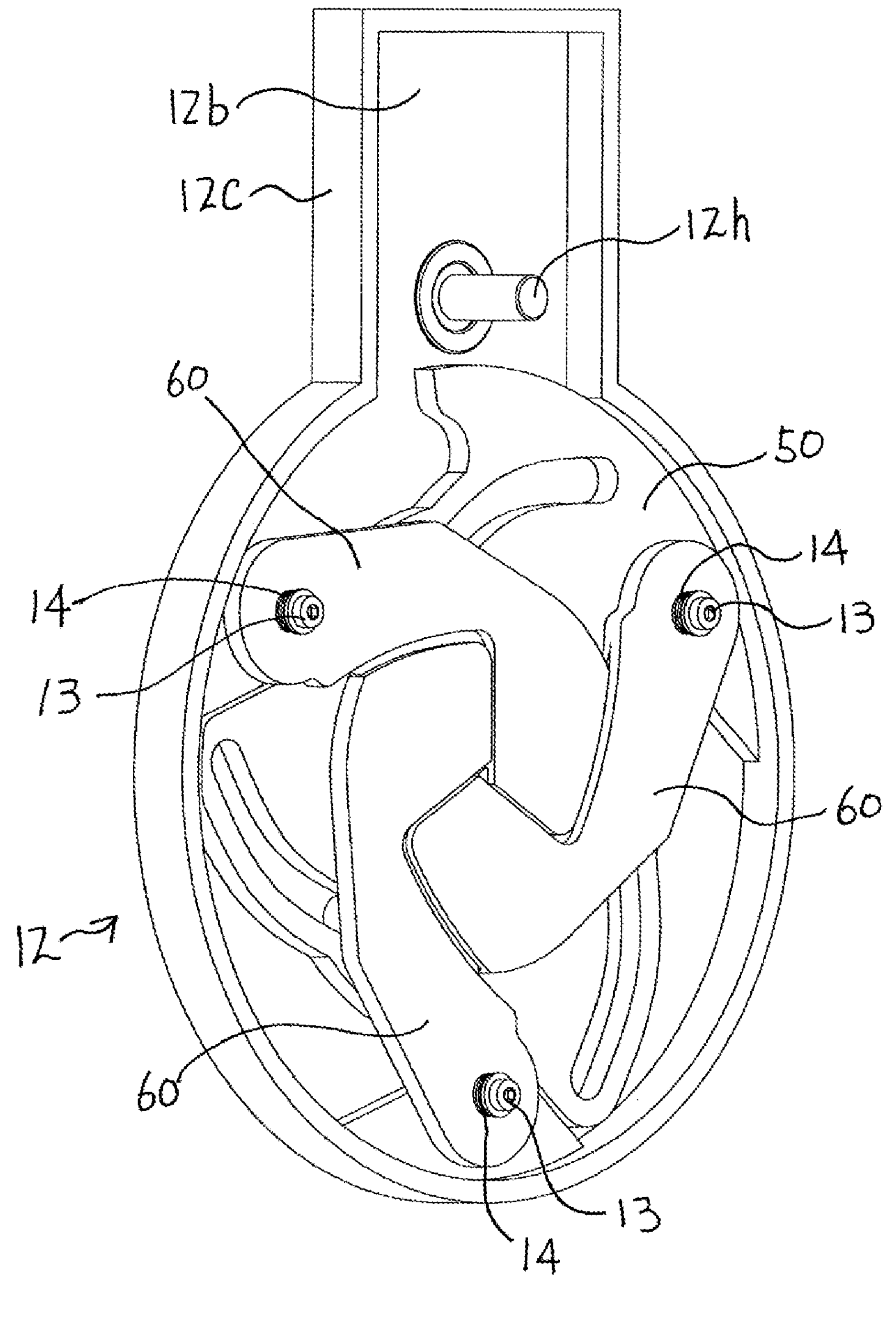
FIG. 8 is another example of a flow rate controlling device according to the present invention, illustrating the members that are disposed within the second base.

Another example according to the present invention will be explained next using FIG. 8 and FIG. 9. In this other example, a compression spring 14 is coiled on the shaft portion 12*g* to bias the blade member 60 toward the upstream side, and for structures that are identical to those in the previous example described above, identical reference symbols are assigned and explanations thereof are omitted.

Figure 9:
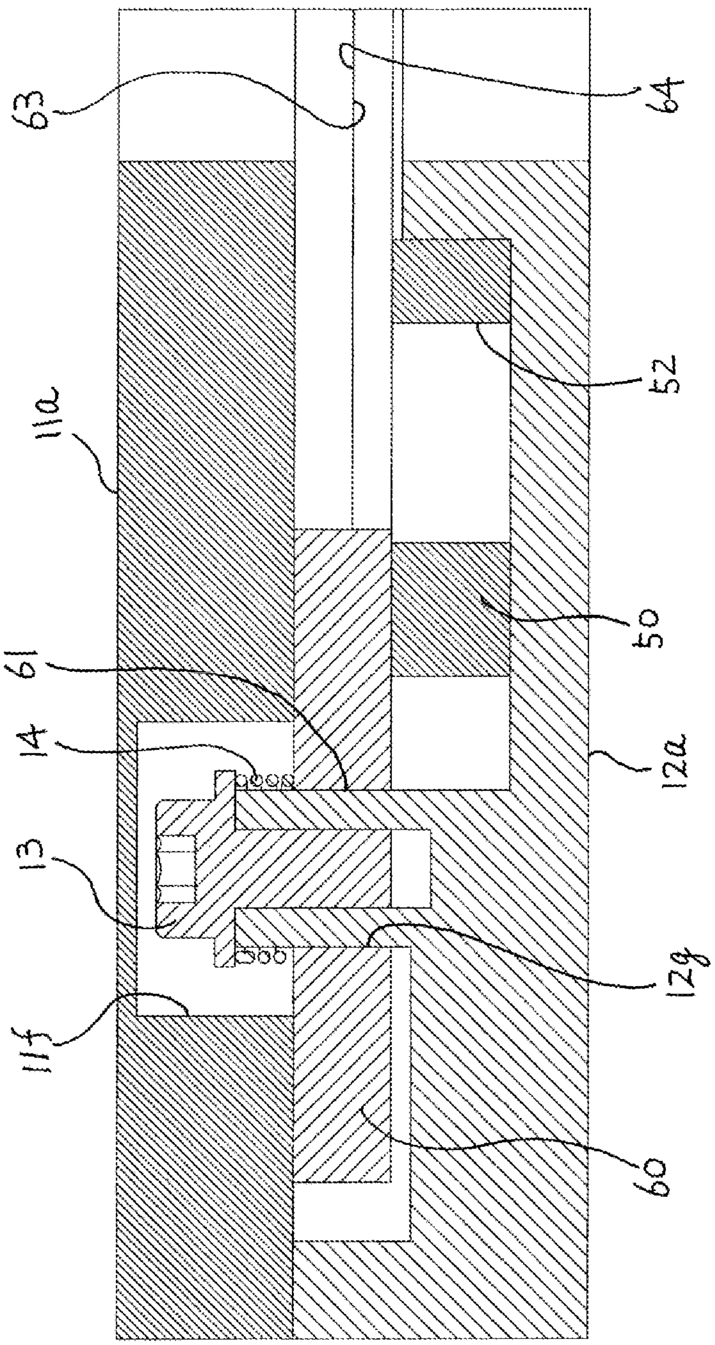
FIG. 9 is a cross-sectional view of the flow rate controlling device illustrated in FIG. 8.

In this example, the shaft portion 12*g* of the second base 12 is formed so as to be hollow, as illustrated in FIG. 9, where a flanged screw 13 is screwed into this hollow portion. Moreover, the compression spring 14 is attached between the flanged portion of the screw 13 and the blade member 60 so as to be loosely coiled on the outside of the shaft portion 12*g*. The blade member 60 is biased toward the downstream side from the upstream side thereby. Moreover, the height of the support portion 12*f* of the second base 12 is less than the thickness of the ring member 50. Because of this, the movement of the blade member 60 toward the downstream side is constrained by the surface of the downstream side of the blade member 60 contacting the ring member 50. Moreover, the head portion of the screw 13 is enclosed within a recessed portion 11*f* that is formed in the first base 11.

Because, in this structure, the blade member 60 is able to move in the direction in which the fluid flows, this enables adjacent blade members 60 to make more contact with each other in the direction of the flow path, improving the performance with which the flow path is cut off when in the fully closed state.

In the flow rate controlling device 1 according to the previous example according to the present invention, a plurality of blade members 60 rotate around rotary shafts that are parallel to the axis of the opening portion 12*d* to open and close the opening portion 12*d*, making it possible to reduce the cross-sectional area of the members within the flow path in the fully opened state (where this cross-sectional area is zero in this example), making it possible to reduce loss. Moreover, the flow rate controlling device 1 enables miniaturization of the size of the flow rate controlling device 1 in the direction in which the fluid flows, when compared to that of a conventional butterfly valve. In particular, because the plurality of blade members 60 is disposed in a single plane that is perpendicular to the axis of the opening portion 12*d* in the flow rate controlling device 1, this makes it possible to further decrease the size in the direction in which the fluid flows.

Moreover, because in the flow rate controlling device 1 the plurality of blade members 60 can be positioned to the outside of the opening portion 12*d* in the radial direction, it is possible to achieve a fully opened state wherein the blade members 60 that are the valve unit are completely withdrawn from the flow path. Moreover, because, in the flow rate controlling device 1, the inner edges 60*a* of the plurality of blade members 60 are positioned at locations that overlap the rib 12*e* when in the fully opened state, not only does this prevent the inner edges 60*a* of the blade member 60 from contacting the outer peripheral surface of the rib 12*e* through, for example, the effects of the fluid, which could prevent the blade members 60 from rotating in the closing direction, but also, when in a closed state, the plurality of blade members 60 are biased, by the fluid, against the tip end the surface of the rib 12*e*, making it possible to control properly the amount of flow of the fluid out from the opening portion 12*d*.

Moreover, in the flow rate controlling device 1, the power of the motor 20, which is a stepping motor, is relayed through the reduction gear 40 to the ring member 50, thus making it possible to control the opening of the opening portion 12*d*, that is, the flow rate of the fluid, essentially continuously.

Moreover, given the flow rate controlling device 1, one blade member 60 overlaps another blade member 60 when in the fully closed state, making it possible to set the cross-sectional shape of the flow path in the partially closed state suitably so as to vary the flow rate linearly, for example, with opening/closing, and so as to increase the performance in cutting off the flow path when in the fully closed state.

Moreover, in the flow rate controlling device 1, groove portions 52 are formed in the ring member 50 and protruding portions 62 are formed in the blade members 60, enabling the blade members 60 to be miniaturized easily when compared to a case wherein the groove portions are formed in the blade members 60 and the protruding portions are formed in the ring member 50. Moreover, in the flow rate controlling device 1, the sensor 71 detects the detected piece 54 in the fully opened state, thus enabling the default state of the motor 20 to be corrected.

While an example according to the present invention has been explained in detail above, the present invention is not limited to this example, but rather may be varied as appropriate within a range that does not deviate from the spirit or intent of the present invention. For example, in the flow rate controlling device 1, the structure may be one wherein three blade members 60A as illustrated in FIGS. 4 (*c*) and (*d*) are provided, instead of the three blade members 60, where, in the blade members 60A, not only are the thin-wall portion 64 eliminated from the blade members 60, but the thin-wall portions 63 have the same thickness as other positions. The plurality of blade members 60A do not overlap each other when in the fully closed state.

Figure 10:
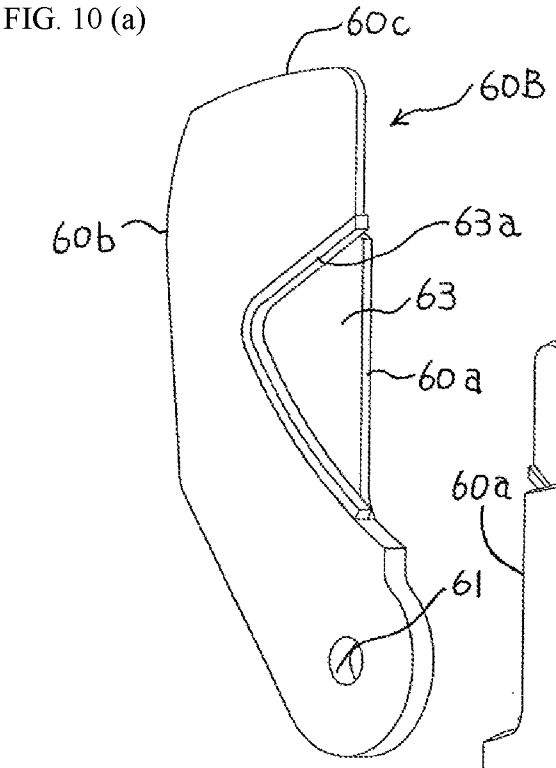
FIG. 10 (*a*) is a perspective diagram of a blade member according to a second modified example viewed from the upstream side, and FIG. 10 (*b*) is a perspective diagram of the blade member according to the second modified example viewed from the downstream side.
Figure 10:
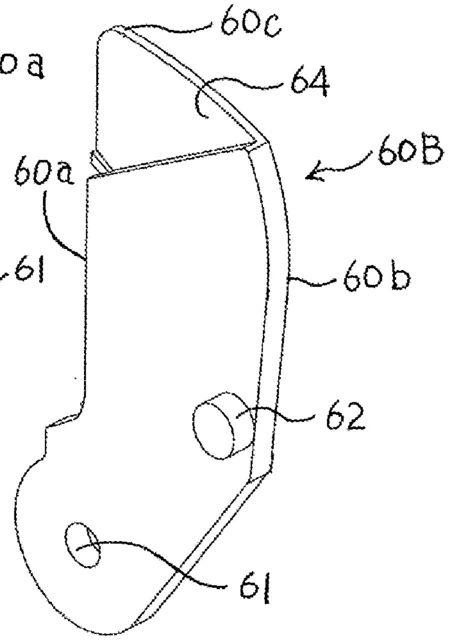
Figure 11:
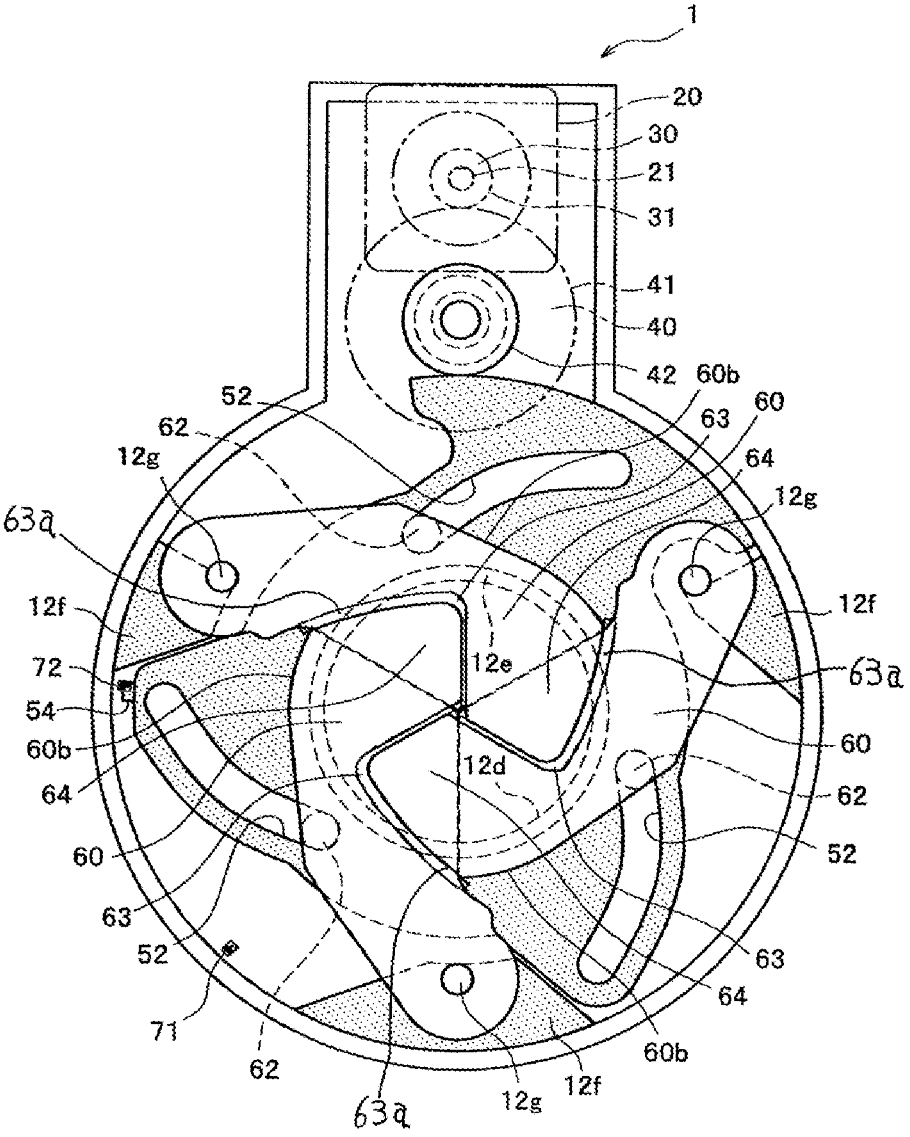
FIG. 11 is a schematic diagram illustrating a fully closed state of a flow rate controlling device according to the second modified example.

Moreover, the flow rate controlling device may be structured equipped with the three blade members 60B as illustrated in FIGS. 10 (*a*) and (*b*), instead of the three blade members 60. In the blade member 60B, a rubber, which is an elastic member, is attached to the thin-wall portion 63, and when in the fully closed state wherein the thin-wall portion 63 of one blade member 60 overlaps the thin-wall portion 64 of another blade member 60, the tip end edges 60*c* of adjacent blade members make contact. This makes it possible to improve the fully closed state, through eliminating the slight remaining essentially Y type shape in the center portion of the opening portion 12D when in the fully closed state. Such a fully closed state is illustrated in FIG. 11.

Moreover, the flow rate controlling device 1 may be structured with groove portions formed in the blade members 60 and protruding portions formed in the ring member 50.

Moreover, in the second base 12, a portion that includes the outer peripheral surface of the rib 12*e* may be formed from a member that is made of a resin, such as polyacetal, in order to improve the sliding performance of the ring member 50, and the peripheral wall portion 12*c* may be formed separately, with a rubber packing provided interposed between the peripheral wall portion 12*c* and the first base 11.

Moreover, the number of blade members 60 may be two, or may be four or more. Moreover, the structure may be one wherein a plurality of blade members 60 is supported rotatably on the first base 11 on the upstream side. Additionally, the plurality of blade members 60 may be offsetted in the direction in which the fluid flows, and the structure may be one wherein, in the fully closed state, one blade members 60 overlaps another blade member 60.

Moreover, the structure may be one wherein a rib is formed on the first base 11 on the upstream side, or wherein a plurality of blade members 60 is provided on the downstream side of the ring member 50.

Moreover, while the blade member 60 has the movement thereof to the downstream side constrained by the ring member 50, it may be constrained by the support portion 12*f* of the second base 12.

Moreover, the flow rate controlling device 1 may be structured without the reduction gear 40, with the outer teeth 31 of the pinion 30 meshing with the outer teeth 51 of the ring member 50. A plurality of support portions 12*g* may be used as stoppers for the ring member 50 when the power of the motor 20 is transmitted to the ring member 50 without reduction.

Moreover, while the shaft portions 12*g* are formed on the second base 12, they may instead be formed on the first base.

OTHER EXAMPLES OF THE PRESENT INVENTION

Other examples of the present invention will be explained next.

As illustrated in FIG. 5 and FIG. 6, in a flow rate controlling device 1, the protruding portions 62 of the blade members 60 move guided by the groove portions 52 of the ring member 50 (referencing FIG. 3), and the blade members 60 are opened and closed thereby.

Figure 12:
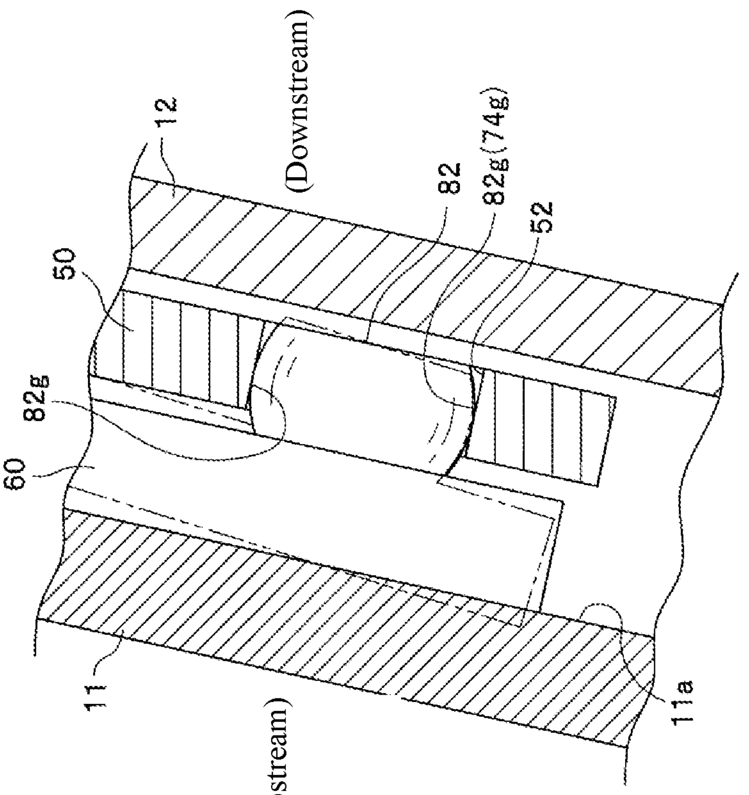
FIG. 12 (*a*) is a diagram wherein the first base is removed to view the interior of the fluid controlling device, facing from the upstream side toward the downstream side, and FIG. 12 (*b*) is a cross-sectional enlarged view along the section A-A in FIG. 12 (*a*).
Figure 12:
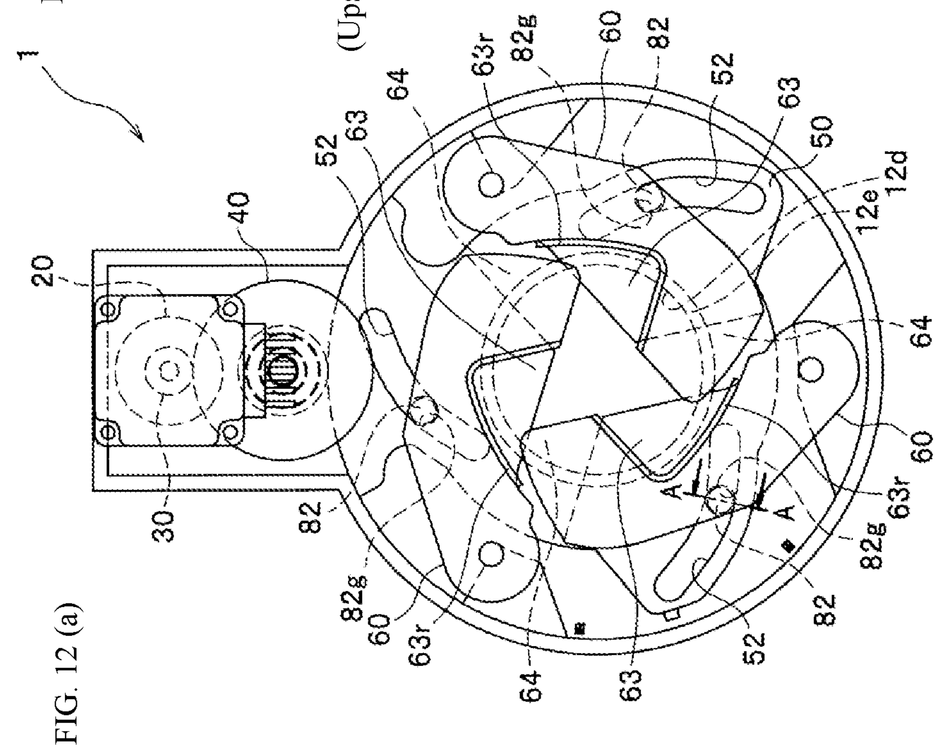

When closing by the blade members 60 entering into the flow path that is formed by the opening portion 11*c* of the first base 11 (referencing FIG. 2) and the opening portion 12*d* of the second base 12, there is a danger in that the pressure of the fluid in the direction of flow may cause the blade member 60 to incline and the protruding portion 62 to bite into the groove portion 52 (referencing the double dotted line in FIG. 12 (*b*)). This may interfere with the smooth opening and closing of the blade member 60.

Given this, in another example, described below, the location of the protruding portion 82 of the blade member 60 that slides within the groove portion 52 of the ring member 50 (the sliding location 82*g* (referencing FIG. 12 (*b*))) is structured to have an outer surface shape that is essentially spherical (spherical or nearly spherical). Note that FIG. 12 (*a*) is a diagram wherein the first base is removed to view the interior of the fluid controlling device, facing from the upstream side toward the downstream side, and FIG. 12 (*b*) is a cross-sectional enlarged view along the section A-A in FIG. 12 (*a*). The other structures are identical to those of the example described above, and thus similar structures are indicated by assigning identical reference symbols, and detailed explanations thereof are omitted.

As illustrated in FIG. 12 (*a*), the driving force of the motor 20 is transmitted through the pinion 30 and the reduction gear 40 to the ring member 50, to cause it to rotate around the round cylindrical rib 12*e* of the second base 12.

Three groove portions 52, for guiding the three blade members 60, are formed in the ring member 50, having tracks that are directed from the inside toward the outside.

On the other hand, a protruding portion 82 that fits into, and is guided by, a groove portion 52 of the ring member 50 is provided in each blade member 60. The protruding portion 82 of the blade member 60 is fitted into the groove portion 52 of the ring member 50.

The ring member 50 is rotated by the driving force of the motor 20, changing the position of the groove portion 52 of the ring member 50, so that the protruding portion 82 that is guided by the groove portion 52 moves. Through this, the blade member 60 opens and closes the flow path that is formed by the opening portion 11*c* of the first base 11 and the opening portion 12*d* of the second base 12. Note that the flow path is connected to the pipe K in FIG. 1.

In the protruding portion 82 of the blade member 60, the sliding location 82*g* that slides within the groove portion 52 of the ring member 50 has an outer surface shape that is essentially spherical (spherical or nearly spherical) (referencing FIG. 12 (*b*)).

Because of this, even when the blade members 60 bear the pressure of the fluid that flows in the flow rate controlling device 1 and are inclined relative to the ring member 50 (referencing the double dotted lines in FIG. 12 (*b*)), the sliding location 82*g* of the protruding portion 82 of the blade member 60 has an essentially spherical outer surface, so it will contact the groove portion 52 of the ring member 50 in the same state, allowing it to slide.

As illustrated in FIG. 12 (*b*), the plurality of blade members 60 is provided within a plane that is perpendicular to the direction of flow of the fluid, between the circular wall portion 11*a* of the first base 11 and the ring member 50.

Figure 13:
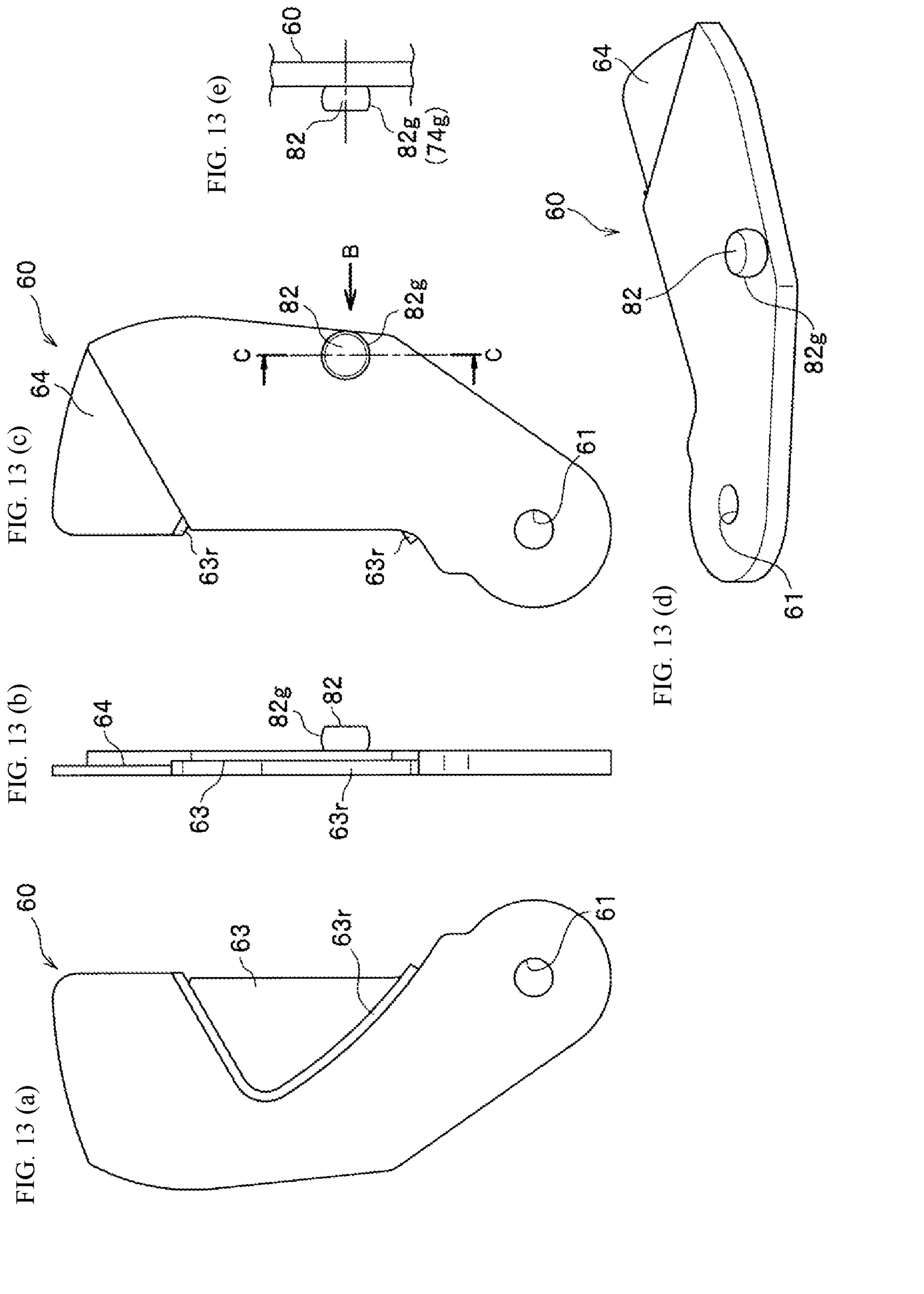
FIG. 13 (*a*) is a diagram wherein the blade member is viewed from the upstream side toward the downstream side of the fluid that passes through the flow rate controlling device.

FIG. 13 (*a*) is a diagram wherein the blade member 60 is viewed from the upstream side toward the downstream side of the fluid that passes through the flow rate controlling device 1. FIG. 13 (*b*) is a right side view of FIG. 13 (*a*). FIG. 13 (*c*) is a diagram wherein the blade member 60 is viewed at an angle facing from the downstream side to the upstream side of the flow of the fluid. FIG. 13 (*d*) is a diagram wherein the blade member 60 is viewed at an angle facing from the downstream side to the upstream side of the flow of the fluid. FIG. 13 (*e*) is a view of FIG. 13 (*c*) in the direction of the arrow B.

As illustrated in FIGS. 13 (*a*) and (*c*), an inserting portion 61, which is a recessed portion or a hole portion (which, in the present example, is a hole portion) is formed in the base end portion that will be the center of rotation for the blade member 60. A shaft portion 12*g* of the second base 12 (referencing FIG. 5) is inserted into the inserting portion 61, to be the axis of rotation for the blade member 60. That is, the blade member 60 rotates around the shaft portion 12*g*.

A triangular thin-wall portion 63 (referencing FIG. 13 (*a*)), which is thinner than other portions, is formed in the center portion of the blade member 60. The thin-wall portion 63 is formed in a shape wherein the upstream side part of the blade member 60 has been removed. A rubber 63*r*, for tight sealing, having a long shape, is provided along the center side edge portion of the thin-wall portion 63. The rubber 63*r* uses an elastic member such as silicone or rubber such as NBR (nitril-butadiene rubber), or the like, but the material does not matter insofar as it is able to form a tightly sealed state. Note that NBR is preferred because it can use an adhesive agent.

An essentially triangular thin-wall portion 64 (referencing FIG. 13 (*c*)) is formed thinner than the thickness at other locations at the tip end portion of the blade member 60. The thin-wall portion 64 is formed in a shape wherein a downstream side part of the blade member 60 has been removed. The thin-wall portions 63 and 64 are formed in shapes that can overlap, without the blade members 60 contacting each other, when the thin-wall portion 63 of one blade member 60 overlaps the thin-wall portion 64 of another blade member 60.

Here, when the flow rate controlling device 1 is closed, the thin-wall portion 64 of the tip end portion of one blade member 60 overlaps the thin-wall portion 63 of the center portion of another blade member 60 in the direction of the flow path that is formed from the opening portion 11*c* of the first base 11 and the opening portion 12*d* of the second base 12. At this time, the directions that are perpendicular to the direction of the flow path of the flow rate controlling device 1 are the directions in which the blade members 60 extend and retract, where, in an operation wherein the flow rate controlling device 1 is closed, the thin-wall portion 64 of the tip end portion of one blade member 60 contacting the thin-wall portion 63 of the center portion of another blade member 60 could cause breakage or damage. Given this, a gap is provided between the blade members 60 in an operation for closing the flow rate controlling device 1 through the blade members 60. However, when the flow rate controlling device 1 is closed, there is the need for the fluid not to leak, and there is a danger that the fluid will leak out from this gap.

Given this, a rubber 63*r* (referencing FIG. 13 (*a*)) for tight sealing is provided along the center side edge portion of the thin-wall portion 63 of the blade member 60.

Through this, when the flow rate controlling device 1 is closed, when the thin-wall portion 64 of the tip end portion of one blade member 60 overlaps the thin-wall portion 63 of the center portion of another blade member 60, the rubber 63*r* is compressed and deformed through being pressed by the tip end portion of the thin-wall portion 64 of the one blade member 60. The gap between the one blade member 60 and the other blade member 60 is closed by the rubber 63.

In this way, when the flow rate controlling device 1 is closed, the gap between the blade members 60 is tightly sealed by the rubber 63*r*, forming a tightly closed state for the flow rate controlling device 1.

<Protruding Portions 82 of the Blade Member 60>

As illustrated in FIG. 12 (*b*), convex protruding portions 82 that are fitted into and guided by groove portions 52 of the ring member 50 are provided on the downstream side of the blade members 60.

In a protruding portion 82, at least the sliding location 82*g*, which is the region that slides in the groove portion 52 of the ring member 50, as described above, is formed in an essentially spherical shape (a spherical shape or a nearly spherical shape).

Figure 14:
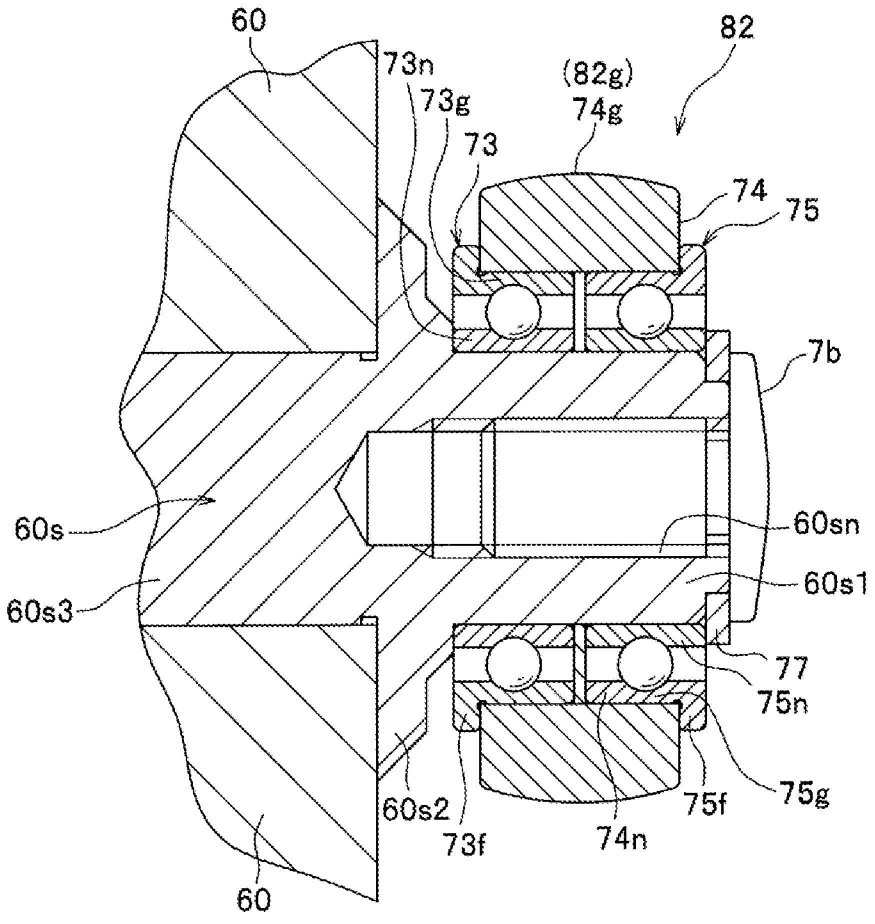
FIG. 14 is a cross-sectional view along the section C-C in FIG. 13 (*c*).
Figure 15:
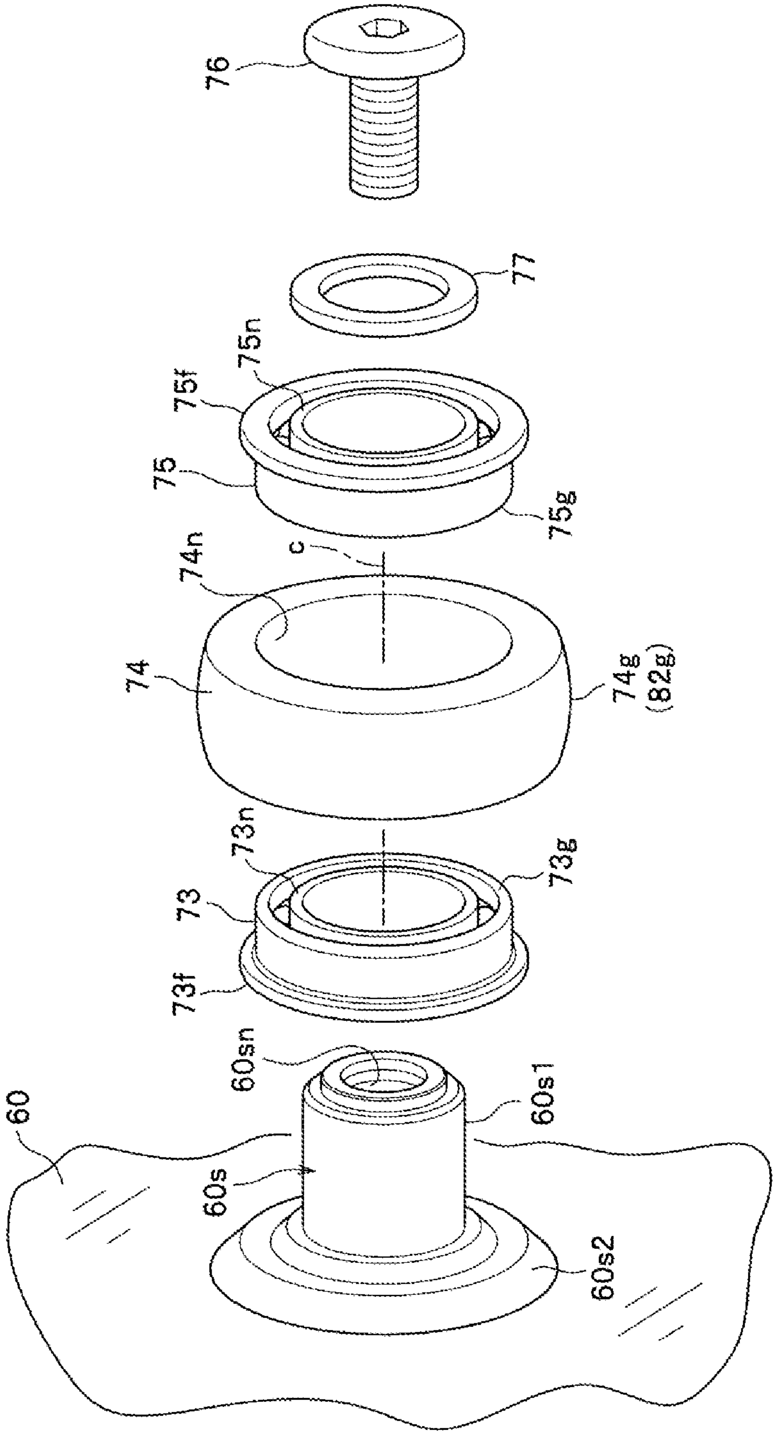
FIG. 15 is an exploded perspective diagram of the protruding portion of the blade member.

FIG. 14 is a cross-sectional view along the section C-C in FIG. 13 (*c*). FIG. 15 is an exploded perspective diagram of the protruding portion of the blade member.

The protruding portion 82 of the blade member 60 is structured from a boss portion 60*s*, a first ball bearing 73, a housing 74, a second ball bearing 75, and a screw 76 for securing. Note that a washer 77 is used on the screw 76 for securing.

The boss portion 60*s* is a member that is made out of a metal, such as aluminum, stainless steel, or the like, and is provided protruding from the downstream surface side of the blade member 60. The boss portion 60*s* has a bearing supporting portion 60*s*1 that has a circular column shape, a flanges 60*s*2 that has a disk shape, and a fixed base portion 60*s*3. The boss portion 60*s* is secured through, for example, the fixed base portion 60*s*3 being pressed into an extended surface on the downstream surface side of the blade member 60. Note that the boss portion 60*s* may be formed instead through die casting, or the like, integrally with the blade member 60, and the method of formation may be selected arbitrarily.

Female threads 60*sn* are provided in the axial direction end portion of the bearing supporting portion 60*s*1.

As illustrated in FIG. 15, the first and second ball bearings 73 and 75 are ball bearings with respective flanges 73*f* and 75*f*.

The housing 74 is a circular ring-shaped member that is made out of a metal such as aluminum or stainless steel. The outer peripheral surface 74*g* of the housing 74 that serves as the sliding location 82*g* of the protruding portion 82 has an essentially spherical shape (a spherical shape or a nearly spherical shape) (referencing FIGS. 13 (*b*), (*d*) and (*e*)).

Through this, the structure is one wherein there will be no change in the state of contact between the groove portion 52 of the ring member 50 and the sliding location 82*g* of the protruding portion 82 (the outer peripheral surface 74*g* of the housing 74) on the blade member 60 even if the blade member 60 is deflected by the pressure of the fluid during operation (referencing FIG. 12 (*b*)).

The screw 76 is, for example, a round-headed screw with a hexagonal socket. The fastening force can be increased through the screw 76 having a hexagonal socket.

The first ball bearing 73, the housing 74, the second ball bearing 75, and the screw 76 for securing are assembled as described below to the bearing supporting portion 60*s*1 of the boss portion 60*s*, to structure the protruding portion 82. Here the inner rings 73*n* and 75*n* of the respective first and second ball bearings 73 and 75 are the stationary sides, and the outer rings 73*g* and 75*g* are the movable sides.

The assembly to the bearing supporting portion 60*s*1 is carried out at follows (referencing FIG. 14 and FIG. 15).

First the inner ring 73*n* of the first ball bearing 73 is placed on the bearing supporting portion 60*s*1 of the boss portion 60*s*.

Following this, the inner peripheral surface 74*n* of the housing 74 wherein the outer peripheral surface 74*g* has an essentially spherical shape is pressed into the outer rings 73*g* of the first ball bearing 73.

Following this, the inner ring 75*n* of the second ball bearing 75 is slid onto the bearing supporting portion 60*s*1 of the boss portion 60*s*, and the outer ring 75*g* is pressed into the inner peripheral surface 74*n* of the housing 74.

Moreover, the screw 76 for securing is inserted through the second ball bearing 75, the housing 74, and in the first ball bearing 73, with the washer 77 therebetween, and secured to the bearing supporting portion 60*s*1 of the boss portion 60*s* using a hexagonal wrench, or the like. The protruding portion 82 illustrated in FIG. 14 is formed thereby. Note that preferably an adhesive agent for blocking the screw is applied to the screw 76, to prevent loosening.

<Opening and Closing the Flow Rate Controlling Device 1 According to Another Example>

Figure 16:
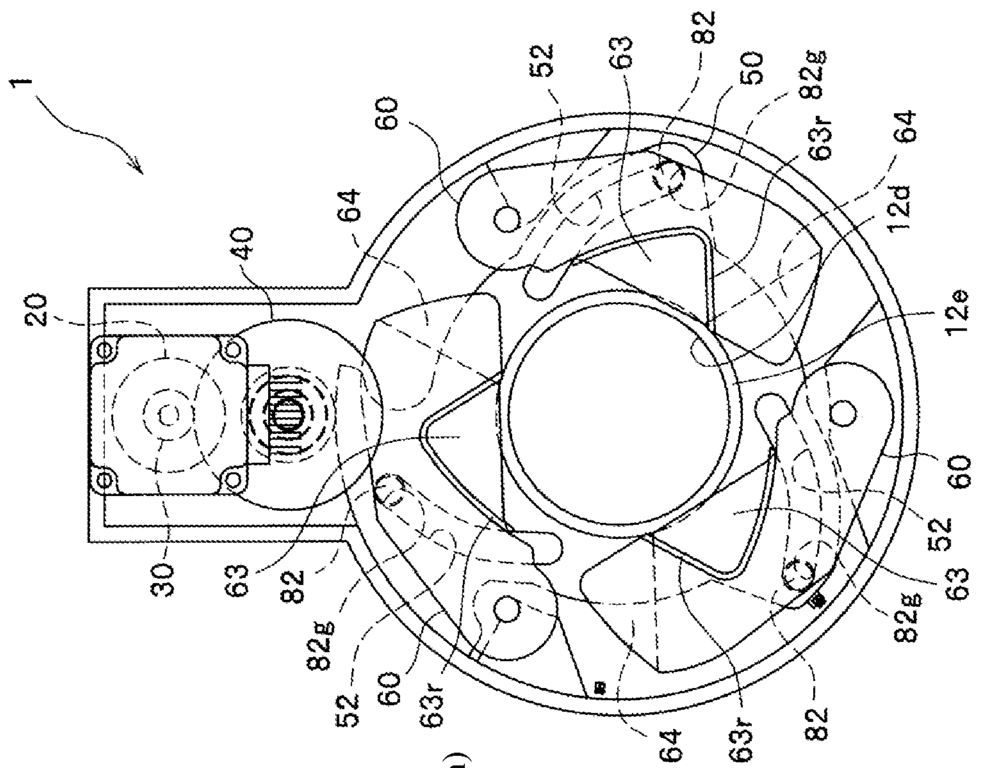
FIG. 16 (*a*) is a perspective diagram wherein a flow rate controlling device according to another example is viewed from a diagonal on the downstream side in the opened state, and FIG. 16 (*b*) is a diagram wherein the interior of the flow rate controlling device of the other example is viewed from the upstream side, with the first base of the upstream side removed, in an opened state.
Figure 16:
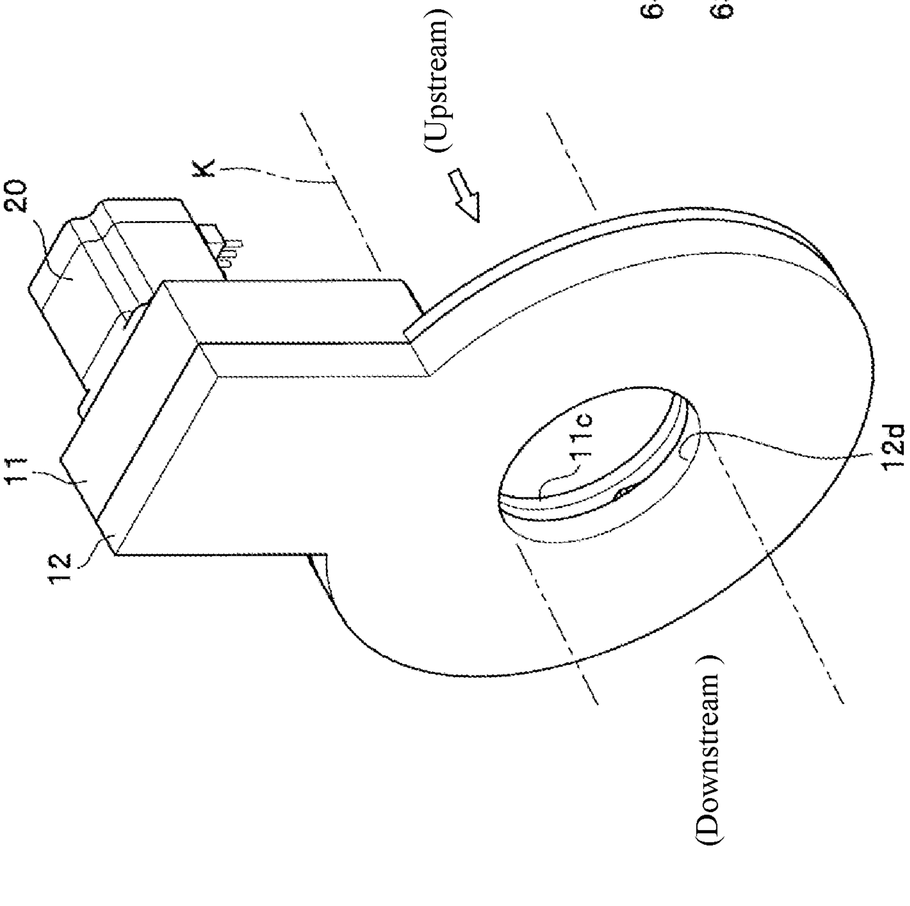

FIG. 16 (*a*) is a perspective diagram wherein a flow rate controlling device according to another example is viewed from a diagonal on the downstream side in the opened state, and FIG. 16 (*b*) is a diagram wherein the interior of the flow rate controlling device of the other example is viewed from the upstream side, with the first base of the upstream side removed, in an opened state.

Figure 17:
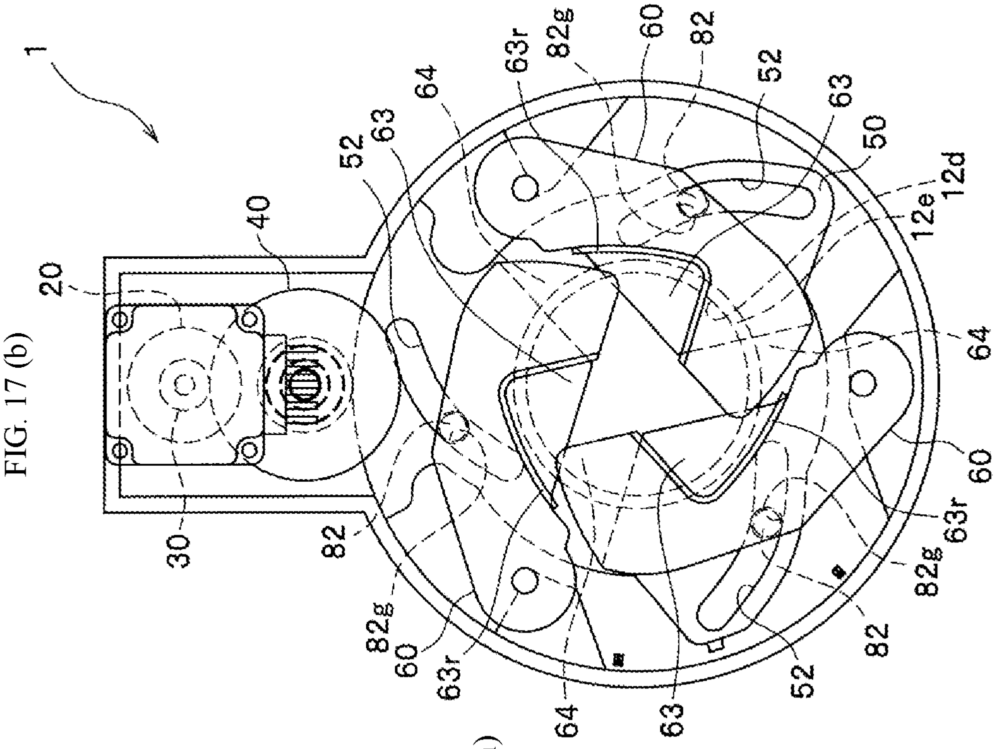
FIG. 17 (*a*) is a perspective diagram wherein a flow rate controlling device according to another example is viewed from a diagonal on the downstream side in a half-opened state, and FIG. 17 (*b*) is a diagram wherein the interior of the flow rate controlling device of the other example is viewed from the upstream side, with the first base of the upstream side removed, in a half-opened state.
Figure 17:
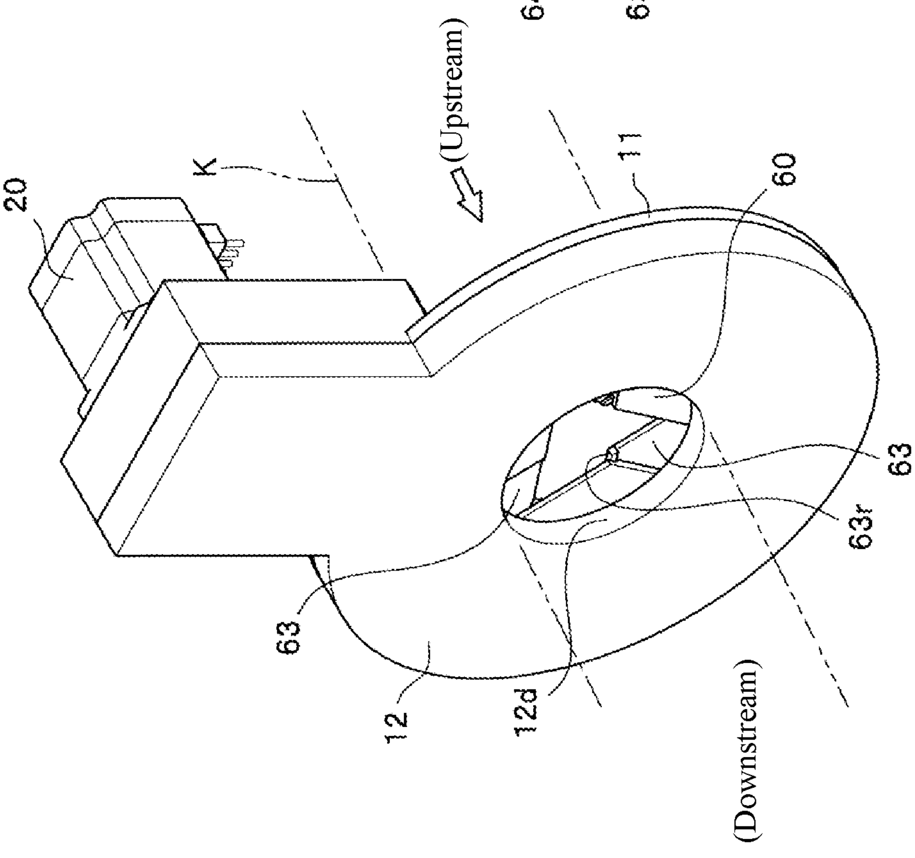

FIG. 17 (*a*) is a perspective diagram wherein a flow rate controlling device according to another example is viewed from a diagonal on the downstream side in the half-opened opened state, and FIG. 17 (*b*) is a diagram wherein the interior of the flow rate controlling device of the other example is viewed from the upstream side, with the first base of the upstream side removed, in the half-opened state.

Figure 18:
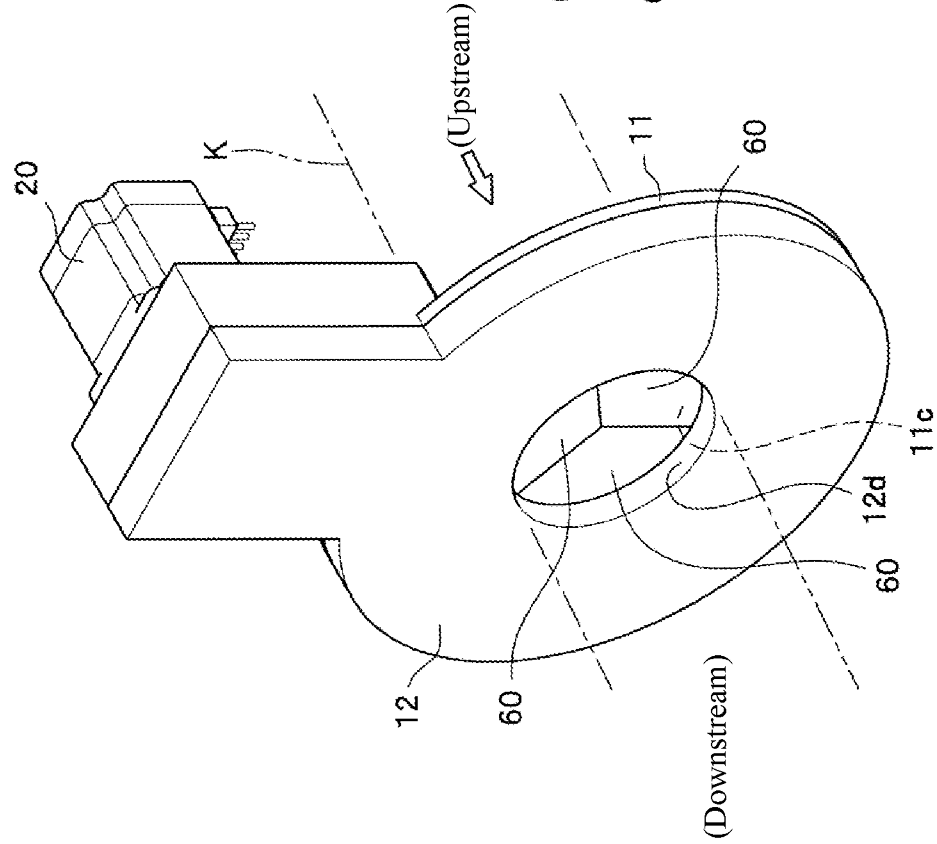
FIG. 18 (*a*) is a perspective diagram wherein a flow rate controlling device according to another example is viewed from a diagonal on the downstream side in a closed state, and FIG. 18 (*b*) is a diagram wherein the interior of the flow rate controlling device of the other example is viewed from the upstream side, with the first base of the upstream side removed, in a closed state.
Figure 18:
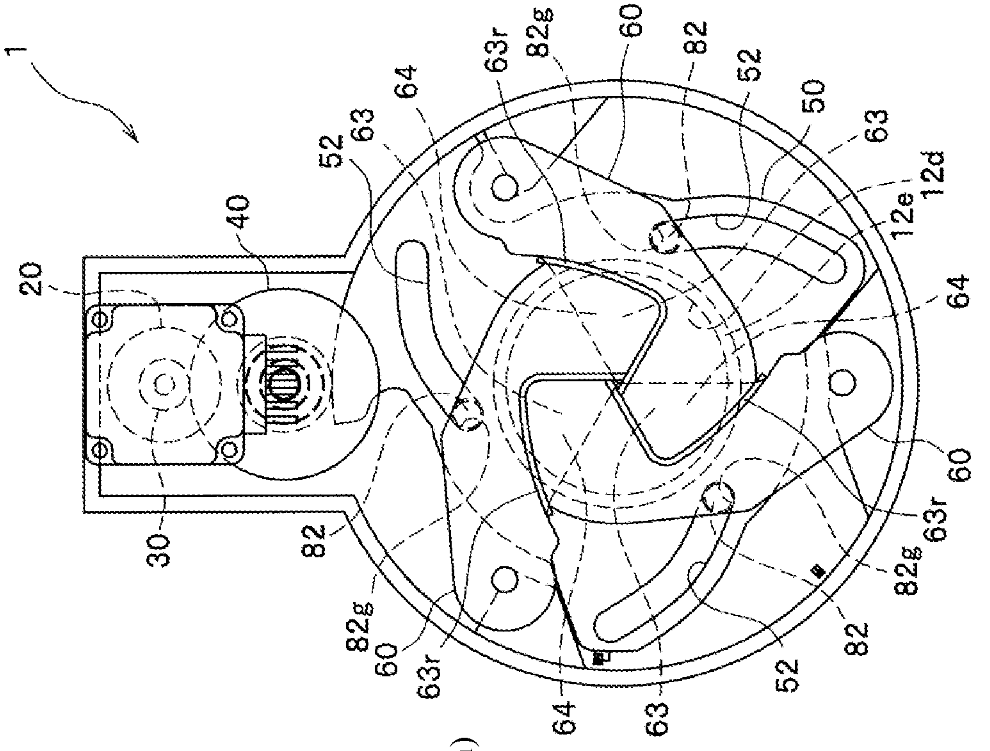

FIG. 18 (*a*) is a perspective diagram wherein a flow rate controlling device according to another example is viewed from a diagonal on the downstream side in the closed state, and FIG. 18 (*b*) is a diagram wherein the interior of the flow rate controlling device of the other example is viewed from the upstream side, with the first base of the upstream side removed, in the closed state.

In the state wherein the flow rate controlling device 1 is opened, illustrated in FIGS. 16 (*a*) and (*b*), the plurality of blade members 60 are moved to the outside of the opening portion 11*c* of the first base 11 and of the opening portion 12*d* of the second base 12, so that the flow path that is formed by the opening portion 11*c* and the opening portion 12*d* will be fully opened and completely clear. Because of this, there is no impediment in the flow path that connects the pipes K.

In the state wherein the flow rate controlling device 1 is half-open, illustrated in FIGS. 17 (*a*) and (*b*), the plurality of blade members 60 are moved toward the inside of the opening portion 11*c* of the first base 11 and the opening portion 12*d* of the second base 12, to place into a half-opened state the flow path that is formed by the opening portion 11*c* and the opening portion 12*d*. The flow path that is formed by the opening portion 11*c* and the opening portion 12*d* is connected to the pipes K.

At this time, the plurality of blade members 60 are deflected by the pressure in the direction of flow of the fluid that flows within the flow path. Accompanying this, the protruding portions 82 of the blade members 60 may be inclined, as indicated by the double-dotted lines in FIG. 12 (*b*), within the groove portions 52 of the ring member 50. At this time, the sliding locations 82*g* of the protruding portions 82 of the blade members 60 have an essentially spherical (spherical or nearly spherical) shape, and thus the state of contact between the sliding locations 82*g* of the protruding portions 82 of the blade members 60 and the groove portions 52 of the ring member 50 will be maintained in an identical state, even when the blade members 60 are deflected by the pressure of the fluid. As a result, the protruding portions 82 of the blade members 60 do not bite into the groove portions 52, but rather a state wherein the blade members 60 open and close smoothly is preserved.

In the state wherein the flow rate controlling device 1 is closed, illustrated in FIGS. 18 (*a*) and (*b*), the plurality of blade members 60 are moved in the direction of the inside of the opening portion 11*c* of the first base 11 and of the opening portion 12*d* of the second base 12, to place the flow path that is formed in the opening portion 11*c* and the opening portion 12*d* into the closed state.

At this time, as illustrated in FIG. 18 (*b*), the thin-wall portion 63 of the center portion of one blade member 60 overlaps with the thin-wall portion 64 at the tip end portion of another blade member 60. Given this, the rubber 63*r* of the thin-wall portion 63 of the center portion of the one blade member 60 is contacted by the tip end of the thin-wall portion 64 of the other blade member 60, and the rubber 63*r* is compressed and deformed. Through this, the gap between the one blade member 60 and the other blade member 60 is closed, enabling the flow path that is formed between the opening portion 11*c* and the opening portion 12*d* to be placed into a tightly closed state.

When the flow rate controlling device 1 is in the closed state, as was the case for the half-opened state, the plurality of blade members 60 may be deflected by the pressure in the direction of the flow of the fluid that flows in the flow path, as indicated by the double dotted line in FIG. 12 (*b*). With this, the protruding portion 82 of the blade member 60 is inclined in the groove portion 52 of the ring member 50. At this time, the sliding locations 82*g* of the protruding portions 82 of the blade members 60 have an essentially spherical (spherical or nearly spherical) shape, and thus the state of contact between the sliding locations 82*g* of the protruding portions 82 of the blade members 60 and the groove portions 52 of the ring member 50 will be maintained in an identical state, even when the blade members 60 are deflected by the pressure of the fluid. This maintains the smooth opening and closing of the blade member 60.

Given this alternate example, the sliding location 82*g* of the protruding portion 82 of the blade member 60 has an essentially spherical shape, enabling it to move freely within the groove portion 52 of the ring member 50, even when the blade member 60 has been deflected by the pressure in the direction of flow of the fluid that moves within the flow path. Because of this, the blade member 60 can operate smoothly regardless of the orientation of the blade member 60.

Moreover, because the sliding location 82*g* of the protruding portion 82 of the blade member 60 has an essentially spherical shape, this can improve the sliding performance within the groove portion 52 of the ring member 50. Because of this, this enables stable operation of the blade member 60, without being affected by the pressure of the fluid that flows within the flow path.

Consequently, improves the durability of the blade members 60 and the ring member 50, and, by extension, improves the reliability of operation of the flow rate controlling device 1 and the durability of the flow rate controlling device 1.

Because of this, this can improve the reliability of the flow rate controlling device 1.

Note that while in the example described above the explanation was for the sliding location 82*g* of the protruding portion 82 of the blade member 60 being essentially spherical, the effects of smooth and stable operation of the blade members 60 can be produced as long as the location 82*g* of contact with the groove portion 52 of the ring member 50 is curved. Note that the curvature preferably is essentially the same curvature, such as the "essentially spherical," described above (that is, has the same curvature or essentially the same curvature), to maintain the state of contact at an identical state when sliding.

While a case was illustrated wherein the rubber 63*r* was provided on the thin-wall portion 63 at the center portion of the blade member 60, it may be provided at at least any location that is a location of contact between one blade member 60 and another blade member 60 when the flow rate controlling device 1 closes, such as at the tip end portion of the thin-wall portion 64 of the blade member 60.

The flow rate controlling device A1 of the a further example is able to detect whether or not the opening and closing of the blade member 60 is carried out properly, and the attachment of the elastic member 63*e* for tight sealing between the blade members 60 when fully closed is strengthened.

The other structures are similar to those in the above example, where similar structures are indicated through assigning identical reference codes, and detailed explanations thereof are omitted.

Figure 19:
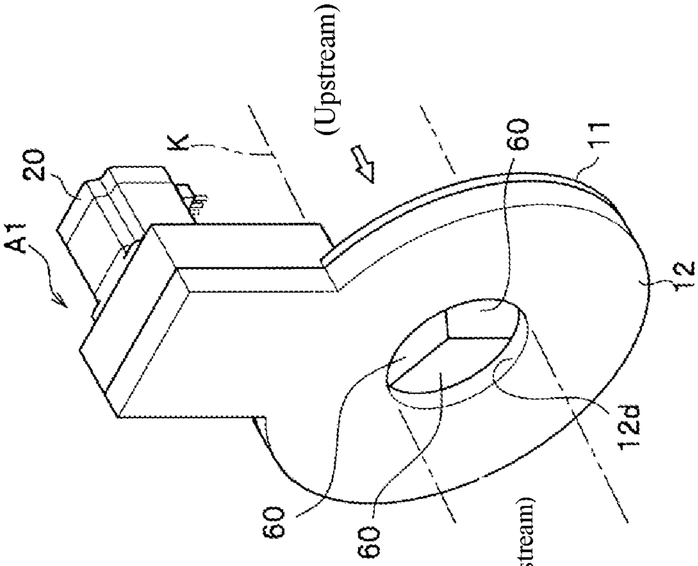
FIG. 19 (*a*) is a perspective diagram wherein a flow rate controlling device according to a further example is viewed from the upstream side of the pipe.
Figure 19:
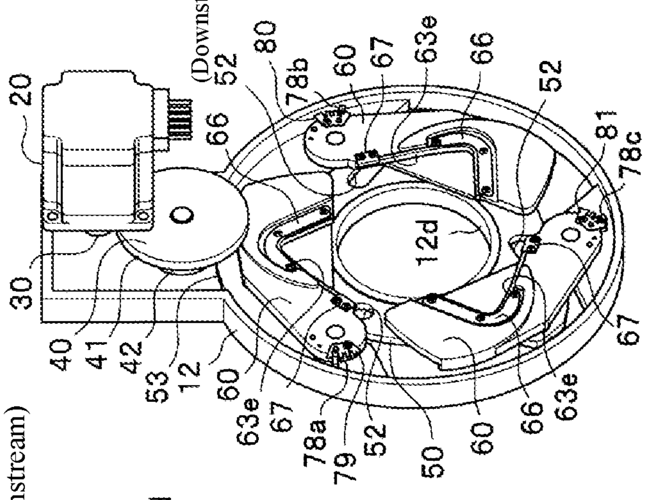
Figure 19:
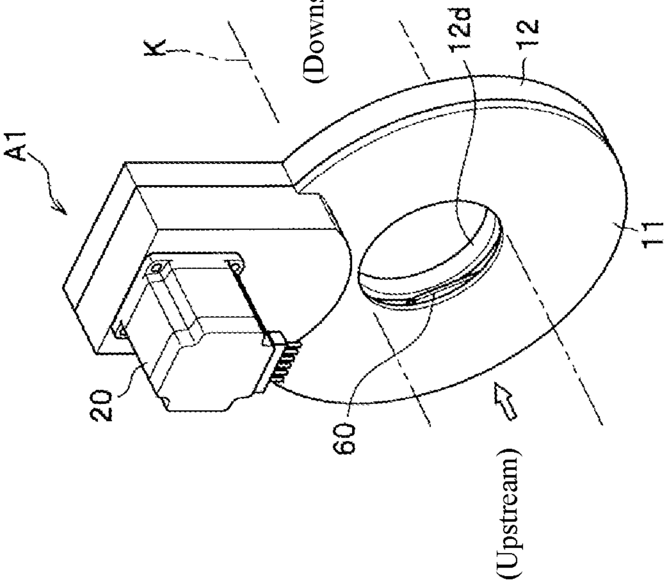

FIG. 19 (*a*) is a perspective diagram wherein a flow rate controlling device according to a further example is viewed from the upstream side of the pipe; FIG. 19 (*b*) is a perspective diagram wherein the flow rate controlling device according to the further example is viewed from the downstream side of the pipe; and FIG. 19 (*c*) is a perspective diagram wherein the interior of the flow rate controlling device according to the further example is viewed with the first base of the upstream side removed.

Figure 20:
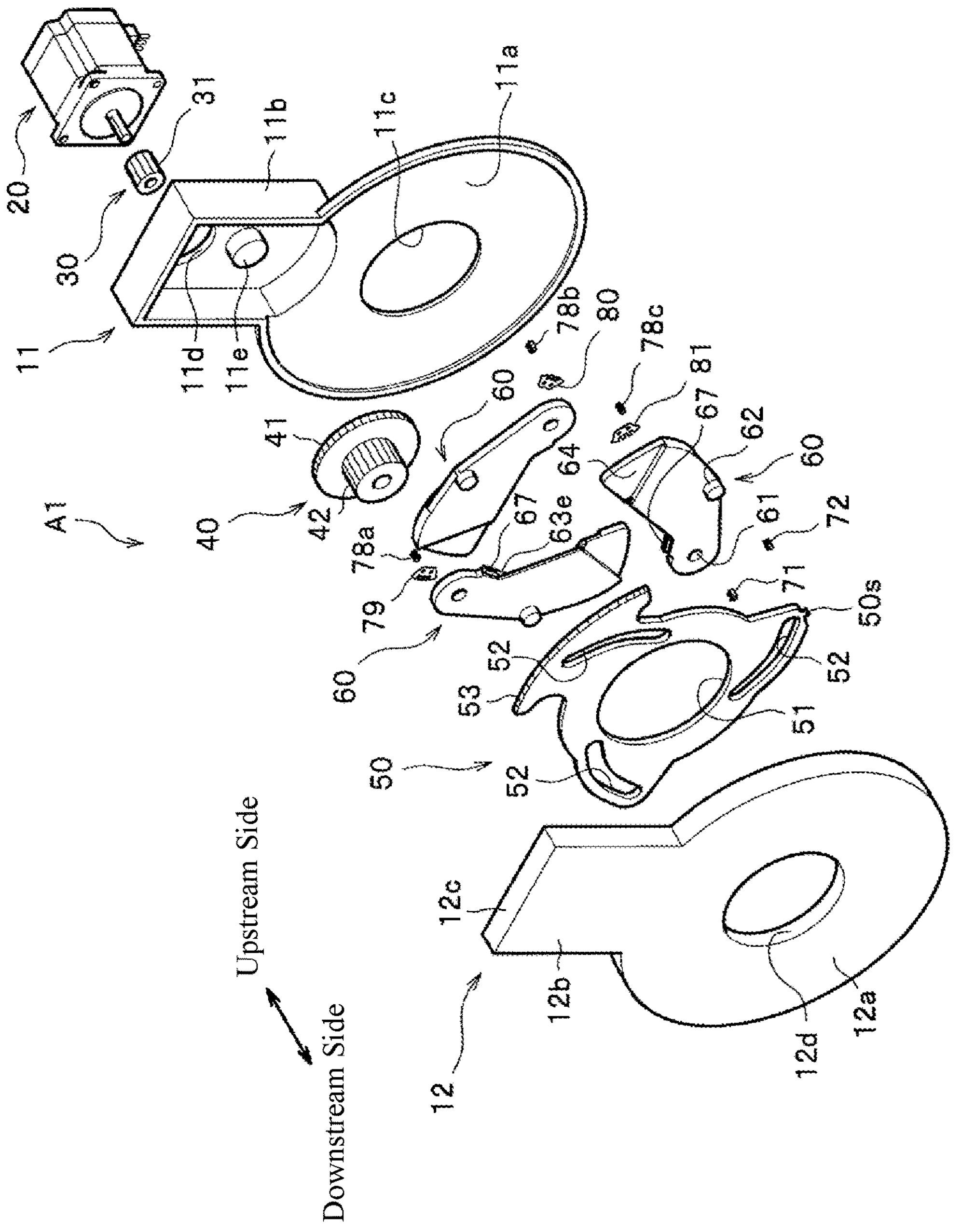
FIG. 20 is an exploded perspective diagram of a flow rate controlling device.

FIG. 20 is an exploded perspective diagram of a flow rate controlling device.

As illustrated in FIGS. 19 (*a*) and (*b*), the flow rate controlling device A1 in the further example, as with the flow rate controlling device 1 of the previous example, is provided in a pipe K for a fluid. Moreover, as illustrated in FIG. 19 (*a*), the blade members 60 can be moved to a state wherein the fluid that flows in the pipe K can pass therethrough, as a fully opened state, or, as illustrated in FIG. 19 (*b*), the blade members 60 can be moved so as to stop the fluid that is flowing in the pipe K, as a fully closed state. Moreover, the blade members 60 of the flow rate controlling device A1 are transitioned through intermediate states between the fully opened state in FIG. 19 (*a*) and the fully closed state of FIG. 19 (*b*).

The flow rate controlling device A1 is provided with a sensor 71 for detecting the fully opened state of the blade members 60 (hereinafter termed the "origin sensor 71") (referencing FIG. 27 (*b*)), and a sensor 72 for detecting the fully closed state of the blade members 60 (hereinafter termed the "end sensor 72") (referencing FIG. 30 (*b*)), along with sensors 78*a*, 78*b*, and 78*c* (referencing FIG. 19 (*c*)) for detecting the fully opened states and fully closed states of the three respective blade members 60.

Detected gears 79, 80, and 81 for detection, by the sensors 78*a*, 78*b*, and 78*c*, of the positions of the respective blade members 60, having recessed portions that are light-passing portions and protruding portions that are light-blocking portions, are provided on the three blade members 60. Note that in this further example, a case wherein the detected gears 79, 80, and 81 are provided as separate units from the respective blade members 60 is explained as an example, but the detected gears 79, 80, and 81 may instead be formed integrally with the blade members 60.

In each of the blade members 60, there is a structure on the first thin-wall portion 63*a* (referencing FIG. 24 (*c*)) that prevents the elastic member 63*e* from coming off of the blade member 60.

Figure 21:
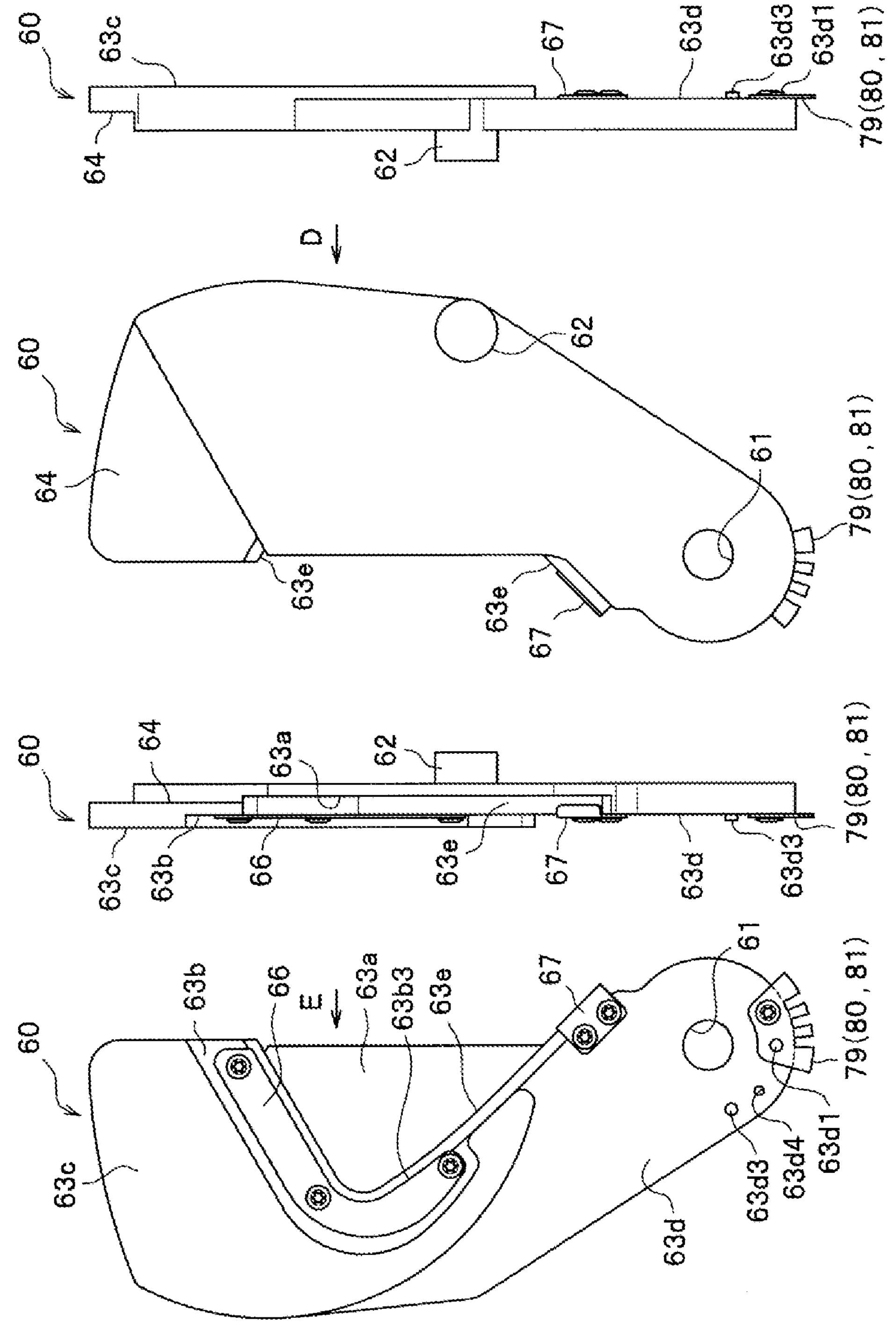
FIG. 21 (*a*) is a diagram wherein a blade member is viewed from the upstream side.

FIG. 21 (*a*) is a diagram wherein a blade member is viewed from the upstream side; FIG. 21 (*b*) is a view of FIG. 21 (*a*) in the direction of the arrow E; FIG. 21 (*c*) is a diagram of the blade member viewed from the downstream side; and FIG. 21 (*d*) is a view of the blade member viewed in the direction of the arrow F.

Figure 22:
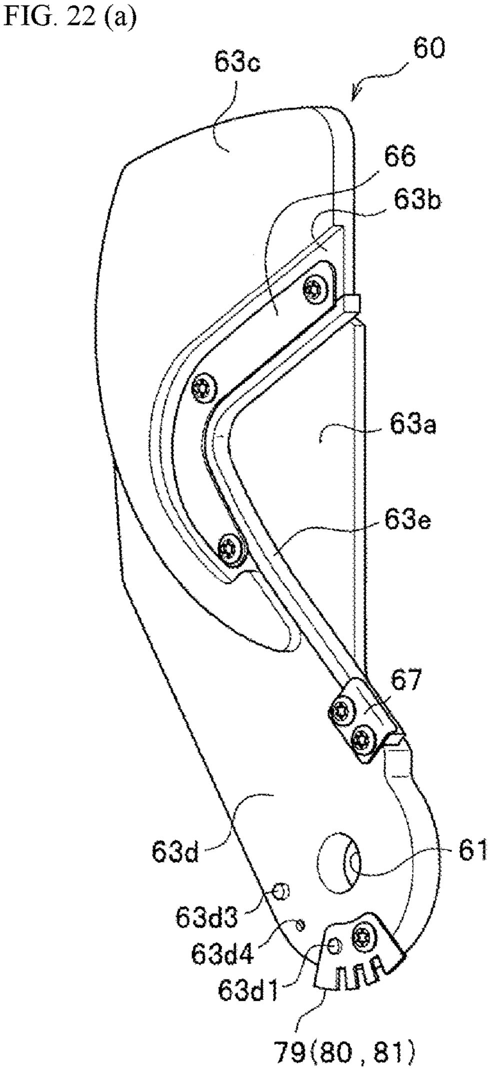
FIG. 22 (*a*) is a perspective diagram wherein a blade member is viewed from the upstream side.
Figure 22:
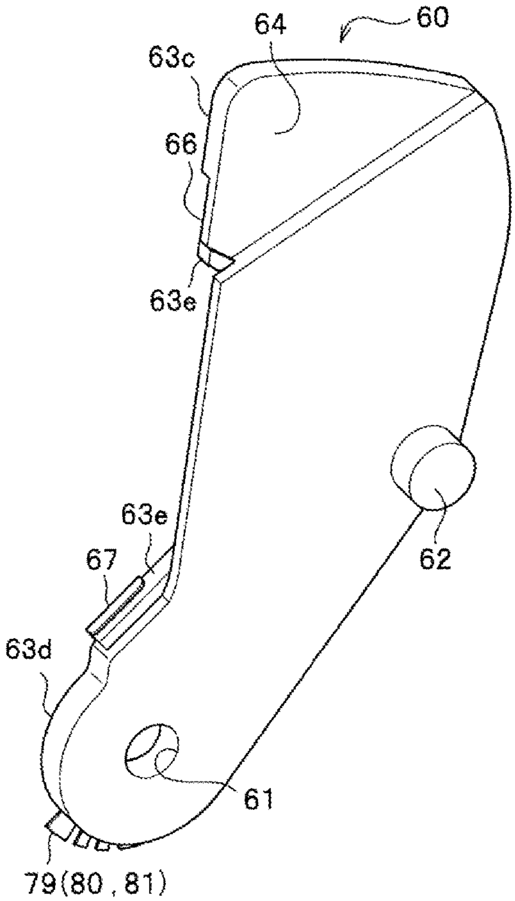

FIG. 22 (*a*) is a perspective diagram wherein a blade member is viewed from the upstream side; and FIG. 22 (*b*) is a perspective diagram of the blade member viewed from the downstream side.

As illustrated in FIG. 21 (*a*) and FIG. 22 (*a*), an elastic member 63*e* for sealing the gap between blade members 60 when the blade members 60 are fully closed, as illustrated in FIG. 19 (*b*), is provided on each blade member 60. A first retaining member 66 and a second retaining member 67 are attached to each blade member 60 so as to function to prevent the elastic member 63*e* from coming off of the blade member 60.

The first retaining member 66 and the second retaining member 67 are press-molded products. Screws n are inserted into respective screw inserting holes in the first retaining member 66 and the second retaining member 67, and screwed into female threads of the blade member 60, to cause the respective ends of the elastic member 63*e* to be covered by the first retaining member 66 and the second retaining member 67, to thereby prevent the elastic member 63*e* from coming off of the blade member 60.

Figure 23:
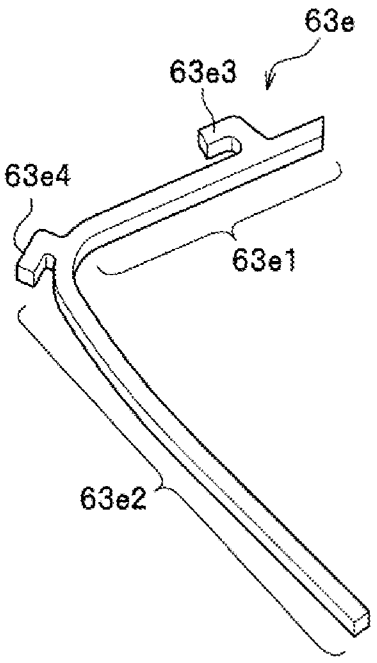
FIG. 23 (*a*) is a perspective diagram of an elastic member that is provided along a first thin-wall portion of the upstream side of the blade member.
Figure 23:
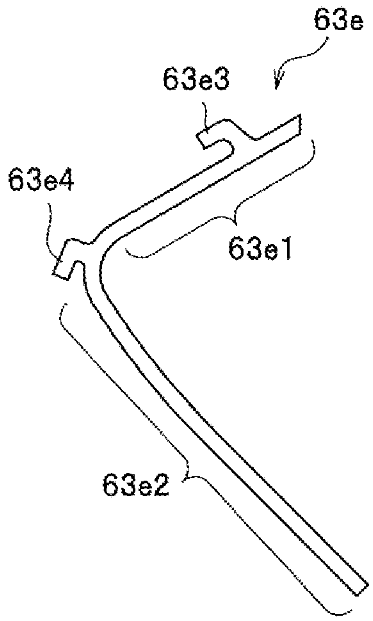

FIG. 23 (*a*) is a perspective diagram of an elastic member that is provided along a first thin-wall portion of the upstream side of the blade member; and FIG. 23 (*b*) is a diagram of the elastic member, viewed from the upstream side.

The elastic member 63*e* is a sealing member having elasticity, made from a rubber such as NBR.

The elastic member 63*e* has a V shape that has a rectangular cross-sectional shape, as illustrated in FIG. 23 (*a*). Specifically, the elastic member 63*e* has a short arm portion 63*e*1 and a long arm portion 63*e*2 that is bent from an end portion of the short arm portion 63*e*1.

A first hook-shaped portion 63*e*3 and a second hook-shaped portion 63*e*4, for engaging the blade member 60, are formed, extending toward outside, on the elastic member 63*e*.

The first hook-shaped portion 63*e*3 is formed extending toward the outside from the short arm portion 63*e*1. The second hook-shaped portion 63*e*4 is formed, extending toward the outside, from the connecting portion between the short arm portion 63*e*1 and the long arm portion 63*e*2.

Note that the structure for preventing the elastic member 63*e* from coming off of the blade member 60 may be a T-shaped structure, or the like, that is able to engage with the blade member 60, rather that being the first hook-shaped portion 63*e*3 and the second hook-shaped portion 63*e*4, and may have a shape other than a hook shape.

FIG. 24 (*a*) and FIG. 24 (*b*) are diagrams, viewed from the upstream side and the downstream side, respectively, in a state wherein the elastic member, the first retaining member, and the second retaining member have been removed; and FIG. 24 (*c*) is a diagram from the upstream side in a state wherein the elastic member is attached to the blade member.

The plurality of blade members 60 are members made from a metal (for example, aluminum), for opening and closing the flow path, and may be formed through, for example, aluminum die casting.

A plurality of blade members 60 is provided between a circular wall portion 11*a* of a first base 11 (referencing FIG. 20) and a ring member 50, provided within a plane that is essentially perpendicular to the direction in which the fluid passes (referencing FIG. 19 (*a*)).

A first thin-wall portion 63*a* that forms an essentially triangular shape is formed in a center portion of the upstream side of the blade member 60, as illustrated in FIG. 24 (*a*). In the first thin-wall portion 63*a*, the upstream side part of the blade member 60 is removed. A second thin-wall portion 63*b*, which is thicker than the first thin-wall portion 63*a*, is formed with a V shape around the periphery of the first thin-wall portion 63*a* on the upstream side of the blade member 60. A thick wall portion 63*c* is formed at the tip end portion of the blade member 60, to the outside of the second thin-wall portion 63*b*.

A third thin-wall portion 63*d* of essentially the same thickness as that of the second thin-wall portion 63*b* is formed on the base end portion on the upstream side of the blade member 60.

As illustrated in FIG. 24, the second thin-wall portion 63*b* is provided with a first hook-shaped recessed portion 63*b*1 that is a hook-shaped recessed portion into which the first hook-shaped portion 63*e*3 of the elastic member 63*e* is fitted, and a second hook-shaped recessed portion 63*b*2 that is a hook-shaped recessed portion into which the second hook-shaped portion 63*e*4 of the elastic member 63*e* is fitted, are provided in the second thin-wall portion 63*b*.

The first hook-shaped recessed portion 63*b*1 has a size that is essentially identical to, or slightly larger than, the first hook-shaped portion 63*e*3 of the elastic member 63*e* (referencing FIG. 23 (*a*)). The second hook-shaped recessed portion 63*b*2 has a size that is essentially identical to, or slightly larger than, the second hook-shaped portion 63*e*4 of the elastic member 63*e*.

First and second positioning bosses 63*d*1 and 63*d*3, which are inserted into positioning holes 79*b* of a detected gear 79 (or 80 or 81) (referencing FIG. 25), and first and second female threads 63*d*2 and 63*d*4, into which are screwed screws for securing the detected gear 79 (or 80 or 81) (referencing FIG. 25) are formed in the third thin-wall portion 63*d*. Note that the first positioning boss 63*d*1 and the first female thread 63*d*2 form a pair, and the second positioning boss 63*d*3 and the second female thread 63*d*4 form a pair. In this way, the provision of a plurality of combinations of positioning bosses and female threads for the blade members 60 enables the detected gear 79 (or 80 or 81) to be attached in different positions on the blade member 60.

As illustrated in FIG. 24 (*b*), a thin-wall portion 64 that forms an essentially triangular shape is form at a downstream side tip end portion of the blade member 60. The thin-wall portion 64, a downstream side part of the blade member 60 is removed. The shapes of the first thin-wall portions 63*a* on the upstream side of the blade members 60 and of the thin-wall portions 64 on the downstream side of the blade members 60 are formed so as to enable the first thin-wall portion 63*a* of one blade member 60 and the thin-wall portion 64 of another blade member 60 to overlap, without the blade members 60 contacting each other when overlapping.

Given the structure set forth above, as illustrated in FIG. 24 (*c*), the first hook-shaped portion 63*e*3 and the second hook-shaped portion 63*e*4 of the elastic member 63*e* are fitted respectively into the first hook-shaped recessed portion 63*b*1 and the second hook-shaped recessed portion 63*b*2 of the second thin-wall portion 63*b* on the upstream side of the blade members 60 and an adhesive agent is used to bond the elastic member 63*e* along the edge portion 63*a*1 of the first thin-wall portion 63*a*, the standing wall surface 63*b*3 of the second thin-wall portion 63*b*, the standing wall surface 63*c*1 of the thick wall portion 63*c*, the standing wall surface 63*d*5 of the third thin-wall portion 63*d*, and the like.

Thereafter, the first retaining member 66 and the second retaining members 67 are screwed to the blade member 60. This makes it possible to prevent reliably the elastic member 63*e* from coming off of the blade member 60.

Figure 25:
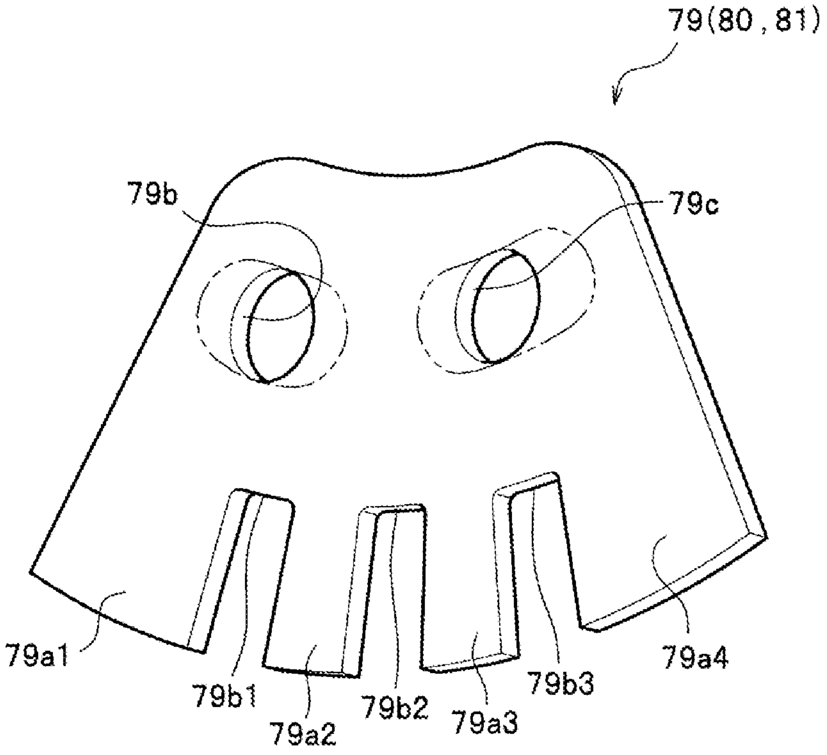
FIG. 25 is a perspective diagram of a detected gear, for detecting a rotational position of a blade member.

FIG. 25 is a perspective diagram of a detected gear for detecting the rotational position of the blade member.

The detected gears 79, 80, and 81 have identical structures, so only the detected gear 79 will be explained, and explanations for the detected gears 80 and 81 will be omitted.

In the detected gear 79, a first protruding portion 79*a*1, a second protruding portion 79*a*2, a third protruding portion 79*a*3, and a fourth protruding portion 79*a*4 protrude. Respective first recessed portion 79*b*1, second recessed portion 79*b*2, and third recessed portion 79*b*3 are provided recessed between these first protruding portion 79*a*1, second protruding portion 79*a*2, third protruding portion 79*a*3, and fourth protruding portion 79*a*4.

A positioning hole 79*b* is formed on the base side of the detected gear 79, and an inserting hole 79*c* for a screw n1 for securing the detected gear 79 (referencing FIG. 26) is formed in the detected gear 79. Note that the positioning hole 79*b* and the inserting hole 79*c* should each be formed as elongated holes that are long in the direction of rotation of the blade member 60 (as indicated by the double dotted lines in FIG. 25), as position adjusting means for adjusting the position of the blade member 60 when fully closed. Note that full closure of the blade member 60 is achieved through elastic deformation of the elastic member 63*e*. Moreover, due to component tolerance, assembly tolerance, and the like, there is a danger that the fully closed states of the blade members 60 will vary from one flow rate controlling device A1 to another.

Given this structure, the positioning boss 63*d*1 (referencing FIG. 24 (*a*)) (or 63*d*3) of the upstream side base end portion of the blade member 60 is inserted into the positioning hole 79*b* of the detected gear 79, and also the inserting hole 79*c* of the detected gear 79 is aligned with the female threads 63*d*2 (or 63*d*4) of the upstream side base end portion of the blade member 60. Following this, the screw n1 is inserted into the inserting hole 79*c*, and screwed into the female threads 63*d*2 (or 63*d*4), to secure the detected gear 79 to the upstream side base end portion of the blade member 60 (referencing FIG. 22 (*a*)).

Note that, at this time, preferably the positions of the detected gears 79, 80, and 81 for detecting the full closure of the blade members 60 are adjusted using the elongated holes (indicated by the double dotted lines in FIG. 25).

<Sensors 78*a*, 78*b*, and 78*c*>

Photointerrupters that use infrared radiation, for example, are used in the sensors 78*a*, 78*b*, and 78*c* for detecting the movement of the blade members 60 (the detected gears 79, 80, and 81). Note that while these may instead be photointerrupters that use visible light, in the case of visible light, other light may be received instead, so preferably photointerrupters that use infrared radiation are used.

Conversely, the sensors 78*a*, 78*b*, and 78*c* may use sensors other than photointerrupters, such as magnetic sensors or reflective sensors that use reflecting plates; however, a photointerrupter is most preferred because the boundary between blocking light and passing light can be detected clearly in the case of a photointerrupter.

The beams of infrared radiation of the photointerrupters of the sensors 78*a*, 78*b*, and 78*c* being blocked or passing through the respective first protruding portion 79*a*1, first recessed portion 79*b*1, second protruding portion 79*a*2, second recessed portion 79*b*2, third protruding portion 79*a*3, third recessed portion 79*b*3, or fourth protruding portion 79*a*4 is detected, making it possible to detect whether or not the blade member 60 of the flow rate controlling device A1 is operating properly to be fully opened, fully closed, or in an intermediate state between fully opened and fully closed.

Figure 26:
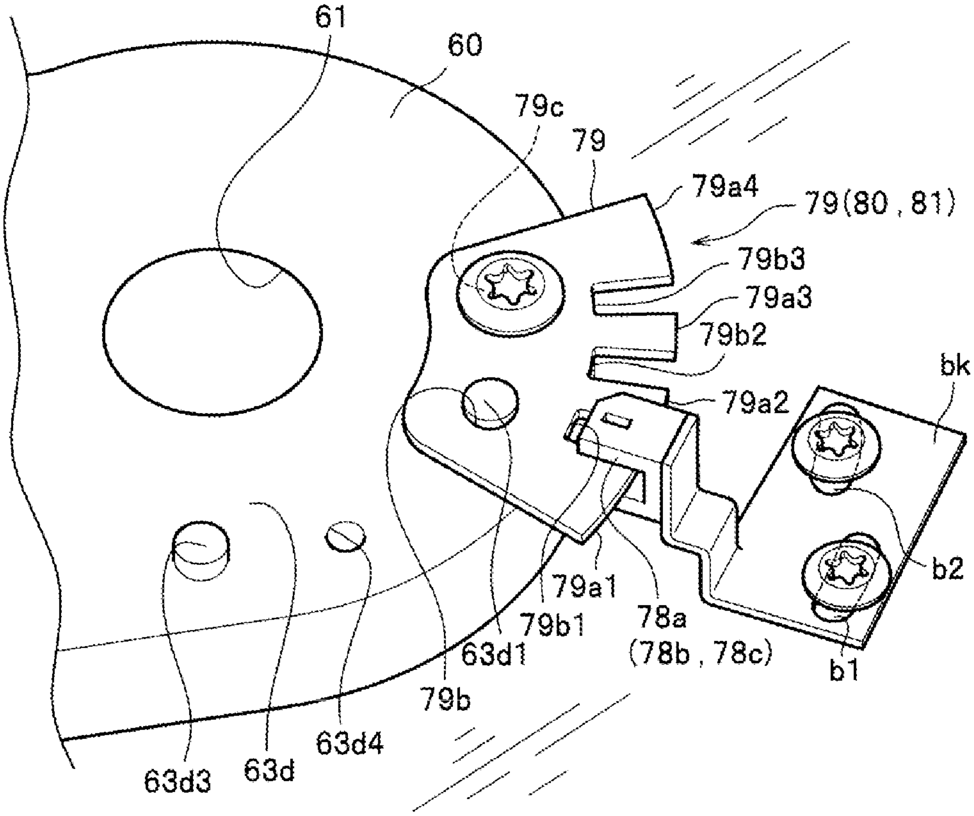
FIG. 26 is a perspective diagram illustrating a state wherein a sensor is attached.

FIG. 26 is a perspective diagram illustrating the state wherein a sensor is attached.

Note that preferably the brackets bk for securing the individual sensors 78*a*, 78*b*, and 78*c* are structured so as to enable adjustment in the direction of rotation of the individual blade member 60, to enable the position for detecting full closure of the blade member 60 by adjusting the position at which the bracket bk is attached. For example, as illustrated in FIG. 26, the structure may be one wherein the holes b1 and b2 for inserting the screws for securing the brackets bk are shaped as elongated holes that are elongated in the direction of rotation of the blade member 60, to enable adjustment of the position at which the full closure of the blade member 60 is detected.

<Detecting Opening/Closing of the Blade Member 60 of the Flow Rate Controlling Device A1>

The detection of the opening and closing of the blade member 60 using the sensors 78*a*, 78*b*, and 78*c* of the flow rate controlling device A1 will be explained next.

Figure 27:
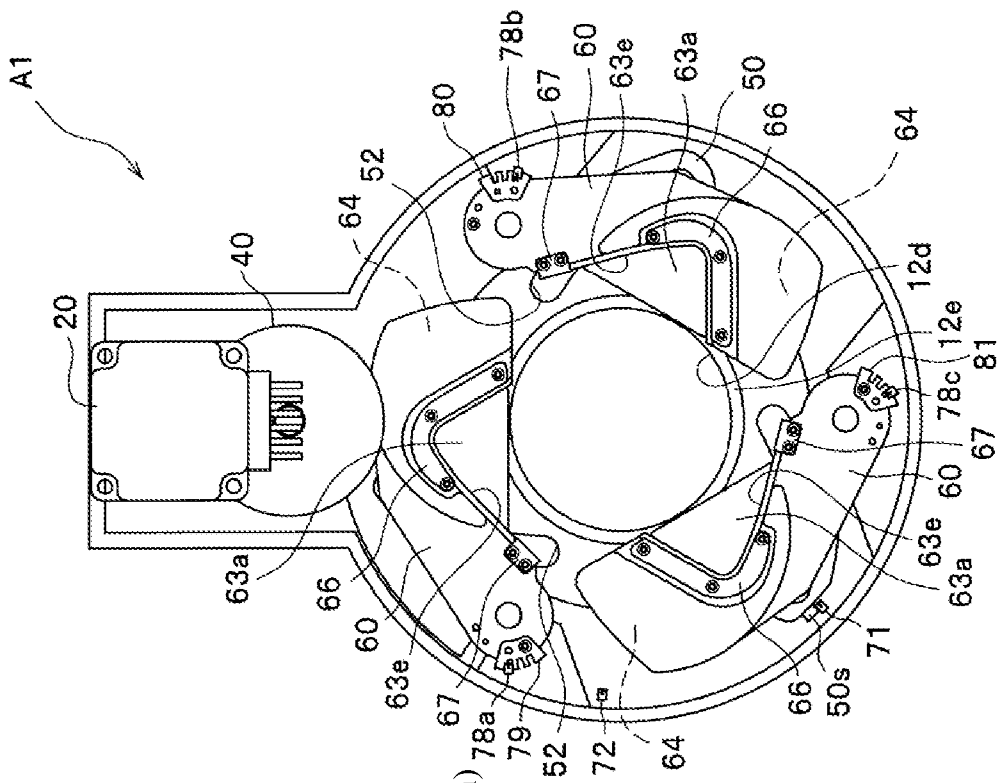
FIG. 27 (*a*) is a perspective diagram illustrating a fully opened state of a flow rate controlling device.
Figure 27:
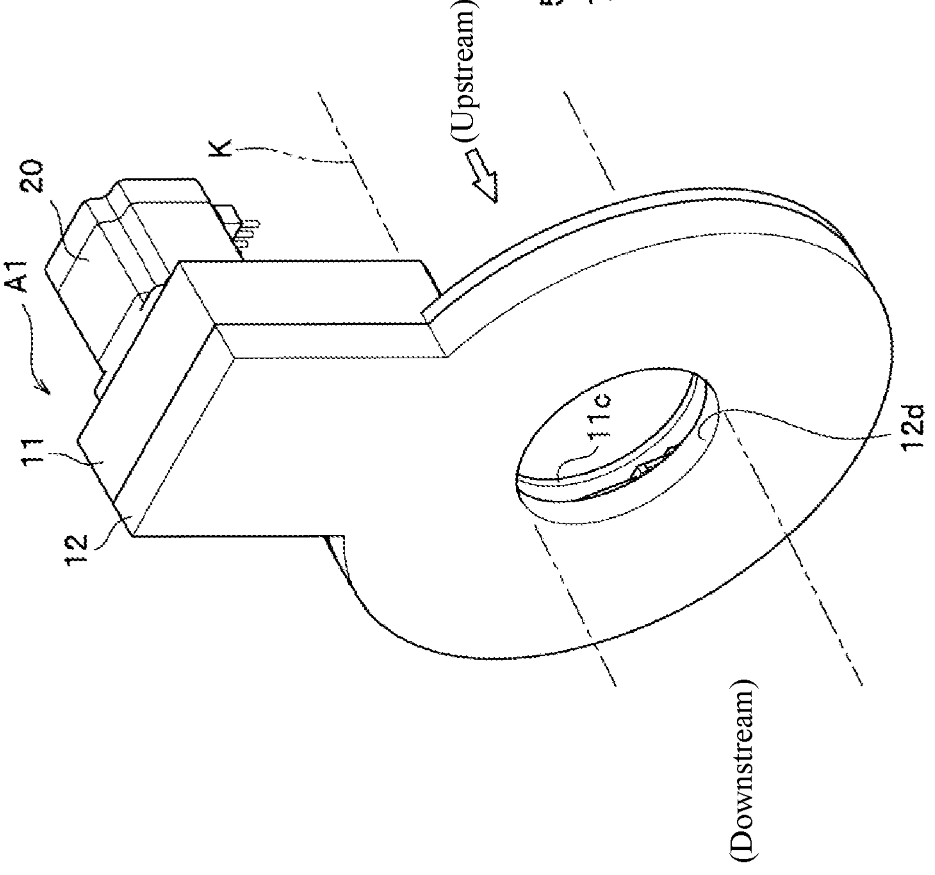
Figure 28:
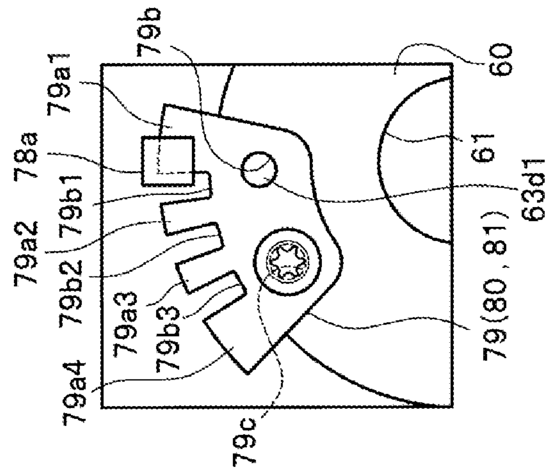
FIG. 28 (*a*) is a plan view showing the positional relationship between the detected gear and the sensor when the blade members are in the fully opened state.
Figure 28:
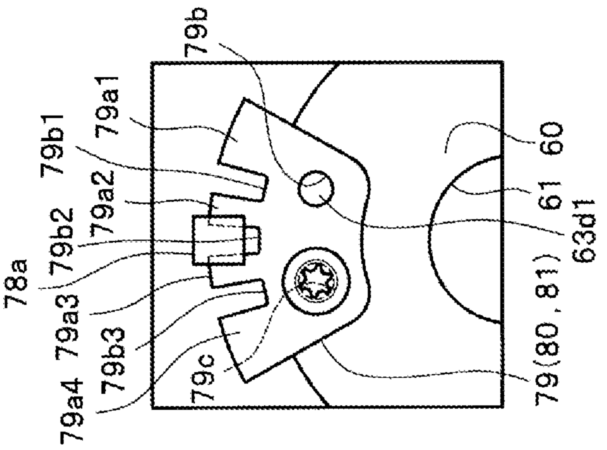
Figure 28:
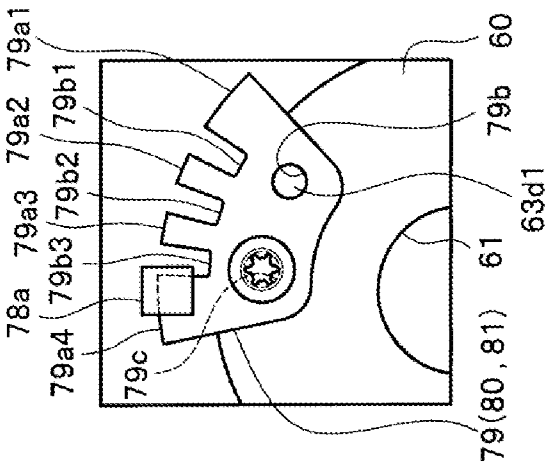

FIG. 27 (*a*) is a perspective diagram illustrating a fully opened state of a flow rate controlling device; and FIG. 27 (*b*) is a plan view showing the interior of the flow rate controlling device from the upstream side with the first base removed when the flow rate controlling device is in a fully opened state. FIGS. 28 (*a*), (*b*), and (*c*) are plan views showing the positional relationships between the detected gear and the sensor when the blade members are, respectively, in the fully opened state, an intermediate state between the fully opened state and the fully closed state, and the fully closed state.

When in the fully opened state of the flow rate controlling device A1, illustrated in FIG. 27 (*a*), the origin sensor 71 for detecting the position of the driving ring 50 will have the light blocked by the blocking plate 50*s* of the ring member 50, as illustrated in FIG. 27 (*b*). On the other hand, in the fully closed state of the flow rate controlling device A1, the end sensor 72 for detecting the position of the driving ring 50 will be in a light-conductive state, rather than the light being blocked by the blocking plate 50*s* of the ring member 50.

When in the fully closed state of the flow rate controlling device A1, the sensor 78*a* for detecting the position of the blade member 60, as illustrated in FIG. 28 (*a*), will be in a state wherein the light is blocked by the first protruding portion 79*a*1 of the detected gear 79. This is true also for the relationship between the sensor 78*b* and the detected gear 80 of the blade member 60, and the relationship between the sensor 78*c* and the detected gear 81 of the blade member 60.

Figure 29:
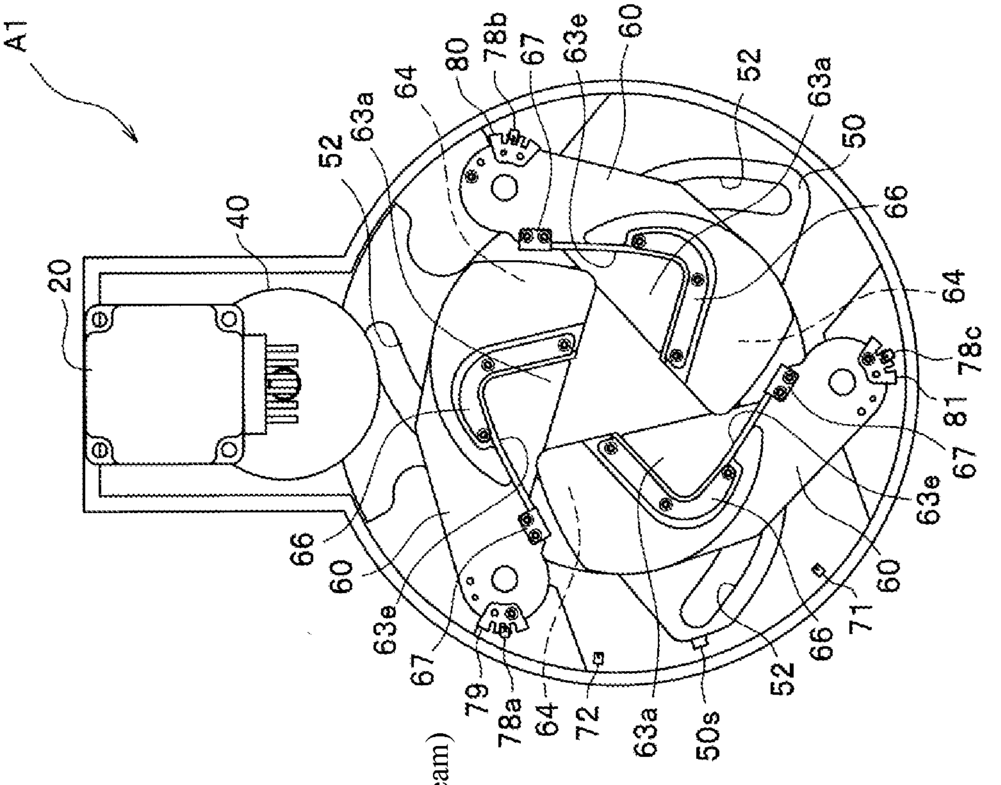
FIG. 29 (*a*) is a perspective diagram illustrating the flow rate controlling device in an intermediate state between fully opened and fully closed.
Figure 29:
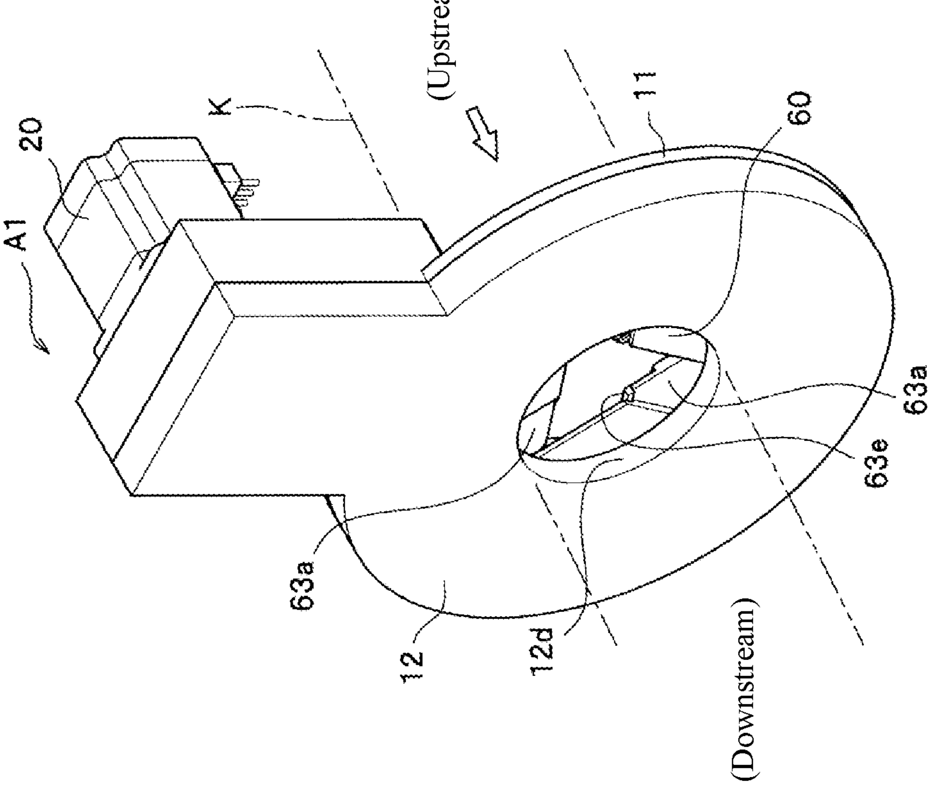

FIG. 29 (*a*) is a perspective diagram illustrating the flow rate controlling device in an intermediate state between fully opened and fully closed; and FIG. 29 (*b*) is a plan view showing the interior of the flow rate controlling device, from the upstream side, with the first base removed, with the flow rate controlling device in an intermediate state between fully opened and fully closed.

When in the intermediate state between the fully opened state and the fully closed of the flow rate controlling device A1, illustrated in FIG. 29 (*a*), the origin sensor 71 and the end sensor 72 for detecting the position of the driving ring 50 will not have the light blocked by the blocking plate 50*s* of the ring member 50, but rather it will allow light to pass, as illustrated in FIG. 29 (*b*).

On the other hand, the sensor 78*a* for detecting the position of the blade member 60 will either be in a state wherein light is conducted through the second recessed portion 79*b*2 or first recessed portion 79*b*1, or third recessed portion 79*b*3, or in a state wherein the light is blocked by the second protruding portion 79*a*2 or the third protruding portion 79*a*3 of the detected gear 79, as illustrated in FIG. 28 (*b*). This is true also for the relationship between the sensor 78*b* and the detected gear 80 of the blade member 60, and the relationship between the sensor 78*c* and the detected gear 81 of the blade member 60.

Figure 30:
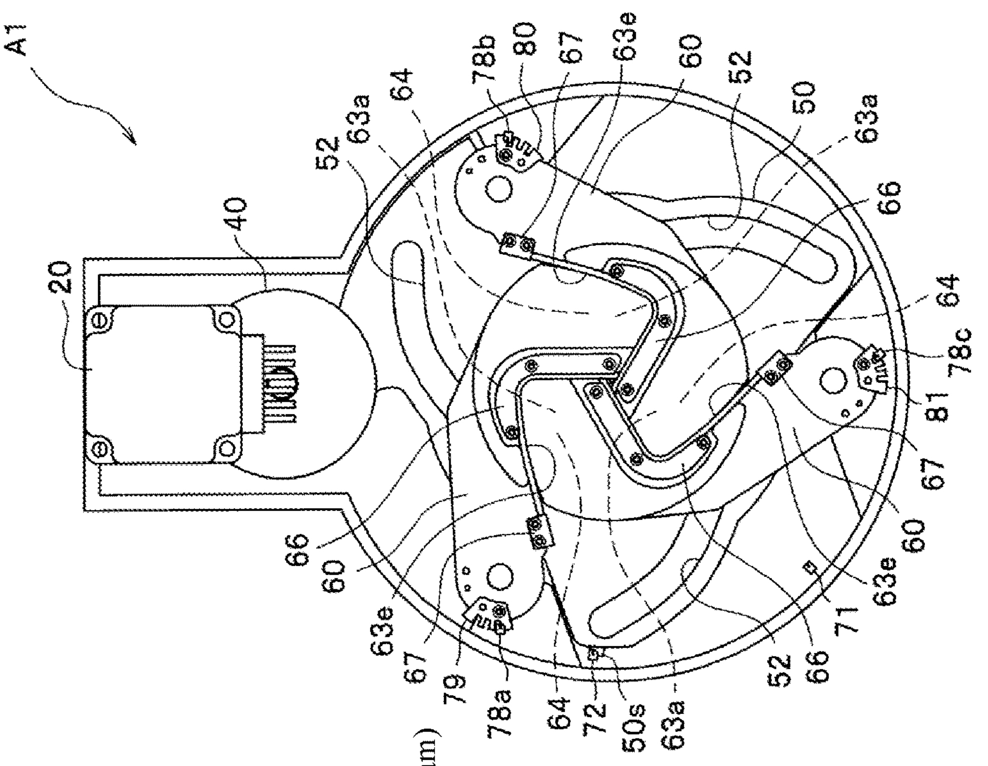
FIG. 30 (*a*) is a perspective diagram illustrated the fully closed state of the flow rate controlling device.
Figure 30:
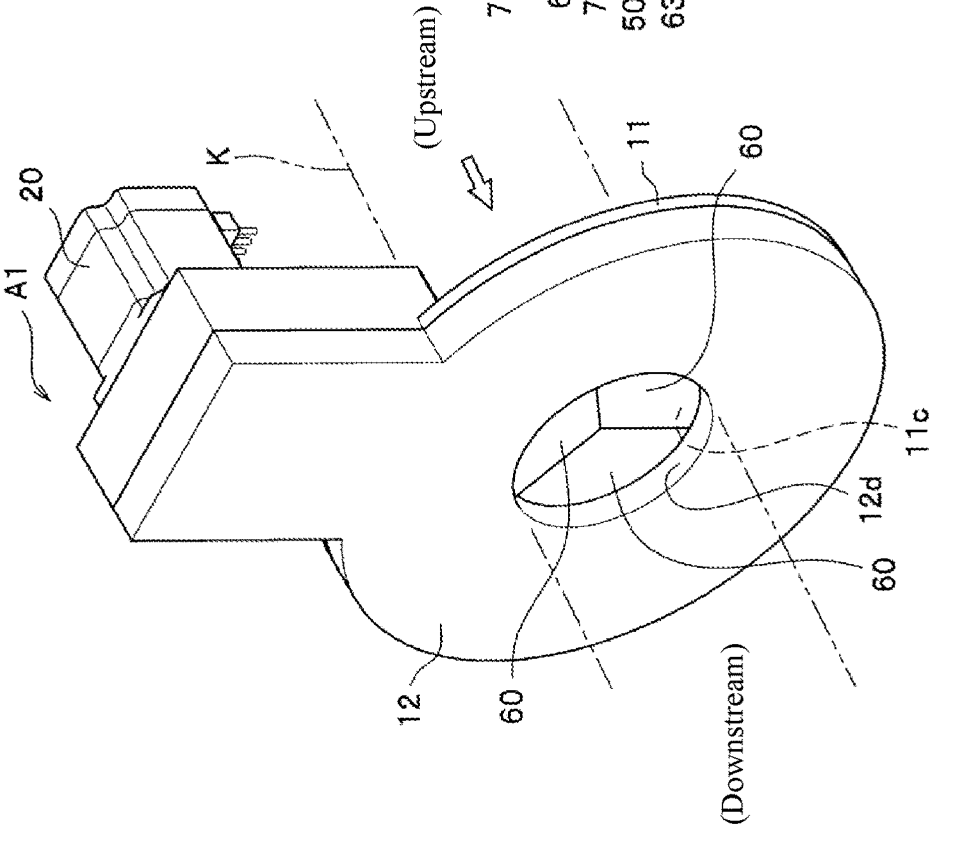

FIG. 30 (*a*) is a perspective diagram illustrating a fully closed state of a flow rate controlling device; and FIG. 30 (*b*) is a plan view showing the interior of the flow rate controlling device from the upstream side with the first base removed when the flow rate controlling device is in a fully closed state.

When in the fully closed state of the flow rate controlling device A1, illustrated in FIG. 30 (*a*), the origin sensor 71 for detecting the position of the driving ring 50 will not have the light blocked by the blocking plate 50*s* of the ring member 50, but rather will allow the light to pass, as illustrated in FIG. 30 (*b*). On the other hand, the end sensor 72 for detecting the position of the driving ring 50 will be in a state wherein the light is blocked by the blocking plate 50*s* of the ring member 50.

The sensor 78*a* for detecting the position of the blade member 60, as illustrated in FIG. 28 (*c*) has the light blocked by the fourth protruding portion 79*a*4 of the detected gear 79. This is true also for the relationship between the sensor 78*b* and the detected gear 80 of the blade member 60, and the relationship between the sensor 78*c* and the detected gear 81 of the blade member 60.

The light-detecting states of the origin sensor 71, the end sensor 72, and the sensor 78*a* (or 78*b* or 78*c*) for the blade member 60, for detecting the position of the driving ring 50 when the blade members 60 are in the fully opened state, in an intermediate state between the fully opened and fully closed states, or the fully closed state, are summarized in Table 1.

TABLE 1

| Operation of Blade Member | Sensor: Driving Ring: Origin Sensor | Sensor: Driving Ring: End Sensor | Sensor: Blade Member Sensor |
|---|---|---|---|
| Open | Light-Blocking (L) | Light-Conducting (H) | Light-Blocking (L) |
| Intermediate | Light-Conducting (H) | Light-Conducting (H) | Light-Conducting (H) or Light-Blocking (L) |
| Closed | Light-Conducting (H) | Light-Blocking (L) | Light-Blocking (L) |

Figure 31:
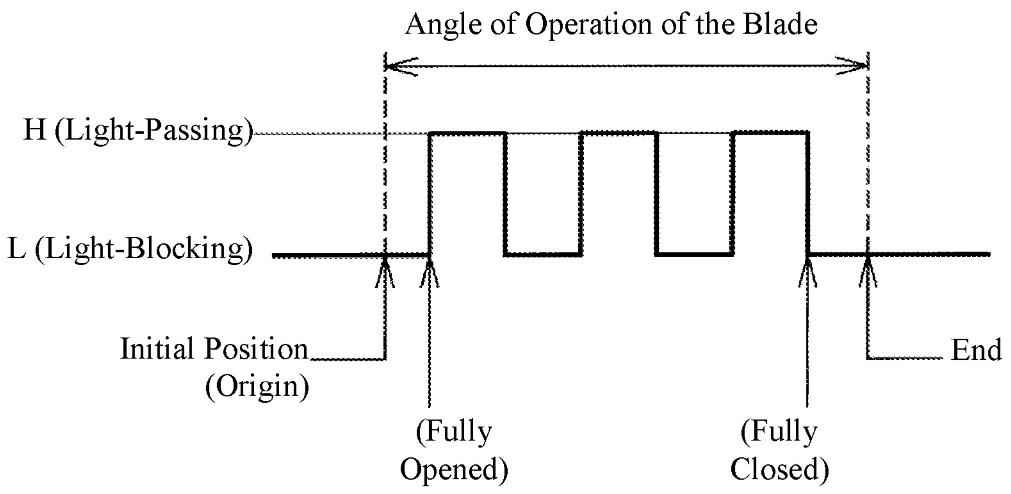
FIG. 31 is a diagram illustrating a detection signal of the sensor that detects the position of the blade member, with the blade member passing from the fully opened state, through an intermediate state, to the fully closed state.

FIG. 31 is a diagram illustrating a detection signal of the sensor that detects the position of the blade member, with the blade member passing from the fully opened state, through an intermediate state, to the fully closed state.

In the process of the blade members 60 going from the fully opened state through the intermediate states to the fully closed state, the detection signal from the sensor 78*a* will change as follows: low→high→low→high→low→high→low.

The sensors 78*b* and 78*c* will have the same detection signals as the sensor 78*a*. Because of this, it is possible to detect whether or not each individual blade member 60 is operating properly, through acquiring the detection signals from the sensors 78*a*, 78*b*, and 78*c* during the process as the blade members 60 move from the fully opened state through the intermediate states, to the fully closed state.

The structure of the flow rate controlling device A1 according to the further example, set forth above, provides the following effects:

1. Whether or not the individual blade members 60 are operating properly can be detected through the provision of the origin sensor 71 and the end sensor 72, for detecting the position of the driving ring 50, and the sensors 78*a*, 78*b*, and 78*c* for detecting the positions of the individual blade members 60.

2. The positions at which the blade members 60 have reached the fully closed state can be detected reliably through the provision of means for adjusting the position for detecting the position of each blade member 60 in the fully closed state of the blade members 60, for the detected gears 79, 80, and 81 and/or for the sensors 78*a*, 78*b*, or 78*c*.

3. Whether or not the individual blades 60 are operating properly between the fully opened state and the fully closed state can be detected reliably through detecting the fully opened state, the fully closed state, and the intermediate state between the fully opened and fully closed states, of the blade members 60, through the sensors 78*a*, 78*b*, and 78*c*, and detecting the fully opened state and the fully closed state of the driving ring 50 through the origin sensor 71 and the end sensor 72.

4. The movement of the blade member 60 can be ascertained clearly through the use of sensors that are able to detect the positions of the individual blade members 60 (for example, sensors that detect light and/or magnetism) as the sensors 78*a*, 78*b*, and 78*c*.

5. The elastic members falling off of the blade members 60 can be prevented through employing, in the elastic members 63*e*, structures that engage the blade member 60 so as to prevent falling off of the blade members 60 (the first hook-shaped portion 63*e*3 and the second hook-shaped portion 63*e*4).

6. The elastic member 63*e* coming off of the blade member 60 can be prevented reliably through retention of the elastic member 63*e* by the first retaining member 66 and the second retaining member 67, through providing, on the blade member 60, the first retaining member 66 and the second retaining member 67 that are securing members that cover the lengthwise-direction end portions of the elastic member 63*e*.

7. Given the above, the further example not only enables reliable detection of a malfunction of a blade member 60, but also can prevent the elastic member from coming off of the blade member 60.

Note that the structure in the example, described above, may be combined as appropriate with the structure explained in the previous example.

Figure 32:
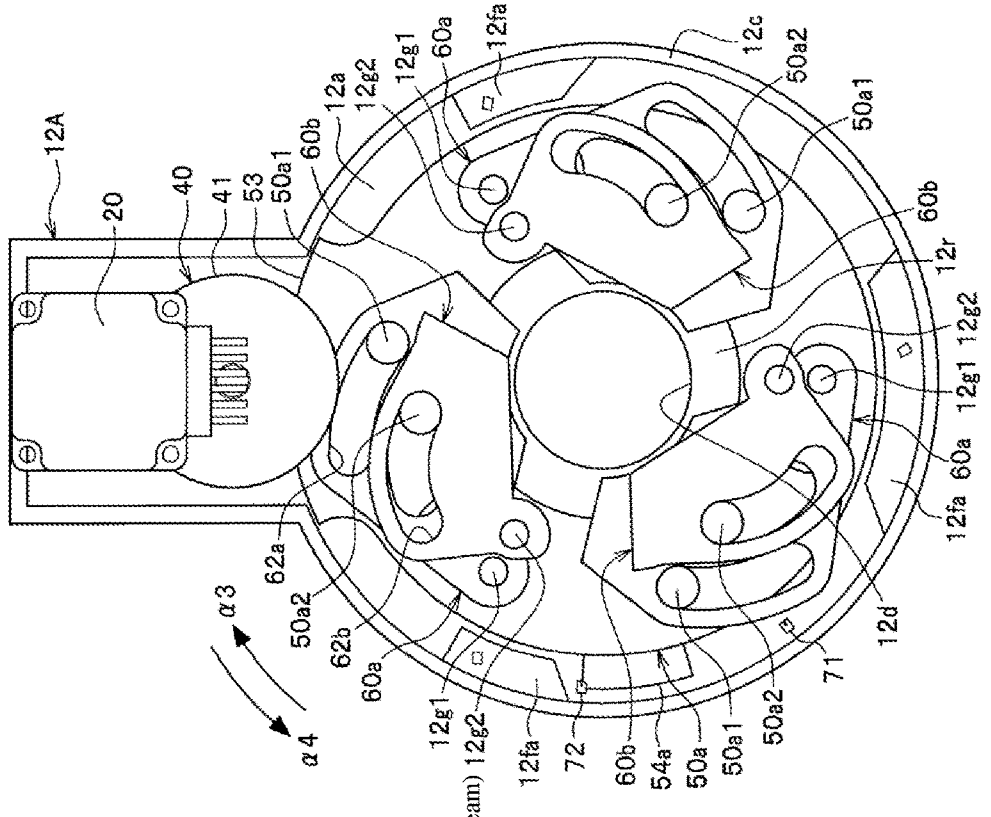
FIG. 32 (*a*) is a perspective diagram illustrating the opened state of a flow rate controlling device according to a yet further example according to the present invention.
Figure 32:
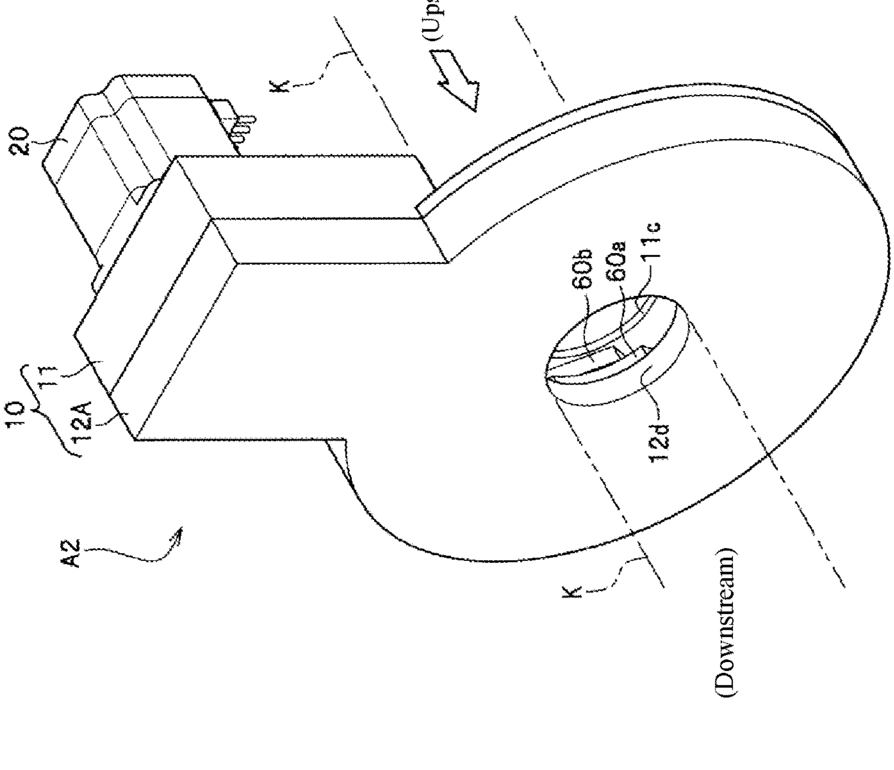
Figure 33:
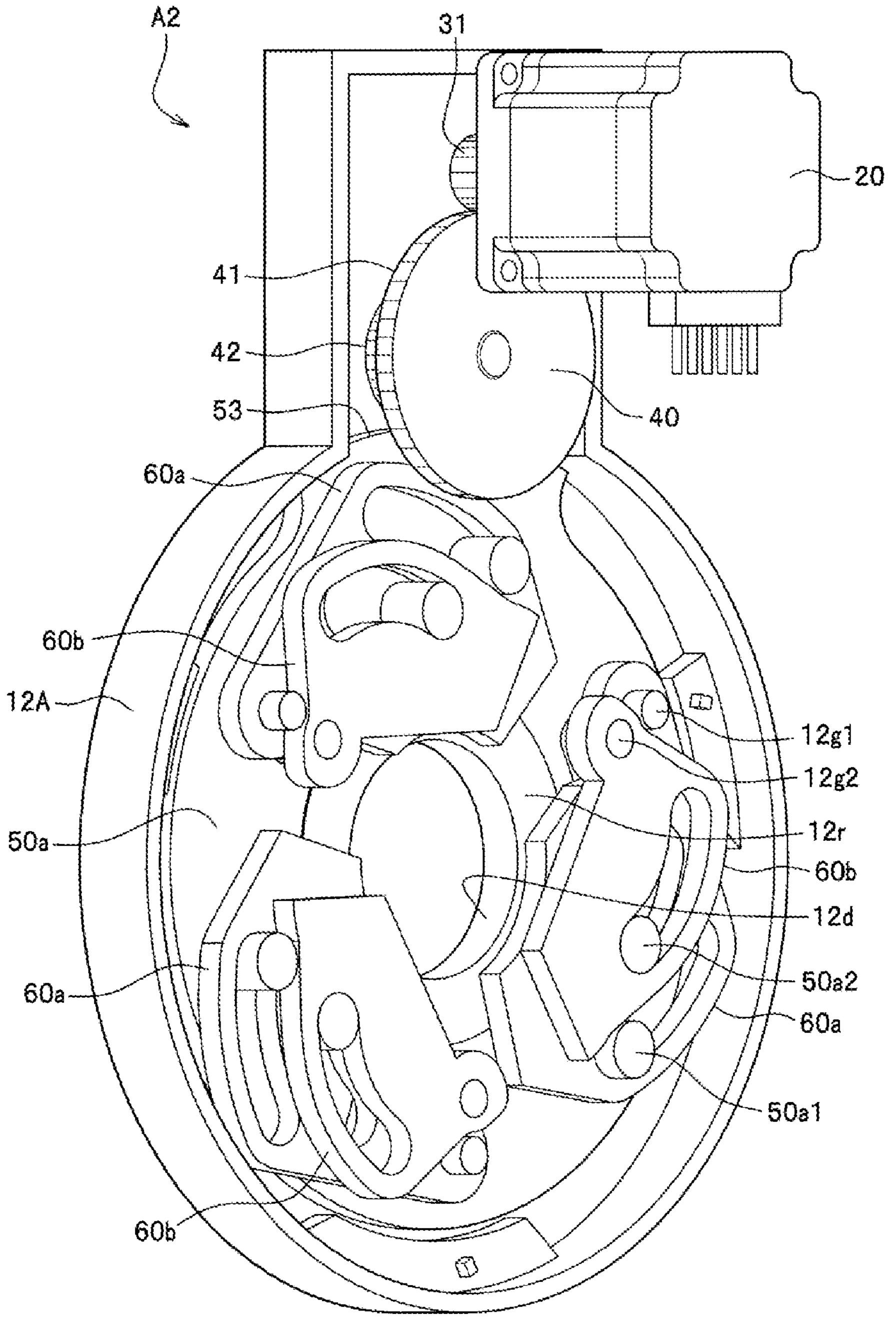
FIG. 33 is a perspective diagram of the internal structure of the flow rate controlling device according to the yet further example in an opened state, with the first base on the upstream side removed.

FIG. 32 (*a*) is a perspective diagram illustrating the opened state of a flow rate controlling device according to a yet further example according to the present invention; and FIG. 32 (*b*) is a plan view of the internal structure of a flow rate controlling device according to the yet further example according to the present invention in an opened state, with the first base on the upstream side removed. FIG. 33 is a perspective diagram of the internal structure of the flow rate controlling device according to the present example in an opened state, with the first base on the upstream side removed.

Figure 34:
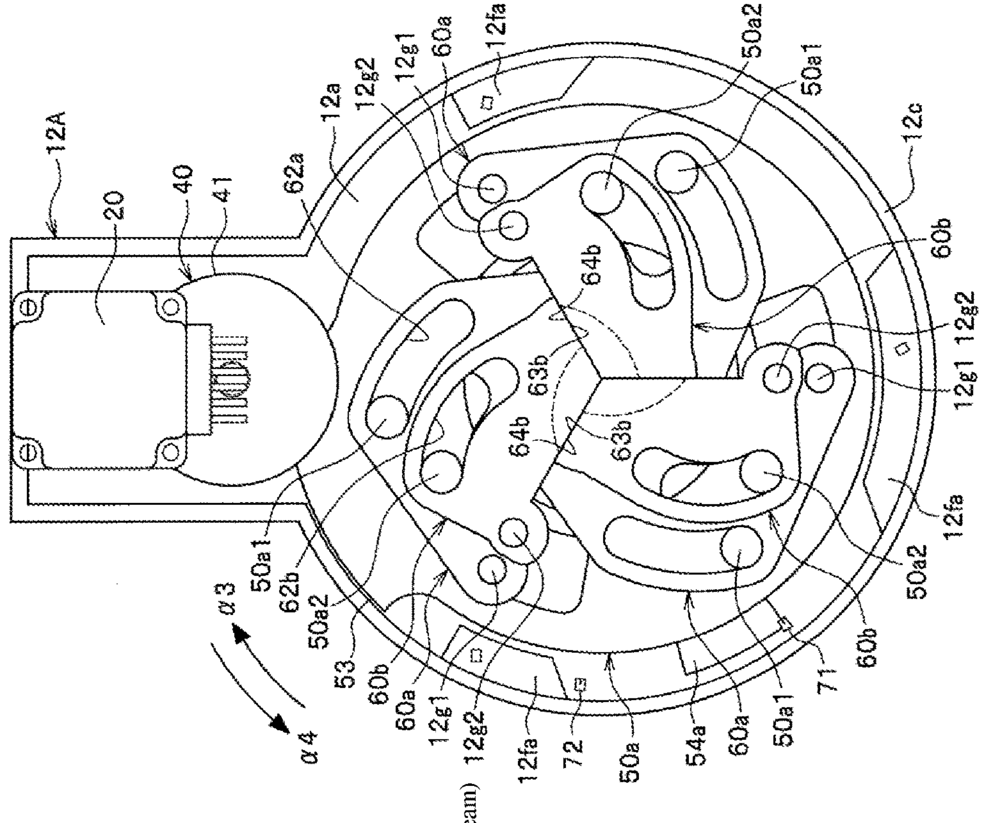
FIG. 34 (*a*) is a perspective diagram illustrating the closed state of a flow rate controlling device according to a yet further example according to the present invention.
Figure 34:
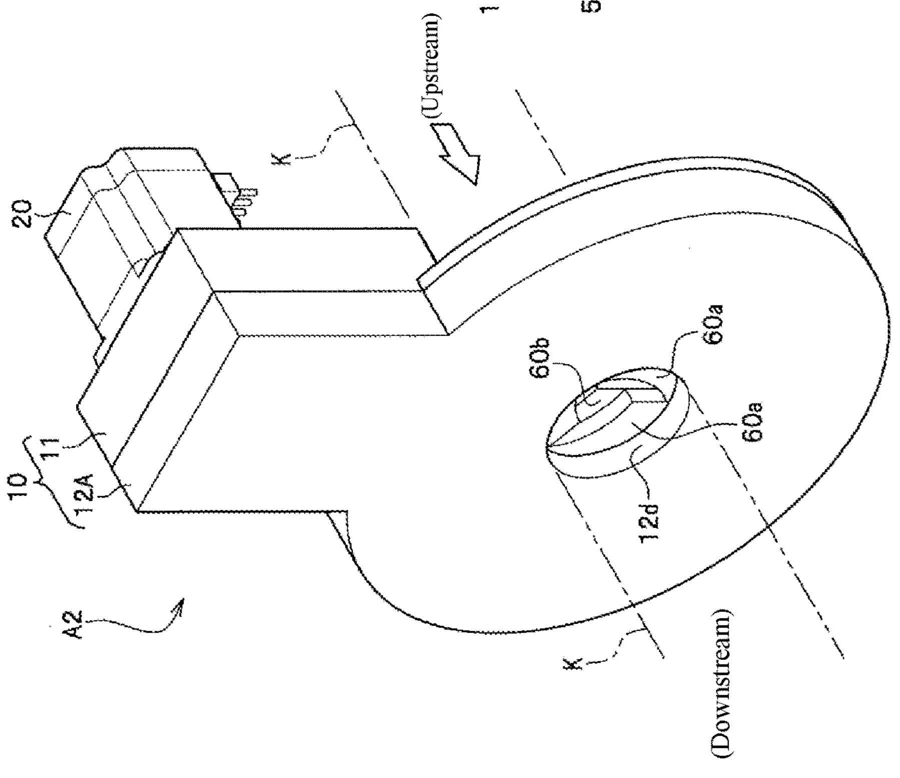

FIG. 34 (*a*) is a perspective diagram illustrating the closed state of a flow rate controlling device according to a yet further example according to the present invention; and FIG. 34 (*b*) is a plan view of the internal structure of a flow rate controlling device according to this example according to the present invention in the closed state, with the first base on the upstream side removed.

Figure 35:
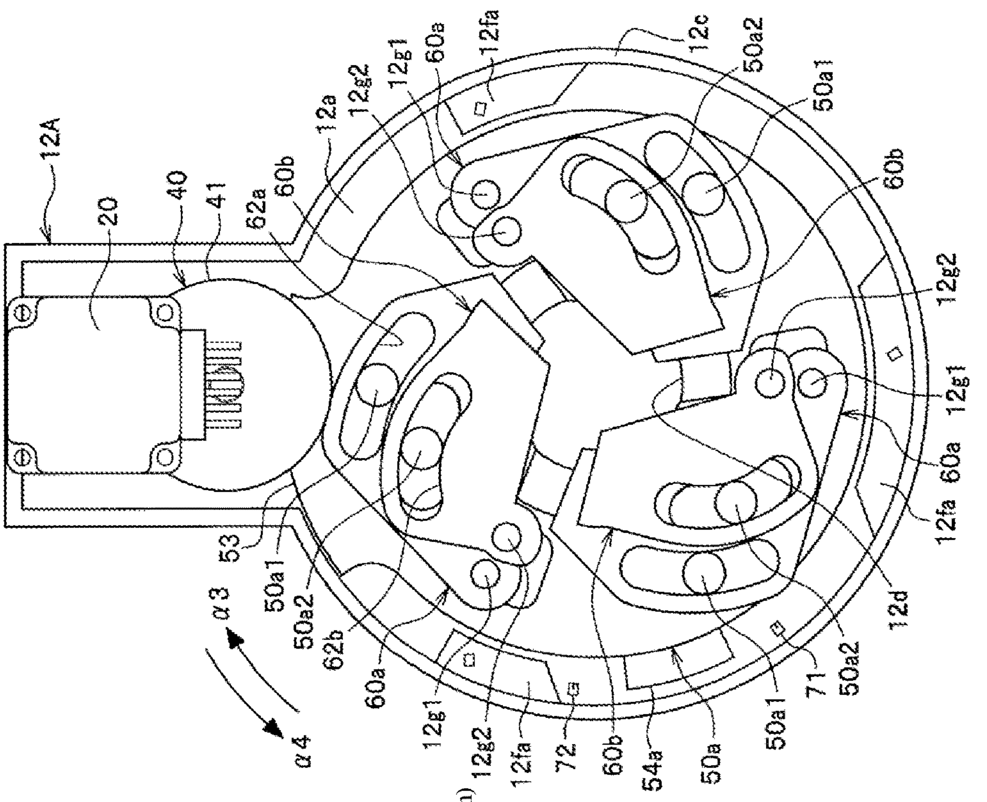
FIG. 35 (*a*) is a perspective diagram illustrating the intermediate state between the opened and closed state of a flow rate controlling device according to a yet further example according to the present invention.
Figure 35:
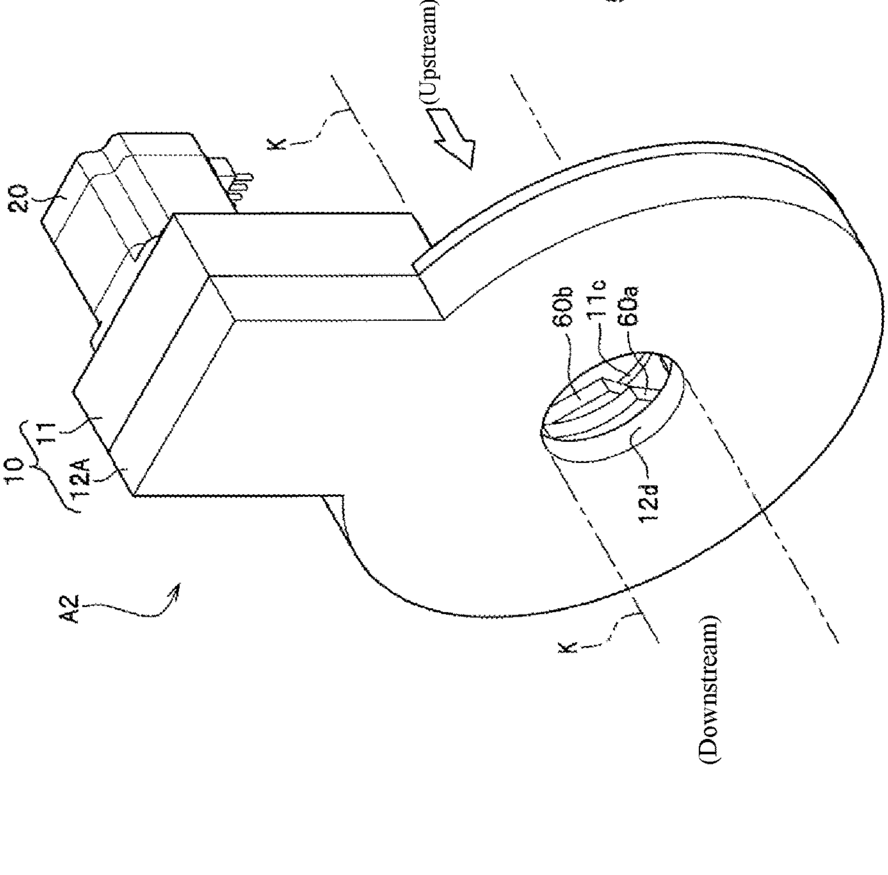

FIG. 35 (*a*) is a perspective diagram illustrating the intermediate state between the opened state and the closed state of a flow rate controlling device according to a yet further example according to the present invention; and FIG. 35 (*b*) is a plan view of the internal structure of a flow rate controlling device according to the current example according to the present invention in the intermediate state between the opened state and the closed state, with the first base on the upstream side removed.

In the flow rate controlling device A2 of the yet further example (referencing FIGS. 32 (*a*) and (*b*)) the three blade members 60 of the previous example are structured with three first blade members 60*a* of a first layer and three second blade members 60*b* of a second layer. The three second blade members 60*b* of the second layer are disposed overlapping the three first blade members 60*a* of the first layer.

This enables the flow rate controlling device A2 according to the yet further example to reduce of the individual angles of rotation of the first blade members 60*a* and the second blade members 60*b*, enabling a reduction in the areas of the opening portions 11*c* and 12*d* that are blocked by the respective first blade members 60*a* and second blade members 60*b*, when compared to that of the blade members 60 in the previous example.

Because of this, the first blade members 60*a* and the second blade members 60*b* can be made smaller than the blade members 60 in the previous example.

This enables the size of the flow rate controlling device A2 to be smaller than that of the flow rate controlling device 1 of the previous example.

The other structures are identical to those in the flow rate controlling device 1 of the previous example, so identical reference symbols are assigned to similar structural elements, and detailed explanations thereof are omitted.

As illustrated in FIGS. 32 (*a*) and (*b*), the flow rate controlling device A2 is provided with opening portions 11*c* and 12*d* along a pipe K, where, in the opened state, the three first blade members 60*a* of the first layer and the three second blade members 60*b* of the second layer rotate out of the opening portions 11*c* and 12*d*. At this time, a detected piece 54*a* that is formed on the peripheral edge of the ring member 50*a* is detected by a sensor 72, to detect that the first blade members 60*a* and the second blade members 60*b* are in the opened state.

When moving from the opened state to the closed state, as illustrated in FIGS. 35 (*a*) and (*b*), the three first blade members 60*a* of the first layer and the three second blade members 60*b* of the second layer rotate from outside of the opening portions 11*c* and 12*d* to cover the opening portion 12*d*.

Given this, when the closed state illustrated in FIGS. 34 (*a*) and (*b*) is reached, the three first blade members 60*a* of the first layer close the outer side of the opening portions 11*c* and 12*d* (to the outside of the dotted line in FIG. 34 (*b*)), and the three second blade members 60*b* of the second layer close the center portion of the opening portions 11*c* and 12*d* that was not closed by the three first blade members 60*a* of the first layer (on the inside of the dotted line in FIG. 34 (*b*)). At this time, the detected piece 54*a* that is formed on the peripheral edge of the ring member 50*a* is detected by the sensor 71, and the closed state of the first blade members 60*a* and of the second blade members 60*b* is detected.

Figure 36:
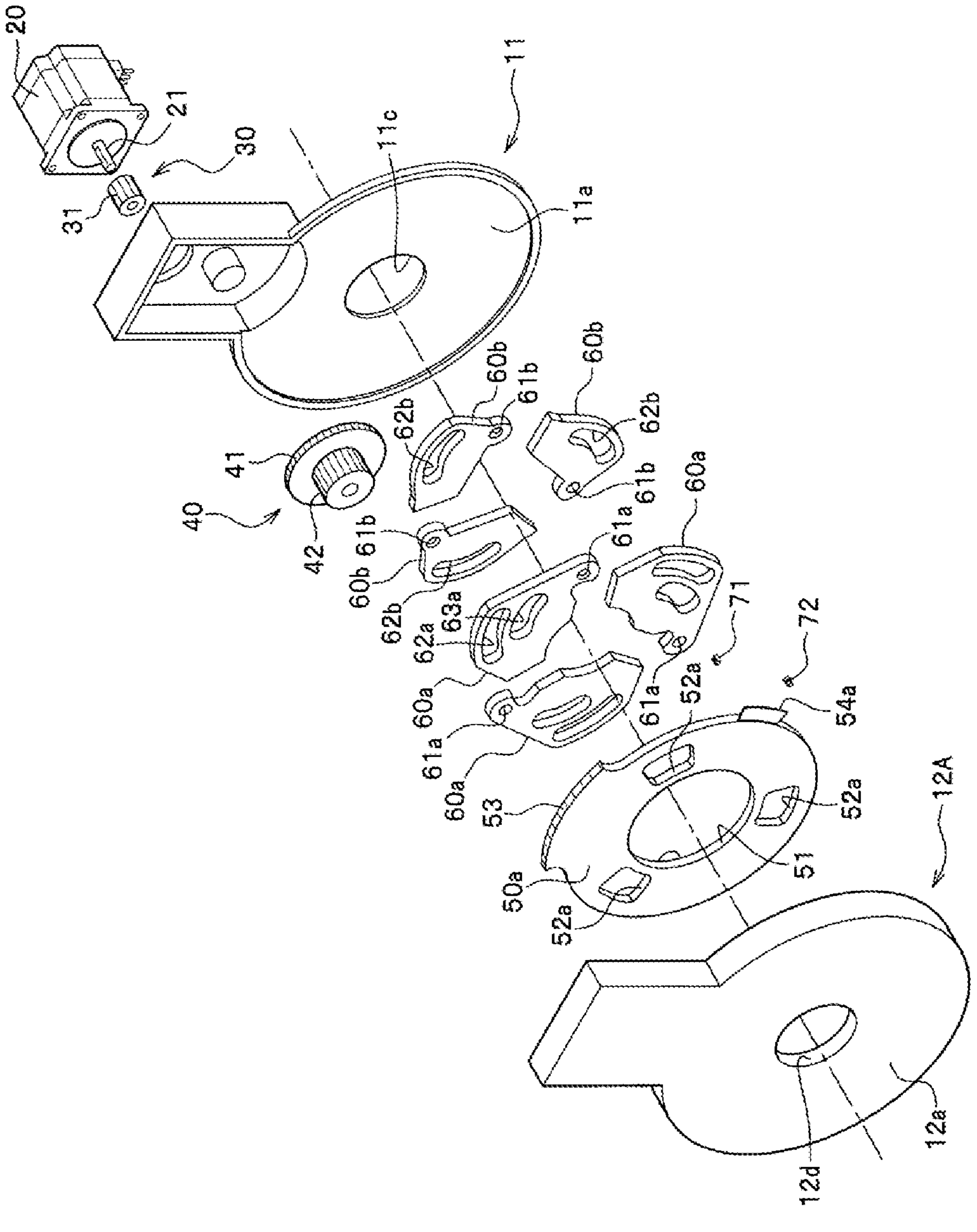
FIG. 36 is an exploded perspective diagram of a flow rate controlling device.

FIG. 36 is an exploded perspective diagram of a flow rate controlling device.

<Base>

A base 10 is formed through combining an upstream side first base 11 and a downstream side second base 12A and securing through bonding, or the like. The opening portion 11*c* of the first base 11 and the opening portion 12*d* of the second base 12A form a flow path through which the fluid within the pipe K flows. The fluid flows from the opening portion 11*c* of the first base 11 in the direction of the opening portion 12*d* of the second base 12A (referencing the white arrow in FIG. 32 (*a*)). An output shaft 21 of the motor 20, a pinion 30, a reduction gear 40, a ring member 50*a*, a plurality of first blade members 60*a*, a plurality of second blade members 60*b*, and sensors 71 and 72, and the like, are contained within the base 10, as illustrated in FIG. 36.

<Second Base 12A>

A circular opening portion 12*d* is formed in a center portion of a disk wall portion 12*a* of the second base 12A. As illustrated in FIG. 32 (*b*), guiding ribs 12*r*, which form a radiating shape around the opening portion 12*d* of the disk wall portion 12*a*, are provided protruding toward the interior of the base 10. A plurality of support portions 12*fa* (which, in this yet further example, is three support portions 12*fa*) are formed at intervals in the circumferential direction, on the outer edge portion of the disk wall portion 12*a*. First shaft portions 12*g*1 and second shaft portions 12*g*2 (referencing FIG. 32 (*b*)), which are formed in circular column shapes, are provided extending from the inner surface of the disk wall portion 12*a*. The first shaft portions 12*g*1 and the second shaft portions 12*g*2 are examples of rotary shafts for the first blade members 60*a* and second blade members 60*b* that are each parallel to the axis of the opening portion 12*d*.

The first shaft portions 12*g*1 and the second shaft portions 12*g*2 are protruding portions that have circular column shapes that are each inserted into inserting portions 61*a* and 61*b* (referencing FIG. 36) of the first blade members 60*a* and the second blade members 60*b*, respectively, to support the first blade members 60*a* and of the second blade members 60*b* so as to enable rotation. The first shaft portions 12*g*1 and second shaft portions 12*g*2 are formed using bearings such as ball bearings, oil-including metal bearings, or the like.

The height to which each support portion 12*fa* stands (referencing FIG. 32 (*b*)) is essentially equal to the thickness of the ring member 50*a*, and the heights to which the first shaft portions 12*g*1 and the second shaft portions 12*g*2 stand are essentially equal to, respectively, the thickness of the first blade members 60*a* and the thickness of the first blade members 60*a* added to the thickness of the second blade members 60*b*.

<Ring Member 50*a*>

The ring member 50*a* is a member that is made from a metal (such as aluminum), that rotates around an opening portion 12*d*. The ring member 50*a* is a driving ring for causing a plurality of first blade members 60*a* and a plurality of second blade members 60*b* to rotate, powered by a motor 20.

The ring member 50*a* is provided between a circular wall portion 12*a* of the second base 12A and the first blade members 60*a*. As illustrated in FIG. 36, a circular hole portion 51 is formed in the center portion of the ring member 50*a*. The inner diameter of the hole portion 51 is set to be slightly larger than the outer diameter of the guiding rib 12*r* of the second base 12A, and the ring member 50*a* is fitted onto the guiding rib 12*r*.

A plurality of notched portions 52*a* (which, in the present example, is three notched portions 52*a*) is formed, extending in the circumferential direction, around the hole portion 51 in the ring member 50*a*. The structure is such that a pair that is a first shaft portion 12*g*1 and a second shaft portion 12*g*2, which extend from the inside of the second base 12A, pass through each notched portion 52*a*.

Each notched portion 52*a* is formed in a size so as to not contact the first shaft portion 12*g*1 or the second shaft portion 12*g*2 when the ring member 50*a* is rotated by the motor 20.

Three first driving bosses 50*a*1 and three second driving bosses 50*a*2 are provided extending from the ring member 50*a* in the direction of the first base 11 (referencing FIG. 32 (*b*)).

The three first driving bosses 50*a*1 are members for rotating the respective three first blade members 60*a*. The first driving bosses 50*a*1 have length dimensions that are no more than the thickness of the first blade members 60*a*.

The three second driving bosses 50*a*2 are members for rotating the three respective second blade members 60*b*. The second driving bosses 50*a*2 have length dimensions that are no more than the sum of the thickness dimension of the first blade members 60*a* and the thickness dimension of the second blade members 60*b*.

The first driving boss 50*a*1 of the protruding portion is a protruding portion of a circular column shape that is able to slide within a first guided hole portion 62*a* of a groove portion of a first blade member 60*a*, and is formed using a bearing such as a ball bearing or an oil-including metal bearing, or the like. The height to which the first driving boss 50*a*1 extends is no more than the thickness dimension of the first blade members 60*a*.

The second driving boss 50*a*2 of the protruding portion is a protruding portion of a circular column shape that is able to slide within a second guided hole portion 62*b* of a groove portion of a second blade member 60*b* and is formed using a bearing such as a ball bearing or an oil-including metal bearing, or the like. The height to which the second driving boss 50*a*2 extends is no more than the thickness dimension of the first blade members 60*a* plus the second blade members 60*b*.

Outer teeth 53 for meshing with outer teeth 42 of a reduction gear 40 (referencing FIG. 36) are formed on a portion of the peripheral edge of the ring member 50*a*. A detected piece 54*a*, as an example of a detected portion, is provided extending in the outer radial direction of the ring member 50*a* from the peripheral edge of the ring member 50*a*.

The shape of the ring member 50*a* and the positions and shapes of the plurality of support portions 12*fa* of the second base 12A are set so that there will be no contact between the ring member 50*a* and the plurality of support portions 12*fa* when the ring member 50*a* is rotated.

<First Blade Members 60*a*>

Figure 37:
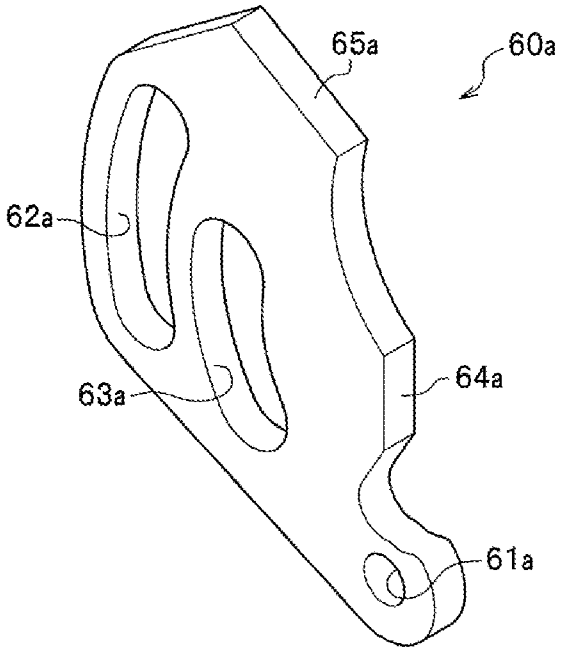
FIG. 37 (*a*) is a perspective diagram illustrating a first blade member.
Figure 37:
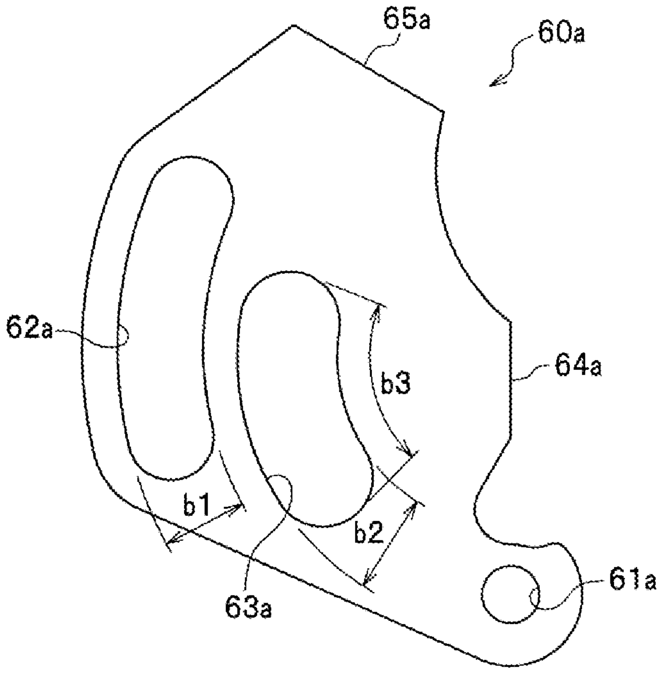
Figure 37:
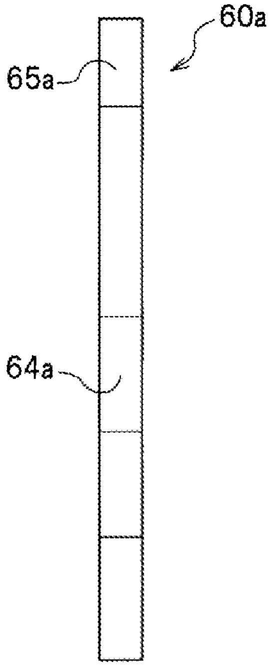

FIGS. 37 (*a*), (*b*), and (*c*) are diagrams illustrating respectively a perspective diagram, a plan view, and a side view of the first blade member.

The plurality of first blade members 60*a* are members for opening and closing the outer peripheral portion of the flow path within the pipe K (referencing FIG. 32 (*b*) and FIG. 34 (*b*)), and use a metal, a resin, or the like, for the material thereof. The first blade members 60*a* may use aluminum, or the like, as a metal, or may use polycarbonate, PBT (polybutylene terephthalate), ABS, or the like, as a resin.

A plurality of first blade members 60*a* is provided in essentially a single plane that is perpendicular to the direction of flow of the fluid, between a circular wall portion 11*a* of the first base 11 (referencing FIG. 36) an the ring member 50*a*. Moreover, the plurality of first blade members 60*a* is provided adjacent to the plurality of second blade members 60*b*, and provided on the downstream side of the plurality of second blade members 60*b* in the flow path.

As illustrated in FIGS. 37 (*a*) and (*b*), an inserting portion 61*a*, which is a recessed portion or a hole portion, is formed in the base end portion of each first blade members 60*a*. The inserting portion 61*a* is a position into which a first shaft portion 12*g*1 of the second base 12 is inserted, to become the center of rotation for the first blade member 60*a*.

A first guided hole portion 62*a* that has a curved elongated hole shape is formed in the outer peripheral portion of the first blade member 60*a*. The first guided hole portion 62*a* is fitted onto, and guided by, a first driving boss 50*a*1 of the ring member 50*a*, and the first blade member 60*a* is rotated thereby. Because of this, the width dimension b1 of the first guided hole portion 62*a* has a dimension b1 that is slightly larger than the diameter of the first driving boss 50*a*1.

Additionally, a second guided hole portion 63*a* of a curved elongated hole shape is formed in the center portion of the first blade member 60*a*. The second guided hole portion 63*a* is an elongated hole for providing clearance from the second driving boss 50*a*2 of the ring member 50*a* (referencing FIG. 32 (*b*)). Because of this, the width dimension b2 of the second guided hole portion 63*a* (referencing FIG. 37 (*b*)) has a dimension b2 that is larger than the diameter of the second driving boss 50*a*2. Moreover, the length dimension b3 of the second guided hole portion 63*a* has a dimension that is larger than the range of motion of the second driving boss 50*a*2 of the ring member 50*a*.

In addition, the first blade member 60*a* has a first contacting portion 64*a* for making contact with an adjacent first blade member 60*a* when the first blade members 60*a* are closed, and a second contacting portion 65*a* for making contact with another adjacent first blade members 60*a*, when the first blade members 60*a* are closed.

That is, the first blade members 60*a* are structured so that, when in the fully closed state that is illustrated in FIG. 34 (*b*), a first contacting member 64*a* contacts a second contacting member 65*a* of another first blade member 60*a* on one side, and a second contacting portion 65*a* contacts the first contacting portion 64*a* of another first blade member 60*a* on the other side.

The first contacting portions 64*a* and the second contacting portions 65*a* are formed so as to be flat.

Note that the shapes of the first contacting portions 64*a* and of the second contacting portions 65*a* can be selected arbitrarily, insofar as the fully closed state can be maintained when in the fully closed state illustrated in FIG. 34 (*b*).

The first blade member 60*a* is structured so as to overlap the guiding rib 12*r* of the second base 12A when in the fully opened state illustrated in FIG. 32 (*b*), and is set so as to be positioned to the outside, in the radial direction, of the opening portions 11*c* and 12*d*. Moreover, the first blade members 60*a* are structured so that they will not contact the peripheral wall portion 12*c* of the second base 12A when in the fully opened state.

Additionally, the first blade members 60*a* are structured so as to overlap the guiding rib 12*r* of the second base 12A when in the fully closed state illustrated in FIG. 34 (*b*).

<Second Blade Member 60*b*>

Figure 38:
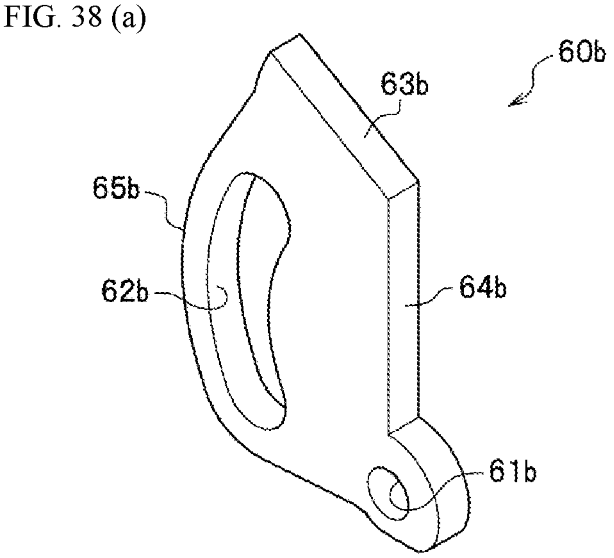
FIG. 38 (*a*) is a perspective diagram illustrating a second blade member.
Figure 38:
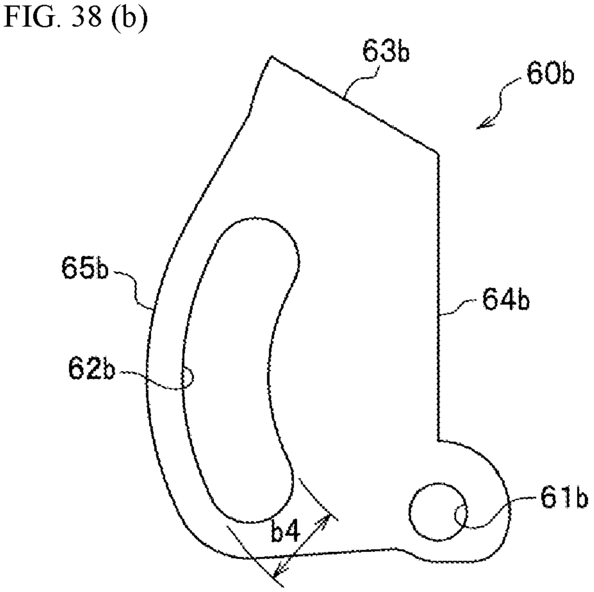
Figure 38:
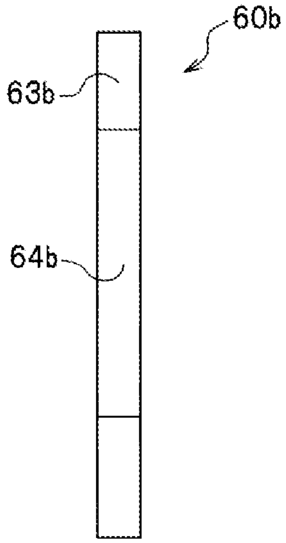

FIGS. 38 (*a*), (*b*), and (*c*) are, respectively, a perspective diagram, a plan view, and a side view illustrating a second blade member.

A plurality of second blade members 60*b* are members for opening and closing the center portion of the flow path within the pipe K (referencing FIG. 34 (*b*)), and use, for example, a metal, a resin, or the like, as the material thereof. The second blade members 60*b* may use aluminum, or the like, as a metal, and may use polycarbonate, PBT (polybutylene terephthalate), ABS, or the like, as a resin.

A plurality of second blade members 60b is provided essentially in a single plane that is perpendicular to the direction in which the fluid flows, between a circular wall portion 11a of the first base 11 (referencing FIG. 36) and the ring member 50a.

Moreover, the plurality of second blade members 60b is provided adjacent to the plurality of first blade members 60a, and provided on the upstream side of the plurality of the first blade members 60a in the flow path.

As illustrated in FIGS. 38 (a) and (b), an inserting portion 61b, which is a recessed portion or a hole portion, is formed in the base end portion of each second blade members 60b. The inserting portion 61b is a position into which a second shaft portion 12g2 of the second base 12 is inserted, to become the center of rotation for the second blade member 60b.

A second guided hole portion 62b that has a curved elongated hole shape is formed in the outer peripheral portion of the second blade member 60b. The second guided hole portion 62b is fitted onto, and guided by, a second driving boss 50a2 of the ring member 50a, and the second blade member 60b is rotated thereby. Because of this, the width dimension b1 of the second guided hole portion 62b has a dimension b4 that is slightly larger than the diameter of the second driving boss 50a2.

In addition, the second blade member 60b has a first contacting portion 63b for making contact with an adjacent second blade member 60b, and a second contacting portion 64b for making contact with another adjacent second blade members 60b, when closed.

That is, the second blade members 60b are structured so that, when in the fully closed state that is illustrated in FIG. 34 (b), a first contacting member 63b contacts a second contacting member 64b of another second blade member 60b on one side, and a second contacting portion 64b contacts the first contacting portion 63b of another second blade member 60b on the other side.

The first contacting portions 63b and the second contacting portions 64b are formed so as to be flat. Note that the shapes of the first contacting portions 63b and of the second contacting portions 64b can be selected arbitrarily, insofar as the fully closed state can be maintained when in the fully closed state illustrated in FIG. 34 (b).

The outer peripheral portions 65b of the second blade members 60b (referencing FIGS. 38 (a) and (b)) are formed so that when there is a rotating operation of the second blade members 60b, the first driving bosses 50a1 of the ring member 50a do not contact the support portions 12fa of the second bases 12A.

The second blade members 60b are structured so as to overlap the first blade members 60a through the process of moving between the fully closed state (FIG. 34 (b)) and the fully opened state (FIG. 32 (b)).

The second blade members 60b are structured so as to be positioned to the outside of the opening portions 11c and 12d, in the radial direction, and so as to not contact the peripheral wall portion 12c of the second base 12A when in the fully opened state (FIG. 32 (b)).

<Sensors 71 and 72>

As illustrated in FIG. 32 (b) and FIG. 34 (b), the sensors 71 and 72 are examples of detecting portions for detecting the detected piece 54a of the ring member 50a. The sensor 72 is provided in a position wherein the detected piece 54a can be detected when the flow rate controlling device A2 is in the fully opened state. The sensor 71 is provided in a position wherein the detected piece 54a can be detected when the flow rate controlling device A2 is in the fully closed state. A controlling portion, not shown, can stop driving of the motor 20 based on the detection results for the detected piece 54a by the sensors 71 and 72, and can correct the initial state of the motor 20 based on the detection result by the sensor 71.

<Assembling the Flow Rate Controlling Device A2>

The assembly of the flow rate controlling device A2 will be explained next.

As illustrated in FIG. 33, the hole portion 51 of the ring member 50a is fitted into the second base 12A on the outside of the guide rib 12r, to dispose the ring member 50a within the second base 12A.

Thereafter, the inserting portions 61a of the first blade members 60a (referencing FIGS. 37 (a) and (b)) are fitted onto the respective first shaft portions 12g1 of the second base 12A, and the first driving bosses 50a1 and second driving bosses 50a2 of the respective ring members 50a are fitted into the first guided hole portions 62a and the second guided hole portions 63a of the first blade members 60a. In this state, the first blade members 60a are disposed over the ring member 50a.

Thereafter, the inserting portions 61b of the second blade members 60b (referencing FIGS. 38 (a) and (b)) are fitted onto the respective second shaft portions 12g2 of the second base 12A, and the second driving bosses 50a2 of the ring member 50a are fitted into the guided hole portions 62b of the second blade members 60b. In this state, the second blade members 60b are arranged over the first blade members 60a.

Following this, the motor 20 that has a pinion 30 secured to the output shaft 21 is secured, through screws, to the first base 11, with the outer teeth 31 of the pinion 30 meshed with the outer teeth 41 of the reduction gear 40 and the outer teeth 53 of the ring member 50 meshed with the outer teeth 42 of the reduction gear 40.

Given this, the first ring member 50a, the first blade members 60a, and the second blade members 60b are pressed by the first base 11, and the first base 11 is secured to the second base 12A through bonding, screws, or the like.

The opening and closing of the flow rate controlling device A2 will be explained next.

<Closing Operation>

When the output shaft 21 of the motor 20 (referencing FIG. 36) is rotated through an opening command from a controlling portion, not shown, the power of the motor 20 is transmitted through a pinion 30 and a reduction gear 40 to the ring member 50a. Through this, the ring member 50a rotates in the counterclockwise direction (the arrow α4 in FIG. 32 (b)), when viewed from the upstream side. The rotation of the ring member 50a in the counterclockwise direction causes the first driving bosses 50a1 and the second driving bosses 50a2 to rotate in the counterclockwise direction. The first driving bosses 50a1 and the second driving bosses 50a2 are fitted into the first guided hole portions 62a of the first blade member 60a and the second guided hole portions 62b of the second blade members 60b, respectively.

Because of this, the first blade members 60a and the second blade members 60b rotate in the clockwise direction (the arrow α3 in FIG. 32 (b)), when viewed from the upstream side, centered respectively on the first shaft portions 12g1 and the second shaft portions 12g2, due to the movement of the first driving bosses 50a1 and the second driving bosses 50a2.

As the closing operation progresses, the detected piece 54a of the ring member 50a will be detected by the sensor 71 in the fully closed state (referencing FIG. 34 (b)), and the controlling portion will stop the motor 20 based on the detection result by the sensor 71.

At this time, as illustrated in FIGS. 34 (*b*) and (*a*), in the first blade members 60*a*, a first contacting member 64*a* contacts a second contacting member 65*a* of another first blade member 60*a* on one side, and a second contacting portion 65*a* contacts the first contacting portion 64*a* of another first blade member 60*a* on the other side. Through this, the outer peripheral portion, but not the center portion, of the flow path that is formed by the opening portions 11*c* and 12*d* will be closed.

At the same time, for the second blade member 60*b*, a first contacting member 63*b* contacts a second contacting member 64*b* of another second blade member 60*b* on one side, and a second contacting portion 64*b* contacts the first contacting portion 63*b* of another second blade member 60*b* on the other side. Through this, the center portion of the flow path that is formed by the opening portions 11*c* and 12*d* will be closed.

Because of this, the flow path that is formed by the opening portions 11*c* and 12*d* will go to a fully closed state, through the closing operation of the three first blade members 60*a* and the three second blade members 60*b*.

<Opening Operation>

When, upon a command for an opening operation from a controlling portion, not shown, the output shaft 21 of the motor 20 rotates, the power of the motor 20 is transmitted to the ring member 50*a* through the pinion 30 and the reduction gear 40, so that the ring member 50*a* rotates clockwise, when viewed from the upstream side (rotating in the direction of the arrow α3 of FIG. 34 (*b*)).

The rotation of the ring member 50*a* in the clockwise direction causes the first driving bosses 50*a*1 and the second driving bosses 50*a*2 to rotate in the clockwise direction. The first driving bosses 50*a*1 and the second driving bosses 50*a*2 are fitted into the first guided hole portions 62*a* of the first blade member 60*a* and the second guided hole portions 62*b* of the second blade members 60*b*, respectively. Because of this, the first blade members 60*a* and the second blade members 60*b* rotate in the counterclockwise direction (the arrow α4 in FIG. 34 (*b*)), when viewed from the upstream side, centered respectively on the first shaft portions 12*g*1 and the second shaft portions 12*g*2, due to the clockwise-direction rotation of the first driving bosses 50*a*1 and the second driving bosses 50*a*2.

As the opening operation progresses, the detected piece 54*a* of the ring member 50*a* will be detected by the sensor 72 in the fully opened state (referencing FIG. 32 (*b*)), and the controlling portion will stop the motor 20 based on the detection result by the sensor 72.

At this time, as illustrated in FIGS. 32 (*b*) and (*a*), the first blade members 60*a* will be structured so as to overlap the rib 12*r* of the second base 12A, to the outside, in the radial direction, of the opening portions 11*c* and 12*d*, at locations that do not contact the peripheral wall portion 12*c* or the support portion 12*fa* of the second base 12A. Moreover, the second blade members 60*b* will be positioned at locations that are to the outside, in the radial direction, of the opening portions 11*c* and 12*d*, that do not contact the peripheral wall portion 12*c* or the support portion 12*fa* of the second base 12A.

The flow rate controlling device A2 can control the flow rate of the fluid through setting the opening of the flow path (the opening portions 11*c* and 12*d*) (referencing FIGS. 35 (*b*) and (*a*)) essentially continuously between the fully opened state that is illustrated in FIGS. 32 (*b*) and (*a*) and the fully closed state that is illustrated in FIGS. 34 (*b*) and (*a*), based on a command from the controlling portion.

Given the structure described above, the plurality of first blade members 60*a* and the plurality of second blade members 60*b* are structured in two overlapping layers, making it possible to reduce the areas of the flow path (the opening portions 11*c* and 12*d*) that are closed by the individual first and second blade members 60*a* and 60*b*, and to reduce the angles of rotation thereof.

Because of this, it is possible to reduce the sizes of the first blade members 60*a* and the second blade members 60*b*, and to reduce the size of the flow rate controlling device A2.

Note that while a case wherein the blade members had a two layer structure of a plurality of first blade members 60*a* and a plurality of second blade members 60*b* has been presented in this example, the structure may be of three or more layers of pluralities of blade members.

Moreover, while a case was illustrated wherein there were three first blade members 60*a* and three second blade members 60*b* of the first layer and the second layer, these pluralities of blades may number three or more.

Figure 39:
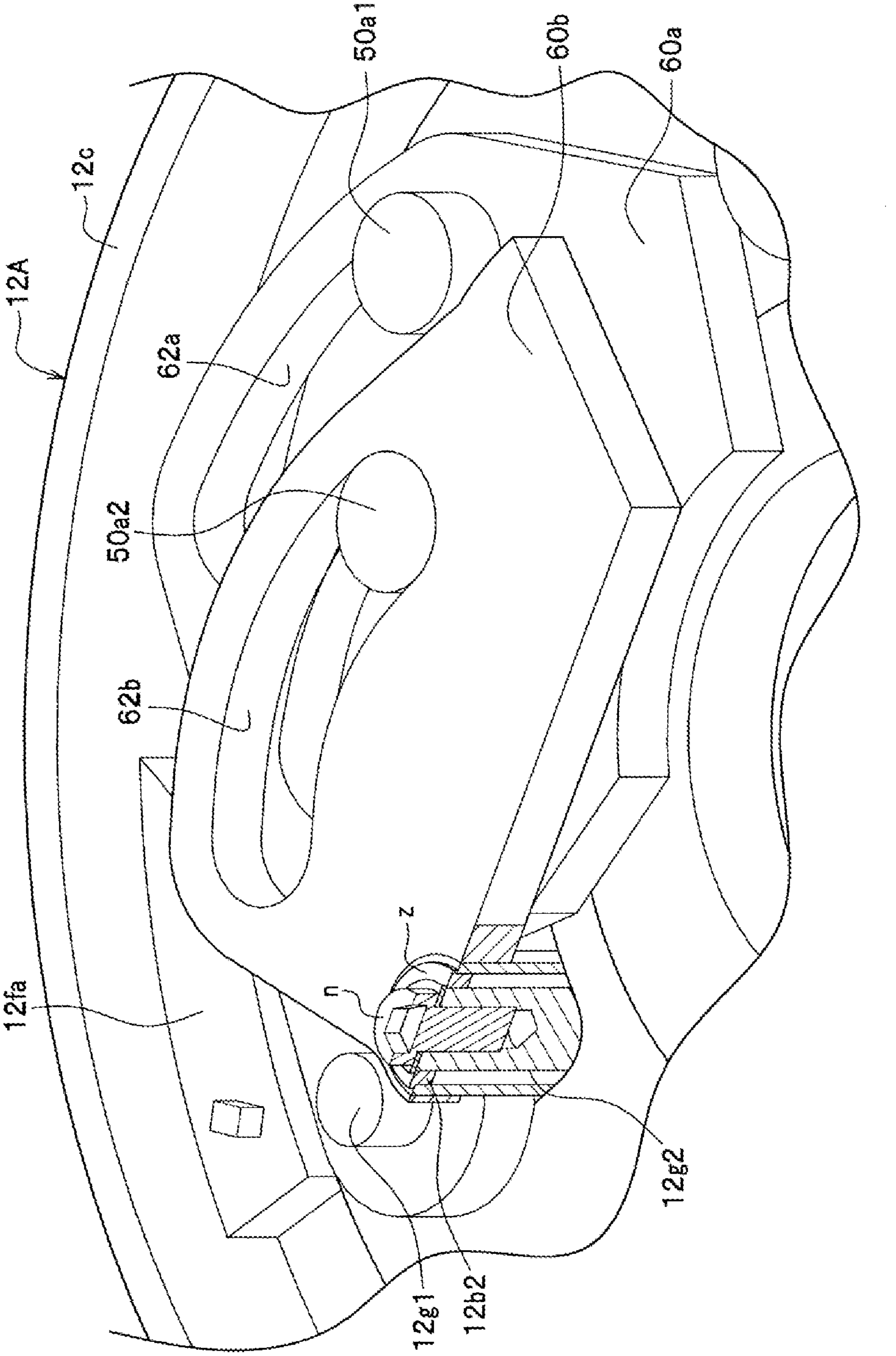
FIG. 39 is a perspective diagram illustrating another example of a method for securing the second blade member.

Moreover, while the explanation in the yet further example was for a structure wherein the first blade members 60*a* were pressed toward the second base 12A side in the fluid flow direction by the adjacent second blade members 60*b*, and second blade members 60*b* are pressed in the thrust direction by the first base 11, to secure the first base 11 to the second base 12 on the downstream side, the structure may instead be one wherein the second blade members 60*b* and the first blade members 60*a* are pressed from the outside of the second blade members 60*b* by screws n and washers z, as illustrated in FIG. 39. FIG. 39 is a perspective diagram illustrating another example of a method for securing the second blade member.

The inner ring of a bearing 12*b*2 is secured to the second shaft portion 12*g*2 that is illustrated in FIG. 39, and the outer ring of a bearing 12*b*2 is secured in an inserting portion 61*b* of the second blade member 60*b*. The bearing 12*b*2 is secured between the second shaft portion 12*g*2 and the inserting portion 61*b* of the second blade member 60*b* thereby.

Moreover, the screw n is screwed into the female threads that are threaded in the second shaft portion 12*g*2, with a washer z therebetween, to press the second blade member 60*b* in the thrust direction by the screw n and the washer z.

Note that a case wherein the boundaries between the first blade members 60*a* and the boundaries between the second blade members 60*b* partially overlapped when the flow rate controlling device A2 was fully closed was described in the yet further example, a structure wherein the boundaries between the first blade members 60*a* and the boundaries between the second blade members 60*b* do not overlap is preferred. This enables a further improvement in the tightness of seal when fully closed.

MODIFIED EXAMPLE

Figure 40:
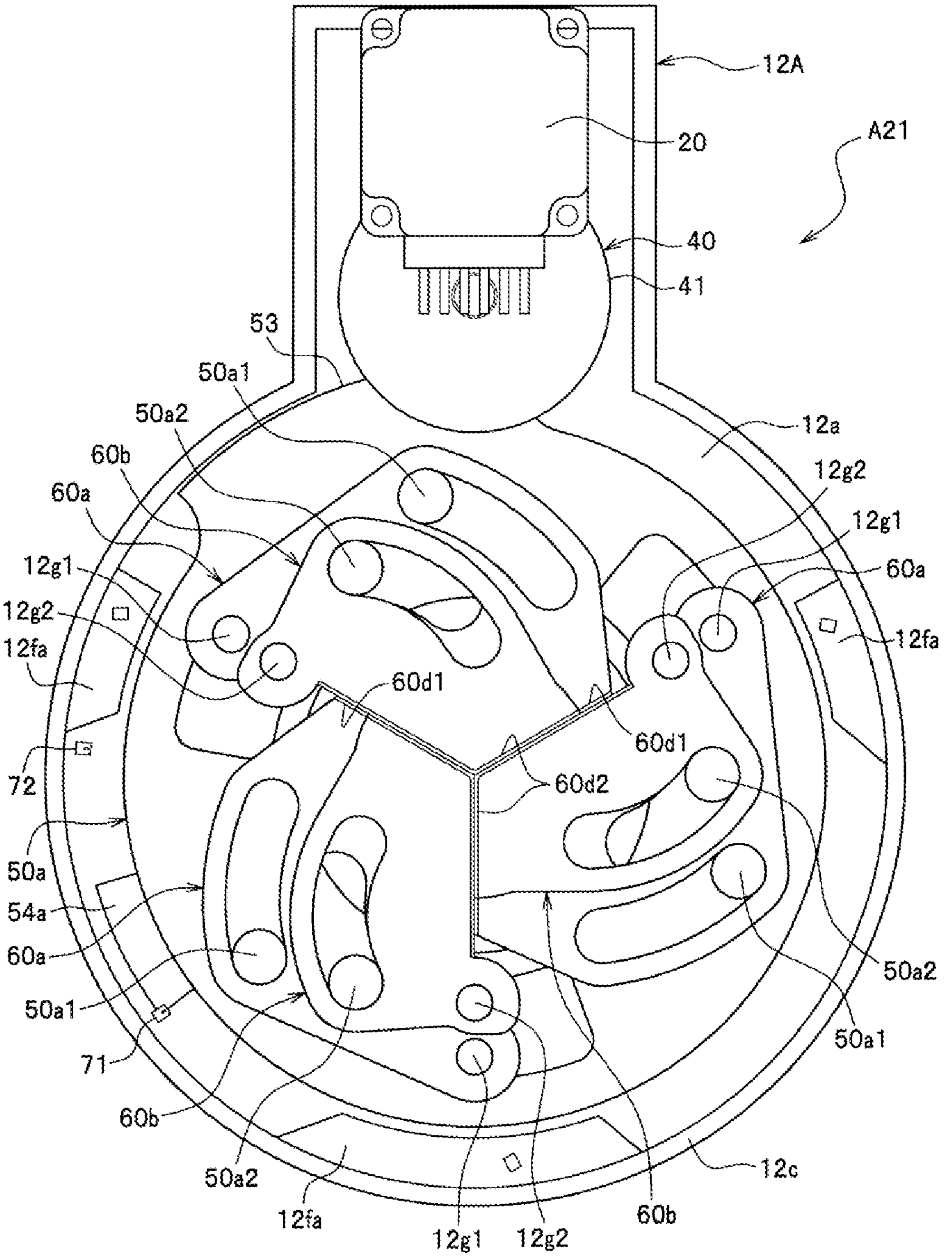
FIG. 40 is a plan view of the internal structure of a flow rate controlling device according to a first modified example of the yet further example, in a closed state, with the first base on the downstream side removed.
Figure 41:
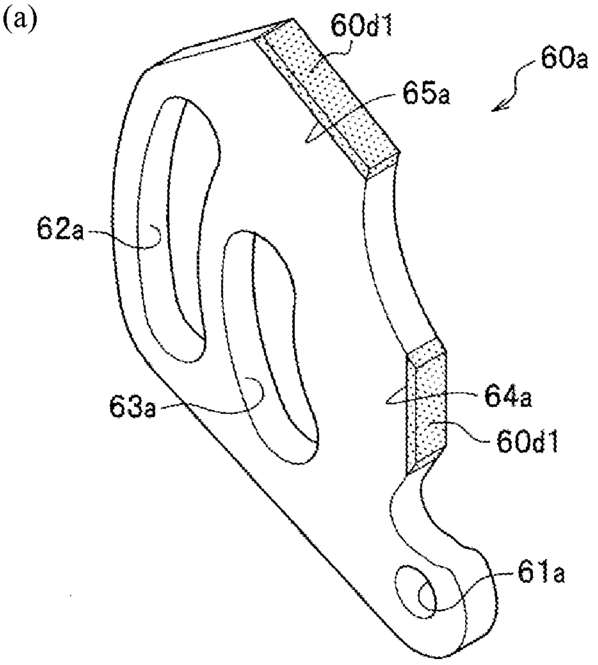
FIG. 41 (*a*) is a perspective diagram illustrating a first blade member of the first modified example of the yet further example.
Figure 41:
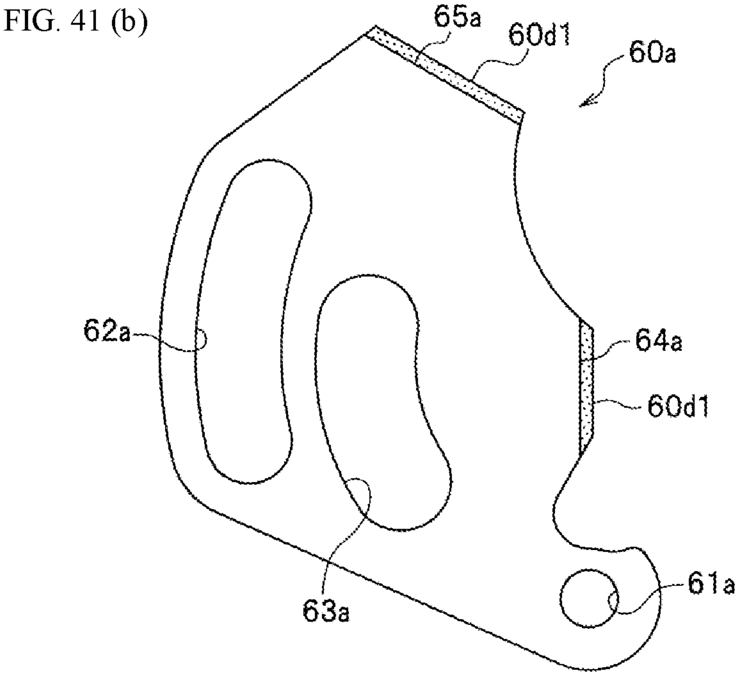

FIG. 40 is a plan view of the internal structure of a flow rate controlling device according to a modified example of the present example, in a closed state, with the first base on the downstream side removed. FIGS. 41 (*a*) and (*b*) are respectively a perspective diagram and a plan view illustrating the first blade member of the modified example of the yet further example.

In a flow rate controlling device A21 according to a modified example, elastic members 60*d*1 and 60*d*2, such as rubber members, are attached to the locations of contact of the plurality of first blade members 60*a* and the plurality of second blade members 60*b*.

The other structures are similar to those in the yet further example, where similar structures are indicated through assigning identical reference codes, and detailed explanations thereof are omitted.

As illustrated in FIGS. 41 (*a*) and (*b*), the respective elastic members 60*d*1 are secured through heat treating, or the like, to first contacting portions 64*a* and second contacting portions 65*a* of the first blade members 60*a*.

Figure 42:
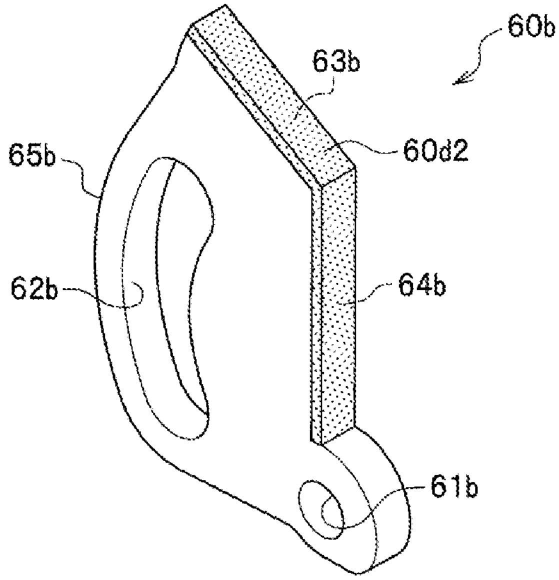
FIG. 42 (*a*) is a perspective diagram illustrating a second blade member of the first modified example of the yet further example.
Figure 42:
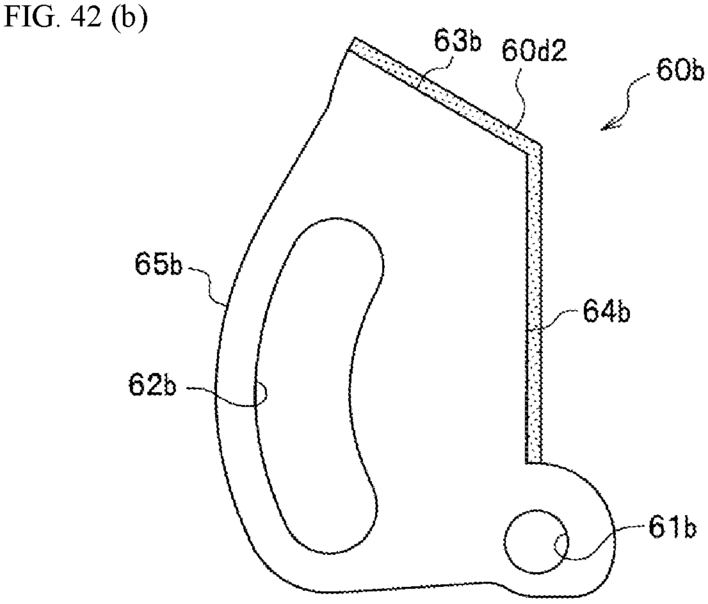

FIGS. 42 (*a*) and (*b*) are respectively a perspective diagram and a plan view illustrating the second blade member of the modified example of the yet further example.

Additionally, as illustrated in FIGS. 42 (*a*) and (*b*), the respective elastic members 60*d*2 are secured through heat treating, or the like, to first contacting portions 63*b* and second contacting portions 64*b* of the second blade members 60*b*.

The elastic members 60*d*1 and 60*d*2 use, for example, NBR, or the like. The NBR is preferred because it can be joined through heat treatments. Note that the elastic members 60*d*1 and 60*d*2 may instead be formed from another rubber material, such as silicone rubber, or the like.

Through the structure set forth above, as illustrated in FIG. 40, when the flow rate controlling device A21 is closed, the elastic member 60*d*1 of a first contacting portion 64*a* of a first blade member 60*a* will contact the elastic member 60*d*1 of a second contacting portion 65*a* of another adjacent first blade member 60*a* on one side, to cause the elastic members 60*d*1 and 60*d*1 to undergo elastic deformation, to tightly seal the gaps between adjacent first blade members 60*a*. At the same time, the elastic member 60*d*1 of the second contacting portion 65*a* of a first blade member 60*a* will contact the elastic member 60*d*1 of the first contacting portion 64*a* of an adjacent first blade member 60*a*, and the elastic members 60*d*1 and 60*d*1 will undergo elastic deformation, to tightly seal the gaps between adjacent first blade members 60*a*.

Moreover, when the flow rate controlling device A21 is closed, the elastic member 60*d*2 of the first contacting portion 63*b* of a second blade member 60*b* will contact the elastic member 60*d*2 of the second contacting portion 64*b* of an adjacent second blade member 60*b*, and the elastic members 60*d*2 and 60*d*2 will undergo elastic deformation, to tightly seal the gaps between adjacent second blade members 60*b*. At the same time, the elastic member 60*d*2 of the second contacting portion 64*b* of a second blade member 60*b* will contact the elastic member 60*d*2 of the first contacting portion 63*b* of an adjacent second blade member 60*b*, and the elastic members 60*d*2 and 60*d*2 will undergo elastic deformation, to tightly seal the gaps between adjacent second blade members 60*b*.

As a result, this can improve the degree of sealing between the first blade members 60*a* and can improve the degree of sealing between the second blade members 60*b* when the flow rate controlling device A21 is fully closed.

Note that while, in this first modified example, a structure was explained that had elastic members 60*d*1 and 60*d*1, and elastic members 60*d*2 and 60*d*2, respectively, at both the locations of contact between the first blade members 60*a* and the locations of contact between the second blade members 60*b* when the flow rate controlling device A21 was closed, the structure instead may be one wherein the elastic members 60*d*1 or 60*d*2 are provided at the applicable locations of contact.

ANOTHER MODIFIED EXAMPLE

Figure 43:
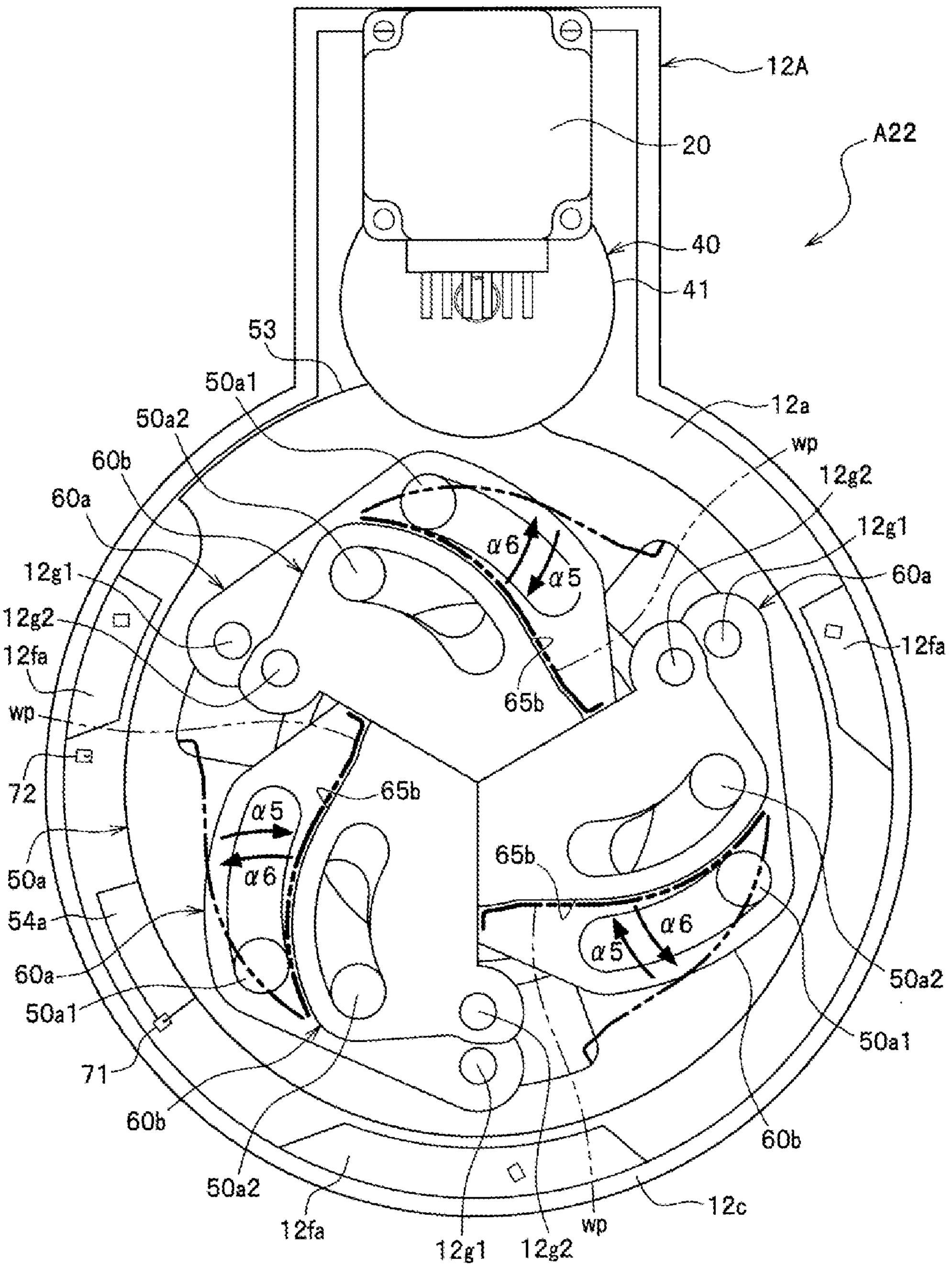
FIG. 43 is a plan view of the internal structure of a flow rate controlling device according to a second modified example of the yet further example, in a closed state, with the first base on the upstream side removed.

FIG. 43 is a plan view of the internal structure of a flow rate controlling device according to another modified example of the present example, in a closed state, with the first base on the upstream side removed.

A flow rate controlling device A22 according to another modified example is structured so as to close (seal) between the first blade members 60*a* and the second blade members 60*b*, when fully closed, through a movable closing member wp.

The other structures are similar to the structures of this example, where similar structures are indicated through assigning identical reference codes, and detailed explanations thereof are omitted.

In the flow rate controlling device A22 according to the other modified example, the movable closing members wp are either in essentially the same plane as the second blade members 60*b*, or somewhat therebelow, and are disposed further to the outside than the outer peripheral portions 65*b* of the second blade members 60*b*.

The movable closing members wp tightly seal, through an elastic force, the gaps between the second blade members 60*b* and the first blade members 60*a*, from the outer peripheral portion 65 side of the second blade members 60*b* when fully closed (referencing arrow α5 in FIG. 43).

Note that in the locations directly facing the gaps between the second blade members 60*b* and the first blade members 60*a*, the gaps are sealed through elastic deformation of elastic members, such as rubber pieces, that are provided on the movable closing members wp.

When the second blade members 60*b* and the first blade members 60*a* are moved in the opening process, the movable closing members wp, as indicated by the arrow α6 in FIG. 43, are positioned to the outside of the outer peripheral portions 65*b* of the second blade members 60*b*.

That is, the movable closing members wp are members that have the function of tightly sealing, through elastic force, the gaps between the second blade members 60*b* and the first blade members 60*a* when the flow rate controlling device A22 is fully closed, and have a structure wherein, at other times, they do not interfere with the operation of the first blade members 60*a* and the second blade members 60*b*.

Because of this, the second blade member 60*b* side of the first blade members 60*a* wherein the movable closing member wp is positioned is formed in a recessed shape so that the movable closing member wp will not interfere with the operation of the first blade member 60*a* (will not make contact).

Moreover, the biasing of the movable closing member wp in the gap between the first blade member 60*a* and the second blade member 60*b*, through elastic force, when fully closed, uses a helical coil spring, or the like. Moreover, when the movable closing member wp moves in the closing direction (arrow α5 in FIG. 43), it may be driven by a driving boss (not shown) that extends from the ring member 50*a*, and when the movable closing member wp moves in the opening direction (arrow α6 in FIG. 43), it may be pressed in the opening direction by a driving boss that extends from the ring member 50*a*.

Conversely, the structure may be one wherein the movable closing member wp is released when the movable closing member wp is opened, and the movable closing member wp is pressed in the opening member directly by the second blade member 60*b*.

Given the structure set forth above, when the flow rate controlling device A22 is fully closed, the gaps between the second blade members 60b and the first blade members 60a are tightly closed by the movable closing members wp, further improving the degree of sealing when the flow rate controlling device A22 is fully closed.

Note that the structure may be one wherein, instead of the movable closing member wp, recessed portions or protruding portions are provided with protruding portions or recessed portions corresponding thereto provided in the second blade members 60b in the first blade members 60a as means for sealing the gaps between the second blade members 60b and the first blade members 60a when the flow rate controlling device A22 is fully closed, so as to improve the performance of sealing between the second blade members 60b and the first blade members 60a through the protruding portions and the recessed portions fitting together when the flow rate controlling device A22 is fully closed.

Conversely, elastic members, such as rubber, or the like, may be provided at these protruding portions and/or recessed portions to seal the gaps between the protruding portions and the recessed portions through elastic deformation of the elastic members when the flow rate controlling device A22 is fully closed.

FURTHER MODIFIED EXAMPLE

Figure 44:
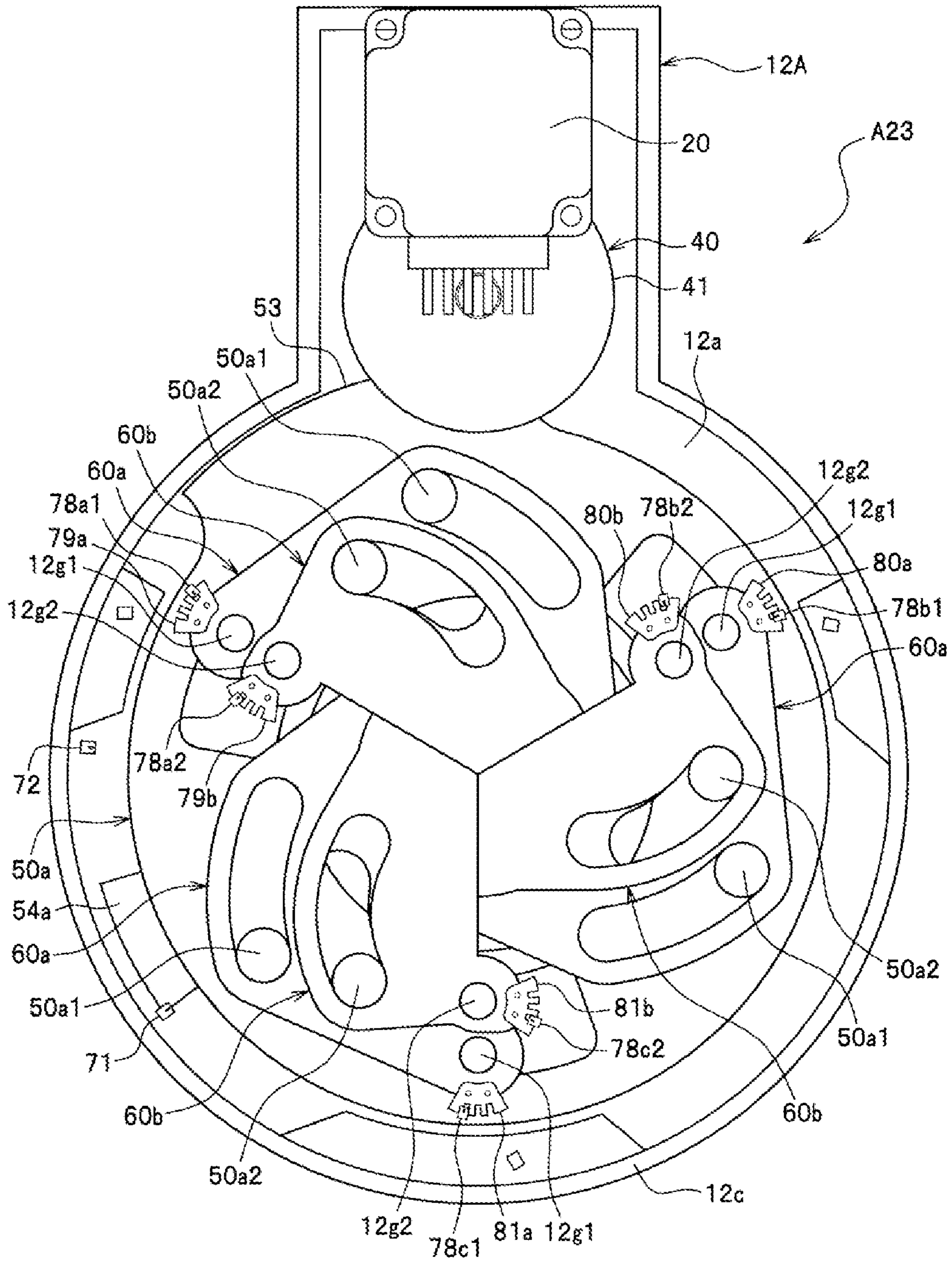
FIG. 44 is a plan view of the internal structure of a flow rate controlling device according to a third modified example of the yet further example, in a closed state, with the first base on the upstream side removed.

FIG. 44 is a plan view of the internal structure of a flow rate controlling device according to a further modified example of the present example, in a closed state, with the first base on the upstream side removed.

In the flow rate controlling device A23 set forth in the present Modified Example, rotation operation detecting means are provided on the first blade members 60a and the second blade members 60b for detecting rotational operation thereof.

The other structures are similar to the structures of the present main example, where similar structures are indicated through assigning identical reference codes, and detailed explanations thereof are omitted.

In the flow rate controlling device A23, sensors 78a1, 78b1, and 78c1 for detecting the fully opened states and fully closed states of the three respective first blade members 60a are provided on the second base 12A. Additionally sensors 78a2, 78b2, and 78c2 for detecting the fully opened states and fully closed states of the three respective second blade members 60b are provided on the second base 12A.

On the other hand, detected gears 79a, 80a, and 81a for detection, by the sensors 78a1, 78b1, and 78c1, of the positions of the respective first blade members 60a, having recessed portions that are light-passing portions and protruding portions that are light-blocking portions, are provided on the three first blade members 60a.

Moreover, detected gears 79b, 80b, and 81b for detection, by the sensors 78a2, 78b2, and 78c2, of the positions of the respective second blade members 60b, having recessed portions that are light-passing portions and protruding portions that are light-blocking portions, are provided on the three second blade members 60b.

Note that in this present example, a case wherein the detected gears 79a, 80a, and 81a are provided as separate units from the respective first blade members 60a is explained as an example, but the detected gears 79a, 80a, and 81a may instead be formed integrally with the first blade members 60a. Moreover, a case wherein the detected gears 79b, 80b, and 81b are provided as separate units from the respective second blade members 60b is explained as an example, but the detected gears 79b, 80b, and 81b may instead be formed integrally with the second blade members 60b.

<Sensors 78a1, 78b1, 78c1, 78a2, 78b2, 78c2>

Photointerrupters that use infrared radiation, for example, are used in the sensors 78a1, 78b1, and 78c1 for detecting the movement of the first blade members 60a (the detected gears 79a, 80a, and 81a). Note that while these may instead be photointerrupters that use visible light, in the case of visible light, other light may be received instead, so preferably photointerrupters that use infrared radiation are used.

Conversely, the sensors 78a1, 78b1, and 78c1 may use sensors other than photointerrupters, such as magnetic sensors or reflective sensors that use reflecting plates; however, a photointerrupter is most preferred because the boundary between blocking light and passing light can be detected clearly in the case of a photointerrupter.

The sensors 78a2, 78b2, and 78c2, for detecting movement of the second blade members 60b (the detected gears 79b, 80b, and 81b), are the same as the sensors 78a1, 78b1, and 78c1, described above.

The beams of infrared radiation of the photointerrupters of the sensors 78a1, 78b1, and 78c1 being blocked or passing through the recessed portions of the light-passing portions or the protruding portions of the light-blocking portions of the respective detected gears 79a, 80a, and 81a is detected, making it possible to detect whether or not the first blade members 60a of the flow rate controlling device A22 are operating properly to be fully opened, fully closed, or in an intermediate state between fully opened and fully closed.

Similarly, the beams of infrared radiation of the photointerrupters of the sensors 78a2, 78b2, and 78c2 being blocked or passing through the recessed portions of the light-passing portions or the protruding portions of the light-blocking portions by the respective detected gears 79b, 80b, and 81b is detected, making it possible to detect whether or not the second blade members 60b of the flow rate controlling device A22 are operating properly to be fully opened, fully closed, or in an intermediate state between fully opened and fully closed.

Given the structure set forth above, detected gears 79a, 80a, and 81a and sensors 78a1, 78b1, and 78c1 that are rotational operation detecting means for detecting the rotational operation of the individual first blade members 60a are provided, making it possible to detect whether or not the individual first blade members 60a are operating properly.

Similarly, detected gears 79b, 80b, and 81b and sensors 78a2, 78b2, and 78c2 that are rotational operation detecting means for detecting the rotational operation of the individual second blade members 60b are provided, making it possible to detect whether or not the individual second blade members 60b are operating properly.

Consequently, problems in the flow rate controlling device A23 can be discovered rapidly, enabling the performance of the flow rate controlling device A23 to be improved, and enabling maintenance, and the like, to be performed promptly. This enables an improvement in reliability of the flow rate controlling device A23.

Figure 45:
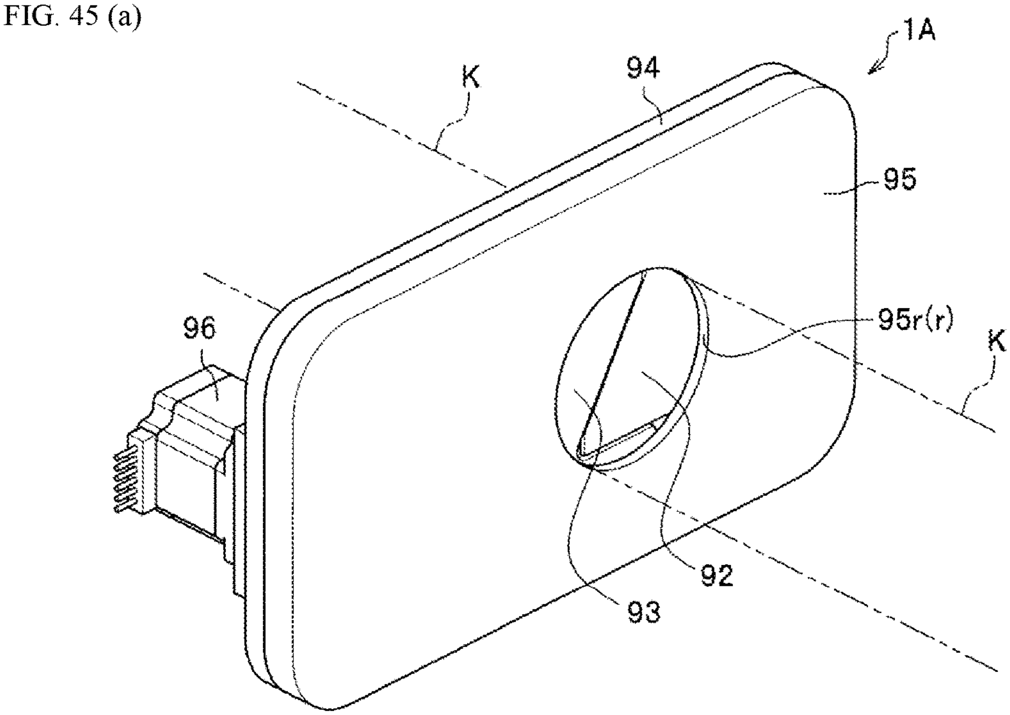
FIG. 45 (*a*) is a perspective diagram wherein a flow rate controlling device according to yet another example according to the present invention is closed.
Figure 45:
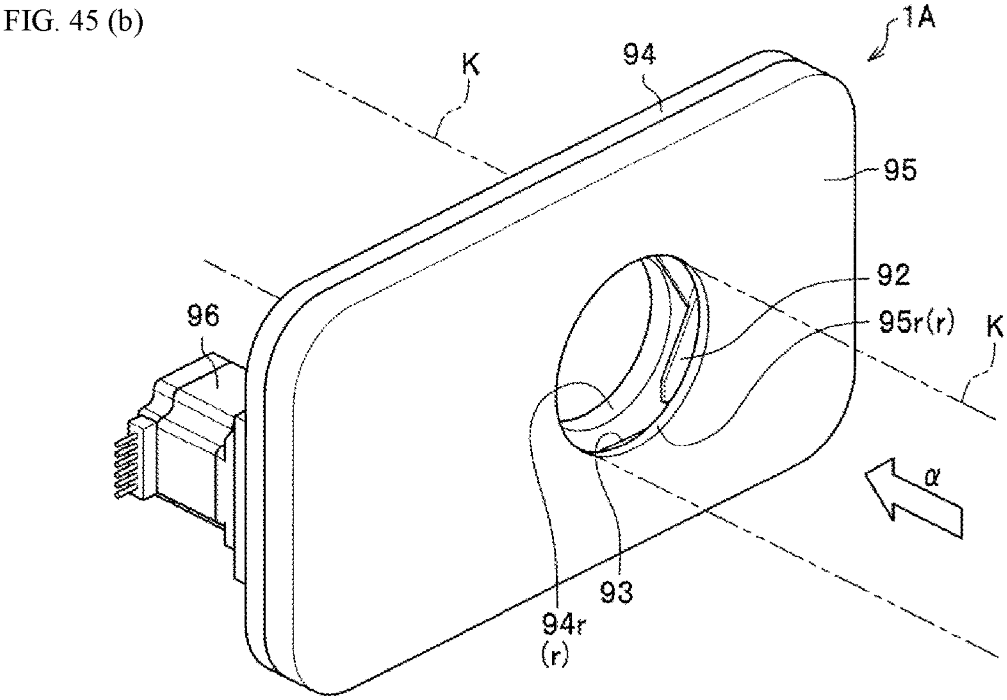

FIG. 45 (a) is a perspective diagram wherein a flow rate controlling device according to an example according to the present invention is closed; and FIG. 45 (b) is a perspective diagram when the flow rate controlling device is open.

The flow rate controlling device 1A of this example is a valve device that is installed in a pipe K, for opening and closing first and second blade members 92 and 93 to control the flow rate of a fluid that flows through the pipe K.

When the flow rate controlling device 1A is fully closed, illustrated in FIG. 45 (*a*), the first blade member 92 and second blade member 93 are closed, and the fluid that flows in the pipe K (referencing the white arrow α in FIG. 45 (*b*)) is stopped.

On the other hand, when the flow rate controlling device 1A is fully opened, illustrated in FIG. 45 (*b*), the first blade members 92 and the second blade members 93 are positioned to the outside of the flow path r (94*r* and 95*r*), so that the flow path r that communicates with the pipe K will be in a fully opened state.

Note that the flow rate controlling device 1A, of course, can be placed in, for example, half-opened state that is an intermediate state between the closed state of FIG. 45 (*a*) and the fully opened state of FIG. 45 (*b*).

The flow rate controlling device 1A may be used in, for example, a throttle valve of a vehicle. Note that the flow rate controlling device 1A, of course, can be applied broadly, as appropriate, to valve devices other than throttle valves.

Figure 46:
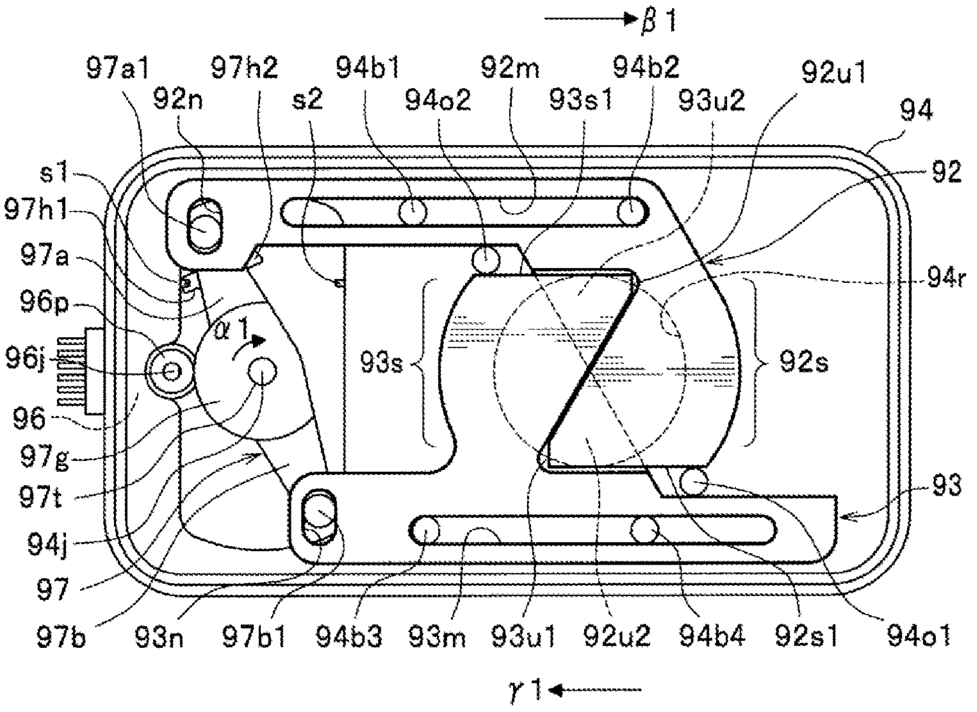
FIG. 46 (*a*) is a front view illustrating the internal structure when the flow rate controlling device is closed.
Figure 46:
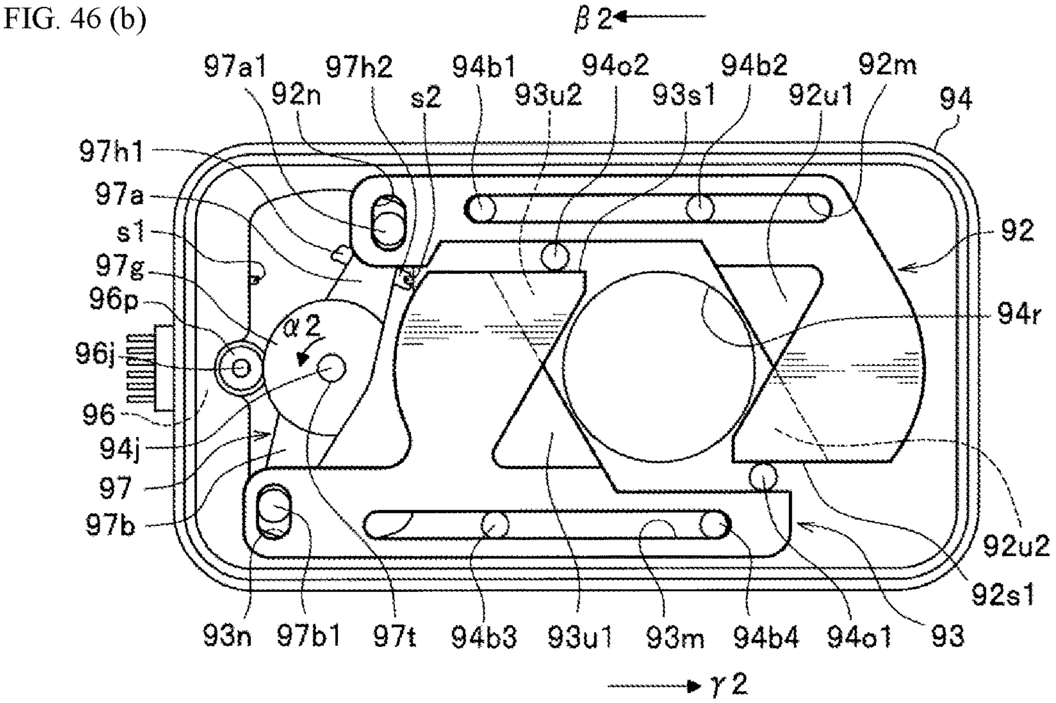

FIG. 46 (*a*) is a front view illustrating the internal structure when the flow rate controlling device is closed; and FIG. 46 (*b*) is a front view illustrating the structure when the flow rate controlling device is open.

Figure 47:
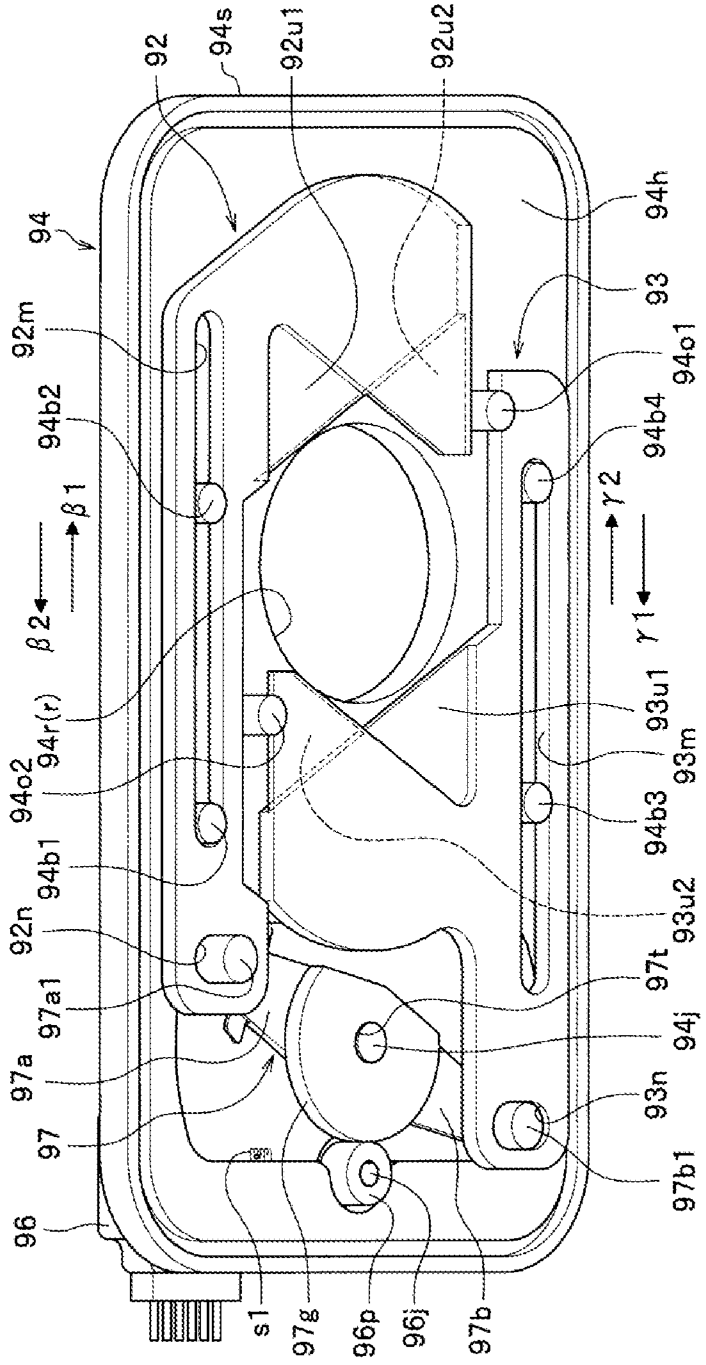
FIG. 47 is a perspective diagram of the interior of the flow rate controlling device, in a fully opened state, when viewed from the front at an angle.

FIG. 47 is a perspective diagram of the interior of the flow rate controlling device, in a fully opened state, when viewed from the front at an angle.

Figure 48:
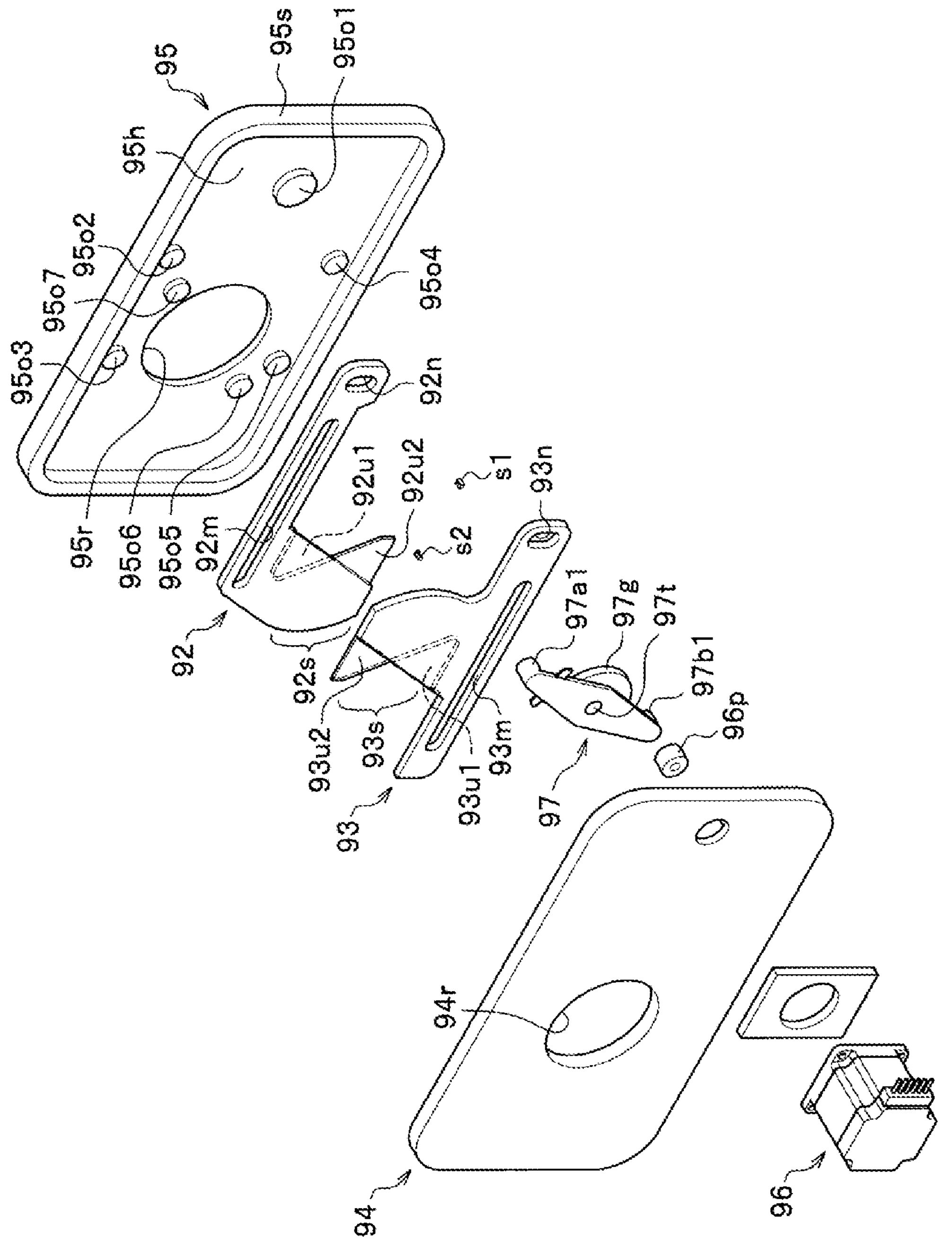
FIG. 48 is an exploded view when the flow rate controlling device is viewed from the back side.

FIG. 48 is an exploded view when the flow rate controlling device is viewed from the back side.

The flow rate controlling device 1A comprises first and second bases 94 and 95, for forming a frame unit, first and second blade members 92 and 93 for forming a valve unit, and a motor 96.

The fluid flows within the pipe K from the second base 95 in the direction of the first base 94 of the flow rate controlling device 1A (referencing the white arrow α in FIG. 45(*b*)).

The first and second blade members 92 and 93 open and close the openings 94*r* and 95*r* (the flow path r) that are formed in the first and second bases 94 and 95. The motor 96 is a driving source for opening and closing the first and second blade members 92 and 93, and uses, for example, a stepping motor.

When a stepping motor is used for the motor 96, the stepping operations of the motor are summed together, and thus preferably a reduction mechanism is used and the reduction ratio is high, to smooth the operation. Note that the motor 96 may use a motor other than a stepping motor, such as an AC motor, a DC motor, or the like. In such case, there is no stepping operation, so the operation is smooth, and thus the speed reducing mechanism need not be used.

The full closing operation of the first and second blade members 92 and 93 is detected by a sensor s1 (referencing FIG. 46 (*a*)), and the full opening operation of the first and second blade members 92 and 93 is detected by a sensor s2 (referencing FIG. 46 (*b*)).

A pinion 96*p* of the speed reducing mechanism is secured to a rotary shaft 96*j* of the motor 96.

The flow rate controlling device 1A is controlled by a controlling device, not shown, such as, for example, an ECU (Engine Control Unit). The controlling device may be structured including, for example, a microcomputer, a D/A and A/D converter, a motor controlling circuit, a sensor circuit, and the like.

<First Base 94>

Figure 49:
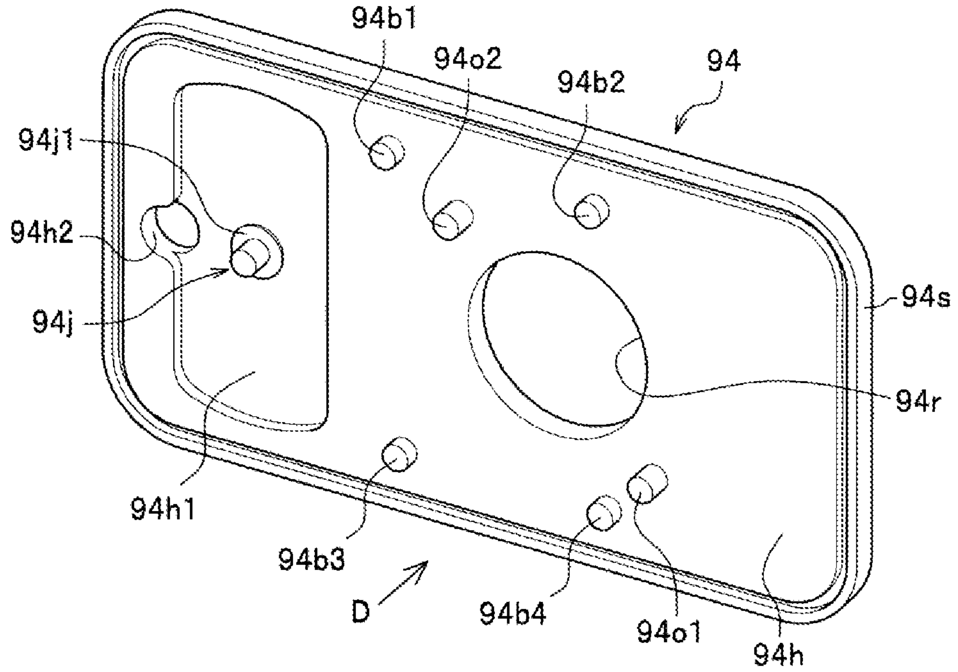
FIG. 49 (*a*) is a perspective diagram wherein the first base is viewed from the front at an angle.
Figure 49:
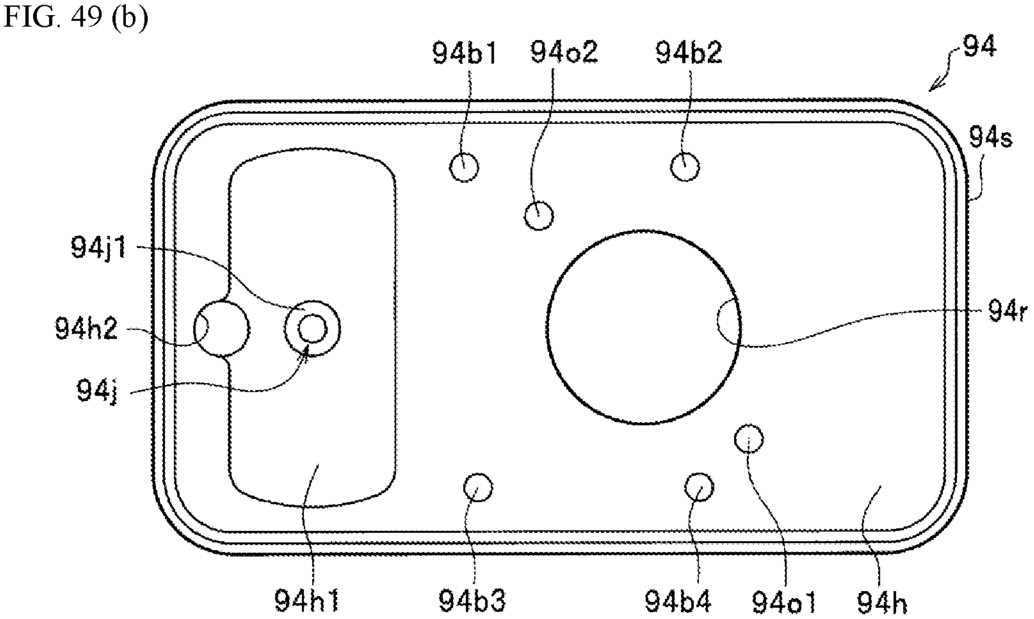

FIG. 49 (*a*) is a perspective diagram wherein the first base is viewed from the front at an angle; and FIG. 49 (*b*) is a view of FIG. 49 (*a*) in the direction of the arrow D.

The first base 94 is formed with a flat rectangular plate-shaped flat plate portion 94*h*, and a peripheral wall portion 94*s* that is provided extending, with a low height, from the peripheral edge of the flat plate portion 94*h*. The first base 94 is formed through, for example, aluminum die casting using aluminum.

A recessed portion 94*h*1 having a recessed shape into which a driving lever 97 (referencing FIG. 47), described below, is provided recessed, with a prescribed area, in the flat plate portion 94*h* of the first base 94. Moreover, a pinion inserting hole 94*h*2, which is a circular hole into which the pinion 96*p* of the motor 96 is inserted, and an opening 94*r*, which is a circular inserting hole in which is formed a flow path r that connects to the pipe K, are formed in the flat plate portion 94*h*.

A support shaft boss 94*j*, first through fourth guide bosses 94*b*1 through 94*b*4, and first and second retaining bosses 94*o*1 and 94*o*2 are provided protruding from the flat plate portion 94*h*. These bosses (94*j*, 94*b*1 through 94*b*4, 94*o*1, and 94*o*2) may be formed integrally with the flat plate portion 94*h*, or may be provided by the flat plate portion 94*h* of the first base 94 through insertion of stainless steel pins, adhesive bonding, or the like.

Here the support shaft boss 94*j* is a stepped boss, where the stepped boss is formed in a stepped shape, integrated with the recessed portion 94*h*1. A rotary shaft hole 97*t* of the center portion of the driving lever 97 is formed in the support shaft boss 94*j*. Additionally, the rotary shaft hole 97*t* for the driving lever 97 is supported in the support shaft boss 94*j*, and the driving lever 97 is operated rotationally.

When the driving lever 97 (referencing FIG. 47) is rotated, it slides into a narrow region of the stepped portion 94*j*1 of the stepped boss, and thus the operation of the rotational motion of the driving lever 97 is stabilized. The support shaft boss 94*j* above the stepped portion 94*j*1 is formed so as to be longer in the axial direction than the rotary shaft hole 97*t* of the driving lever 97.

The first and second guide bosses 94*b*1 and 94*b*2 guide the sliding movement of the first blade member 92. Because of this, the first and second guide bosses 94*b*1 and 94*b*2 are formed so as to be longer than the thickness dimension of the first blade member 92, so as to not interfere with the sliding movement. The first retaining boss 94*o*1 is that which is used for preventing the influence of the first blade member 92. Because of this, the first retaining boss 94*o*1 is formed so as to be longer than the thickness dimension of the first blade member 92, so as to not interfere with the sliding movement of the first blade member 92.

The third and fourth guide bosses 94*b*3 and 94*b*4 guide sliding movement of the second blade member 93. Because of this, the third and fourth guide bosses 94*b*3 and 94*b*4 are formed so as to be longer than the thickness dimension of the second blade member 93.

The second retaining boss 94*o*2 is that which is used for preventing the influence of the second blade member 93. Because of this, the second retaining boss 94*o*2 is formed so as to be longer than the thickness dimension of the second blade member 93, so as to not interfere with the sliding movement of the second blade member 93.

Bearings, such as ball bearings or oil-including bearings, or the like, are secured to the support shaft boss 94*j*, first through fourth guide bosses 94*b*1 through 94*b*4, and first and second retaining bosses 94*o*1 and 94*o*2. The provision of the bearing members, such as ball bearings or oil-including metal bearings, or the like, cause the ball bearings to roll due to slipping friction of the sliding operations (linear motion) of the first and second blade members 92 and 93, or provide a lubricant in the bearing members, such as oil-including metal bearings, or the like, so that the sliding operations of the first and second blade members 92 and 93 will be achieved smoothly.

<Second Base 95>

As illustrated in FIG. 48, the second base 95 is formed with a flat rectangular plate-shaped flat plate portion 95h, and a peripheral wall portion 95s that is provided extending, with a low height, from the peripheral edge of the flat plate portion 95h. The second base 95 is formed through, for example, aluminum die casting using aluminum. As illustrated in FIG. 45 and FIG. 46, the second base 95 and the first base 94 are assembled through being combined and secured together, and so have essentially the same dimension as the first base 94 in the direction in which the second base 95 extends.

An opening 95r of a circular inserting hole for forming a flow path r for connecting to the pipe K is formed in the flat plate portion 95h of the second base 95.

On the flat plate portion 95h of the second base 95, first through seventh retaining bosses 95o1 through 95o7 are provided formed integrally, protruding from positions that face and contact the respective shaft support boss 94j, first through fourth guide bosses 94b1 through 94b4, and first and second retaining bosses 94o1 and 94o2 that are provided on the first base 94. The first through seventh retaining bosses 95o1 through 95o7 have thicknesses that are thicker than the various respective bosses (94j, 94b1 through 94b4, 94o1, and 94o2) of the first base 94.

Figure 50:
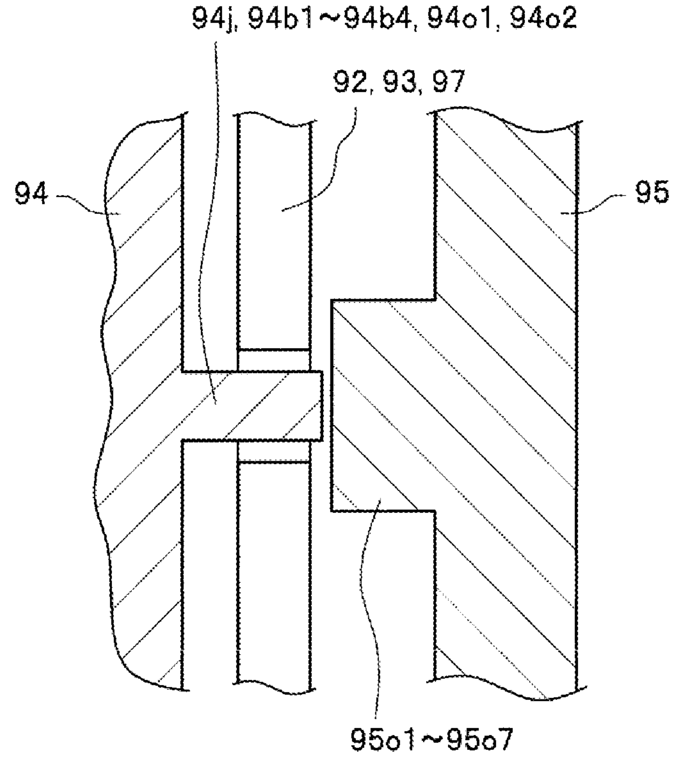
FIG. 50 is a cross-sectional view illustrating the relationships between a support shaft boss, first through fourth guide bosses, and first and second retaining bosses that are provided on the first base, and first through seventh retaining bosses of the second base.

FIG. 50 is a cross-sectional view illustrating the relationships between a support shaft boss, first through fourth guide bosses, and first and second retaining bosses that are provided on the first base, and first through seventh retaining bosses of the second base.

The first through seventh retaining bosses 95o1 through 95o7 of the second base 95 function to suppress fanning, to the outside of the first base 94 (to the second base 95 side), by the driving lever 97 and the first and second blade members 92 and 93.

Note that the "fanning . . . by the driving lever 97 and the first and second blade members 92 and 93" refers to the driving lever 97 and the first and second blade members 92 and 93 moving in the plate thickness direction due to the pressure of the fluid.

<Driving Lever 97>

A reduction gear 97g (referencing FIG. 47) that is formed integrally with the driving member 97 meshes with the pinion 96p that is secured to the rotary shaft 96j of the motor 96.

The driving lever 97 has a flat shape, and is supported rotatably on the support shaft boss 94j that is provided protruding from the first base 94. The driving lever 97 is manufactured through, for example, aluminum die casting using aluminum.

The driving lever 97 is formed with a reduction gear 97g, through which the support shaft boss 94j passes, at a rotary shaft hole 97t in the center portion, and, on a back portion side, a first arm 97a and a second arm 97b are formed in arm shapes that become narrower the further toward the outside.

A first driving boss 97a1 for moving the first blade member 92 is formed protruding toward the front from the tip end portion of the first arm 97a. A second driving boss 97b1 for moving the second blade member 93 is formed protruding toward the front from the tip end portion of the second arm 97b.

When the first base 94 and the second base 95 are combined and secured together, the first retaining boss 95o1 (referencing FIG. 48) of the second base 95, which is thicker than the support shaft boss 94j will contact or be in proximity (referencing FIG. 50) to the tip end portion of the support shaft boss 94j of the first base 94, which is inserted into the rotary shaft hole 97t of the driving lever 97. This prevents the driving lever 97 from coming off of the support shaft boss 94j of the first base 94.

<First Blade Member 92>

The first blade member 92 is a plate-shaped member, and has a blocking portion 92s (referencing FIG. 48).

The blocking portion 92s of the first blade member 92 is a region that closes the openings 94r and 95r (the flow path r) of the first and second bases 94 and 95.

The blocking portion 92s of the first blade member 92 has a first thin plate portion 92u1 that is formed continuously with one face thereof, and wherein the other face is recessed and has a thin plate thickness (referencing FIG. 46 (b) and FIG. 48), and a second thin plate portion 92u2 that is formed continuously with the other face, and that, on the first face, is recessed with a thin plate thickness (referencing FIG. 46 (b) and FIG. 48), and is formed in a stepped shape.

The first thin plate portion 92u1 and the second thin plate portion 92u2 each have planar shapes that are respectively essentially triangles.

The first blade member 92 is formed with a first elongated hole 92n into which is fitted slidably a first driving boss 97a1 for the driving lever 97, and a second elongated hole 92m into which are fitted first and second guide bosses 94b1 and 94b2 that are provided protruding from the first base 94.

The first blade member 92 is guided so as to undergo sliding movement (linear motion) in the lengthwise direction of the second elongated hole 92m, through the first and second guide bosses 94b1 and 94b2 being fitted into the second elongated hole 92m of the first blade member 92.

Furthermore, through the first driving boss 97a1 of the driving lever 97 being fitted into the first elongated hole 92n of the first blade member 92, the rotational motion of the driving lever 97 (referencing the arrow α1 and the arrow α2 of FIG. 46 (a) and FIG. 46 (b)) is converted and transmitted into sliding motion (linear motion) of the first blade member 92 (referencing the arrow (31 and the arrow (32 in FIG. 46 (a) and FIG. 46 (b)).

The tip edge 92s1 of the blocking portion 92s of the first blade member 92 is provided in proximity to the first retaining boss 94o1 of the first base 94.

Given the structure set forth above, when the second base 95 is combined with the first base 94 with the second elongated hole 92m of the first blade member 92 provided with the first and second guide bosses 94b1 and 94b2 of the first base 94 inserted, the second retaining boss 95o2, third retaining boss 95o3, and sixth retaining boss 95o6, of the second base 95, which are thicker than the individual bosses of the first base 94 (94b1, 94b2, and 94o1), will be in contact with, or in proximity to, the respective tip end portions of the first and second guide bosses 94b1 and 94b2, and the first retaining boss 94o1 (referencing FIG. 50) of the first base 94.

Through this, the fanning of the first blade member 92 by the fluid pressure is prevented, and the second elongated hole 92m of the first blade member 92 is prevented from coming off of the first and second guide bosses 94b1 and 94b2 of the first base 94. The "fanning of the first blade member 92" refers to the first blade member 92 moving in the direction of thickness of the plate due to the pressure of the fluid.

<Second Blade Member 93>

The second blade member 93 is a plate-shaped member, and has a blocking portion 93*s* (referencing FIG. 48). The blocking portion 93*s* of the second blade member 93 is a region that closes the openings 94*r* and 95*r* (the flow path r) of the first and second bases 94 and 95.

The blocking portion 93*s* of the second blade member 93 has a first thin plate portion 93*u*1 that is formed continuously with one face thereof, and wherein the other face is recessed and has a thin plate thickness (referencing FIG. 46 (*b*) and FIG. 48), and a second thin plate portion 93*u*2 that is formed continuously with the other face, and that, on the first face, is recessed with a thin plate thickness (referencing FIG. 46 (*b*) and FIG. 48), and is formed in a stepped shape.

The first thin plate portion 93*u*1 and the second thin plate portion 93*u*2 each have planar shapes that are respectively essentially triangles.

The first thin plate portion 93*u*1 and the second thin plate portion 93*u*2 of the second blade member 93 form a closed state, overlapping, respectively, the second thin plate portion 92*u*2 and the first thin plate portion 92*u*1 of the first blade member 92 when the flow path r, illustrated in FIG. 46 (*a*) is fully closed. This structure enables the gap that is formed in the flow path r to be extremely small despite there being a slight gap between the first blade member 92 and the second blade member 93 when the flow path r is fully closed.

As illustrated in FIGS. 46 (*a*) and (*b*), the second blade member 93 is formed with a first elongated hole 93*n* into which the second driving boss 97*b*1 of the driving lever 97 fits slidably, and a second elongated hole 93*m* into which is fitted third and fourth guide bosses 94*b*3 and 94*b*4 that are provided protruding from the first base 94.

Through the third and fourth guide bosses 94*b*3 and 94*b*4 being fitted into the second elongated hole 93*m* of the second blade member 93, the second blade member 93 will be guided so as to move sliding in the lengthwise direction of the second elongated hole 93*m* (to undergo linear motion).

Furthermore, through the second driving boss 97*b*1 of the driving lever 97 being fitted into the first elongated hole 93*n* of the second blade member 93, the rotational motion of the driving lever 97 (referencing the arrow α1 and the arrow α2 of FIG. 46 (*a*) and FIG. 46 (*b*)) is converted and transmitted into linear motion (sliding motion) of the first blade member 93 (referencing the arrow γ1 and the arrow γ2 in FIG. 46 (*a*) and FIG. 46 (*b*)).

The tip edge 93*s*1 of the blocking portion 93*s* of the second blade member 93 is provided in proximity to the second retaining boss 94*o*2 of the first base 94.

Given the structure set forth above, when the second base 95 is combined with the first base 94 with the second elongated hole 93*m* of the second blade member 93 provided with the third and fourth guide bosses 94*b*3 and 94*b*4 of the first base 94 inserted, the fourth retaining boss 95*o*4, fifth retaining boss 95*o*5, and seventh retaining boss 95*o*7, of the second base 95, which are thicker than the individual bosses of the first base 94 (94*b*3, 94*b*4, and 94*o*2), will be in contact with, or in proximity to, the respective tip end portions of the third and fourth guide bosses 94*b*3 and 94*b*4, and the second retaining boss 94*o*2 (referencing FIG. 50) of the first base 94.

Through this, the fanning of the second blade member 93 by the fluid pressure is prevented, and the second elongated hole 93*m* of the second blade member 93 is prevented from coming off of the third and fourth guide bosses 94*b*3 and 94*b*4 of the first base 94. The "fanning of the second blade member 93" refers to the second blade member 93 moving in the direction of thickness of the plate due to the pressure of the fluid.

<Sensors s1 and s2>

The sensors s1 and s2 illustrated in FIG. 46 (*a*) and FIG. 46 (*b*) are examples of a detected portion for detecting operations wherein the flow path r is fully opened or fully closed by the first and second blade members 92 and 93.

The sensors s1 and s2 are disposed at the recessed portion 94*h*1 of the first base 4, to detect the operations wherein the flow path r is fully closed or fully opened, through detecting the operation of the first arm 97*a* of the driving lever 97.

The sensors s1 and s2 are, for example, photointerrupters, equipped with respective mutually facing light-emitting portions and light-receiving portions. Light-emitting diodes, for example, are used in the light-emitting portions, and phototransistors, for example, are used in the light-receiving portions.

Detected pieces 97*h*1 and 97*h*2 are attached to the first arm 97*a* of the driving lever 97. At the time of full closure, the detected piece 97*h*1 is positioned between the light-emitting portion and the light-receiving portion of the sensor s1, blocking the reception of light by the light-receiving portion. At the time of full opening, the detected piece 97*h*2 is positioned between the light-emitting portion and the light-receiving portion of the sensor s2, blocking the reception of light by the light-receiving portion. Through this, the detected piece 97*h*1 is detected at the time of full closure, and the detected piece 97*h*2 is detected at the time of full opening, to detect the position of the driving lever 97.

As illustrated in FIG. 46 (*a*), the sensor s1 is provided at a flat plate portion 94*h* of the first base 94 at a position wherein the detected piece 97*h*1 of the first arm 97*a* is detected when the first and second blade members 92 and 93 are operated to fully close the flow path r. As illustrated in FIG. 46 (*b*), the sensor s2 is provided at a flat plate portion 94*h* of the first base 94 at a position wherein the detected piece 97*h*2 of the first arm 97*a* is detected when the first and second blade members 92 and 93 are operated to fully open the flow path r.

The controlling device carries out control so as to stop driving of the motor 96, or to correct the default state of the motor 96, depending on the detection results by the sensors s1 and s2.

Note that the sensors s1 and s2 may be sensors that detect magnetism, electrostatic capacitance, mechanical operations, or the like, rather than light, insofar as they can detect the opened and closed states of the first and second blade members 92 and 93, and the detection medium is, of course, not limited to light.

<Operation for Closing the Flow Path r of the Flow Rate Controlling Device 1A>

When the flow rate controlling device 1A is in the fully opened state, illustrated in FIG. 45 (*b*) and FIG. 46 (*b*), the detected piece 97*h*2 of the first arm 97*a* is detected by the sensor s2, so the first arm 97*a* being at the position of the opening operation is detected by the controlling device.

When a driving signal (a closing signal) is sent to the motor 96 from the controlling device, the motor 96 is driven, and the pinion 96*p* is rotated. Given this, the reduction gear 97*g* of the driving lever 97, which meshes with the pinion 96*p*, is rotated, so that the driving lever 97 rotates in the direction of the arrow α2 (referencing FIG. 46 (*b*)).

The first blade member 92 is caused to undergo sliding motion in the closing direction (the direction of the arrow (32 in FIG. 46(*b*)) through the rotation of the driving lever 97 in the direction of the arrow α2, given that the first driving boss 97*a*1 of the driving lever 97 is fitted in the first elongated hole 92*n* of the first blade member 92. Moreover, the second blade member 93 is caused to undergo sliding motion in the closing direction (the direction of the arrow γ2 in FIG. 46 (*b*)) through the second driving boss 97*b*1 of the driving lever 97 being fitted into the first elongated hole 93*n* of the second blade member 93.

When the rotation of the driving lever 97 in the direction of the arrow α2 continues and the sensor s1 detects the detected piece 97*h*1 of the first arm 97*a*, a stop signal is transmitted from the controlling device to the motor 96, as illustrated in FIG. 46 (*a*). At this time, the motor 96 is stopped, and the flow rate controlling device 1A goes into a state that is fully closed by the first and second blade members 92 and 93, and this fully closed state is maintained (referencing FIG. 45(*a*)).

When here the first and second blade members 92 and 93 are stopped in the fully closed state that is illustrated in FIG. 45 (*a*), the first and second blade members 92 and 93 are stopped prior to contacting each other, that is, there will be a gap between the first and second blade members 92 and 93. This makes it possible to prevent breakage and damage through collision of the first blade member 92 and the second blade member 93 due to control errors, tolerance of the dimensions of the members, and the like.

Figure 51:
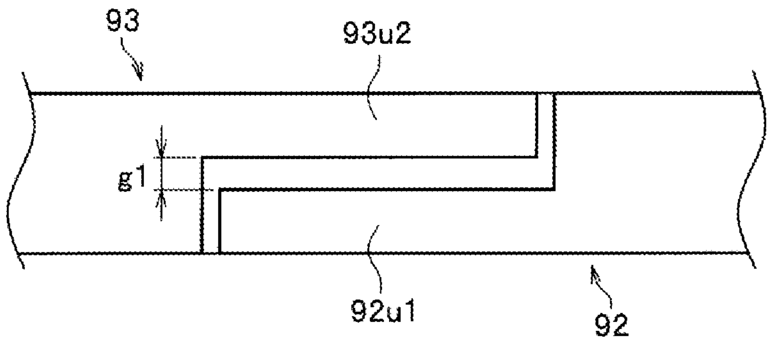
FIG. 51 is a cross-sectional view of the locations wherein a first blade member and a second blade member are overlapped when the flow rate controlling device is in a fully closed state.

FIG. 51 is a cross-sectional view of the locations wherein a first blade member and a second blade member are overlapped when the flow rate controlling device is in a fully closed state.

As illustrated in FIG. 51, the structure is one wherein there is a gap g1 between the second thin plate portion 92*u*2 of the first blade member 92 and the first thin plate portion 93*u*1 of the second blade member 93, and between the first thin plate portion 92*u*1 of the first blade member 92 and the second thin plate portion 93*u*2 of the second blade member 93, wherein the first blade member 92 and the second blade member 93 overlap.

This is that, because, the first blade member 92 in the second blade member 93 undergo sliding movement independently, there is a danger that the first blade member 92 and the second blade member 93 may deflect in the direction of thickness of the plate. Given this, by forming, in advance, a gap g1 at the location wherein the first blade member 92 and the second blade member 93 will overlap, it is possible to avoid a collision between the first blade member 92 and the second blade member 93 at the time of a closing operation.

<Operation for Opening the Flow Path r of the Flow Rate Controlling Device 1A>

When the flow rate controlling device 1A is in a fully closed state, a driving signal (an opening signal) is transmitted from the controlling device to the motor 96 (referencing FIG. 46 (*a*)), the motor 96 is driven and the pinion 96*p* is rotated. Given this, the reduction gear 97*g* of the driving lever 97, which meshes with the pinion 96*p*, is rotated, so that the driving lever 97 rotates in the direction of the arrow α1 (referencing FIG. 46 (*a*)).

The first blade member 92 is caused to undergo sliding motion in the opening direction (the direction of the arrow β1 in FIG. 46(*a*)) through the rotation of the driving lever 97 in the direction of the arrow α1, given that the first driving boss 97*a*1 of the driving lever 97 is fitted in the first elongated hole 92*n* of the first blade member 92. Moreover, the second blade member 93 is caused to undergo sliding motion in the opening direction (the direction of the arrow γ1 in FIG. 46 (*a*)) through the second driving boss 97*b*1 of the driving lever 97 being fitted into the first elongated hole 93*n* of the second blade member 93.

When the rotation of the driving lever 97 in the direction of the arrow α1 continues and the sensor s2 detects the detected piece 97*h*2 of the first arm 97*a*, a stop signal is transmitted from the controlling device to the motor 96, as illustrated in FIG. 46 (*b*). At this time, the motor 96 is stopped, and the flow rate controlling device 1A goes into a state that is fully opened by the first and second blade members 92 and 93, and this fully opened state is maintained (referencing FIG. 45 (*b*)).

Given the structure described above, the following effects are produced:

1. As illustrated in FIG. 45 (*b*) and FIG. 46 (*b*), the first blade member 92 and the second blade member 93, when the flow rate controlling device 1A is in the fully opened state, the first blade member 92 and the second blade member 93 will be positioned to the outside of the flow path r that is connected to the pipe K, rather than remaining within the flow path r. This can reduce the loss of the fluid flow when in the fully opened state greatly when compared to the conventional technology.

2. The first blade member 92 and the second blade member 93 are opened and closed by the motor 96, undergoing sliding motion, enabling an improvement in the opening/closing resolution of the flow rate controlling device 1A.

3. The first blade member 92 and the second blade member 93 are supported in a plane by the flat plate portion 94*h* of the first base 94, causing the rigidity to be high.

4. The first thin plate portion 92*u*1 and the second thin plate portion 92*u*2 are provided in the first blade member 92 and, additionally, the second thin plate portion 93*u*2 and the first thin plate portion 93*u*1 are provided in the second blade member 93, with a structure that is overlapping when the flow rate controlling device 1A is in a fully closed state (referencing FIG. 46 (*a*)). This makes it possible to minimize the gap in the direction of flow fluid flow, formed between the first blade member 92 and the second blade member 93 when the flow rate controlling device 1A is in the fully closed state.

5. The structure is one wherein the second base 95 is disposed upstream in the direction of flow of the fluid in the pipe K and the first base 94 is disposed downstream in the direction of flow, and the first blade member 92 and the second blade member 93 are pressed, by the pressure of the flow of the fluid, against the first base 94 that is a supporting member, enabling prevention of the first blade member 92 and the second blade member 93 coming off of the first base 94 that is the supporting member.

6. The structure is one wherein the second base 95 is disposed upstream in the direction of flow of the fluid in the pipe K and the first base 94 is disposed downstream in the direction of flow, and the first blade member 92 and the second blade member 93 are pressed, by the pressure of the flow of the fluid, against the first base 94 that is a supporting member, so the first blade member 92 and the second blade member 93 are pressed against the flat plate portion 94*h* of the first base 94, enabling an increase in the sealing performance between the first blade member 92 and second blade member 93 and the first base 94.

7. The first blade member 92 and the second blade member 93 move in synchronization, enabling driving by a single driving source motor 96, thereby enabling the number of driving sources to be minimized. This enables simplification of the structure and a reduction in the manufacturing cost.

8. The first through seventh retaining bosses **95*o*1 through 95*o*7 are provided integrally, protruding from the second base member 95, and the driving lever 97, the first blade member 92, and the second blade member 93 are retained, enabling prevention of the driving lever 97, the first blade member 92, and the second blade member 93** from fanning and coming off.

9. The first through seventh retaining bosses **95*o*1 through 95*o*7 are formed integrally with the second base member 95, enabling them to be formed integrally, reducing manufacturing costs. Moreover, the structure that retains the driving lever 97, the first blade member 92, and the second blade member 93 is produced through merely assembling the first base member 94 and the second base member 95**, so the manufacturability is good, and the assembly cost can be reduced.

10. Bearings are provided at the sliding locations of the driving lever 97, the first blade member 92, and the second blade member 93, enabling the operation of the driving lever 97, the first blade member 92, and the second blade member 93 to be carried out smoothly and with stability, so that the operational reliability is high.

11. In the flow rate controlling device 1A the structure is one wherein the flow path r is opened and closed by a sliding motion of the first blade member 92 and the second blade member 93, enabling the structure to be thin, thus enabling a reduction in size.

12. The structure is one wherein no member need exist within the flow path when fully opened, enabling maximizing of the flow rate. Moreover, this enables control of the flow rate to near the limit when fully closed.

13. Given the above, a flow rate controlling device that has a simple structure wherein there is little loss, because the flow rate controlling device does not exist within the flow path when fully opened, and a vehicle equipped therewith, can be achieved. The result is the ability to achieve a flow rate controlling device with high operational reliability and durability, and the ability to achieve the vehicle equipped therewith.

MODIFIED EXAMPLE

Figure 52:
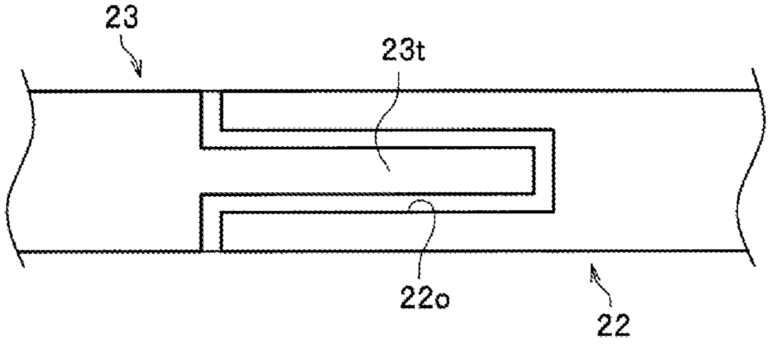
FIG. 52 is a cross-sectional view of the location wherein the first blade member and the second blade member are overlapped in a flow rate controlling device according to a first modified example in a fully closed state.

FIG. 52 is a cross-sectional view of the location wherein the first blade member and the second blade member are overlapped in a flow rate controlling device according to a modified example in a fully closed state.

The Modified Example presents another example of a structure wherein the first blade member 92 and the second blade member 93 overlap when the flow rate controlling device 1A of the present example is in a fully closed state (referencing FIG. 51).

A recessed portion **22*o* is formed at a tip end portion of the first blade member 22 in the modified example 1. On the other hand, a protruding portion 23*t* is formed in a tip end portion of the second blade member 23** in this modified example.

Moreover, when the flow rate controlling device 1A is in the fully closed state, then, as illustrated in FIG. 52, the protruding portion **23*t* of the tip end portion of the second blade member 23 is fitted into the recessed portion 22*o* of the tip end portion of the first blade member 22**.

This enables minimizing of the gap that is formed in the direction of the flow of the fluid between the first blade member 22 and the second blade member 23 when in the fully closed state.

Moreover, because the protruding portion **23*t* of the tip end portion of the second blade member 23 fits completely into the recessed portion 22*o* of the tip end portion of the first blade member 22**, the fluid leakage can be reduced further through the viscosity of the fluid.

OTHER MODIFIED EXAMPLE

Figure 53:
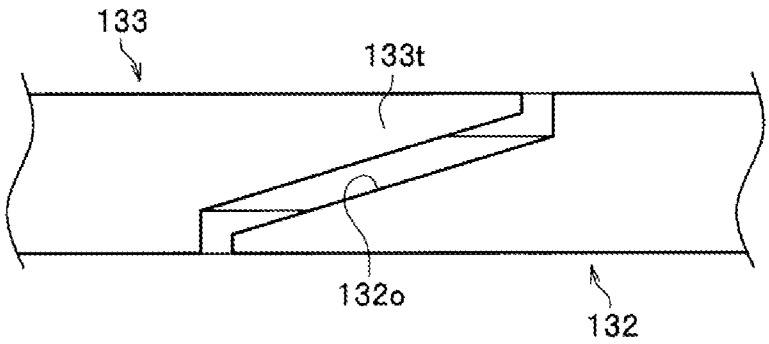
FIG. 53 is a cross-sectional view of the location wherein the first blade member and the second blade member are overlapped in a flow rate controlling device according to a second modified example in a fully closed state.

FIG. 53 is a cross-sectional view of the location wherein the first blade member and the second blade member are overlapped in a flow rate controlling device according to another modified example in a fully closed state.

This Modified Example presents another example of a structure wherein the first blade member 92 and the second blade member 93 overlap when the flow rate controlling device 1A of the yet another example is in a fully closed state (referencing FIG. 51).

A recessed portion **132*o* with a triangular cross-sectional shape is formed in the tip end portion of a first blade member 132 of the modified example. On the other hand, a protruding portion 133*t* with a triangular cross-sectional shape is formed on the tip end portion of the second blade member 133** in the modified example.

Moreover, when the flow rate controlling device 1A is in the fully closed state, then, as illustrated in FIG. 53, the protruding portion **133*t* of the tip end portion of the second blade member 133 is brought into contact with the recessed portion 132*o* of the tip end portion of the first blade member 132. This enables minimizing of the gap that is formed in the direction of the flow of the fluid between the first blade member 132 and the second blade member 133** when in the fully closed state.

FURTHER MODIFIED EXAMPLE

Figure 54:
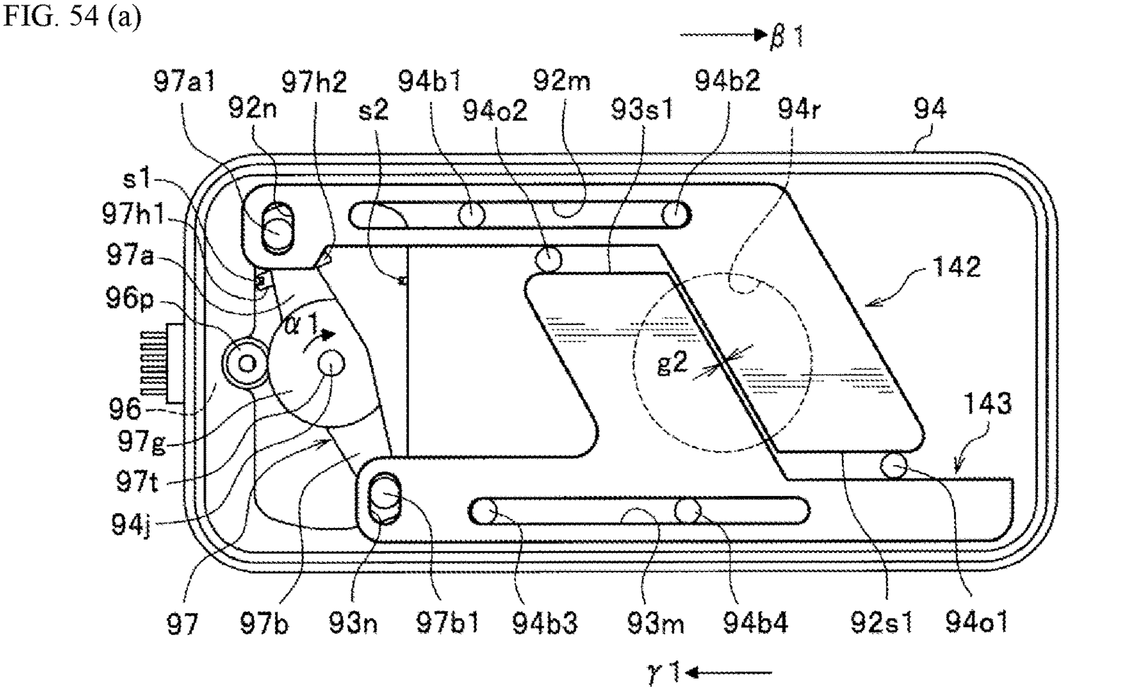
FIG. 54 (*a*) is a front view illustrating the internal structure when the flow rate controlling device according to a third modified example is closed.
Figure 54:
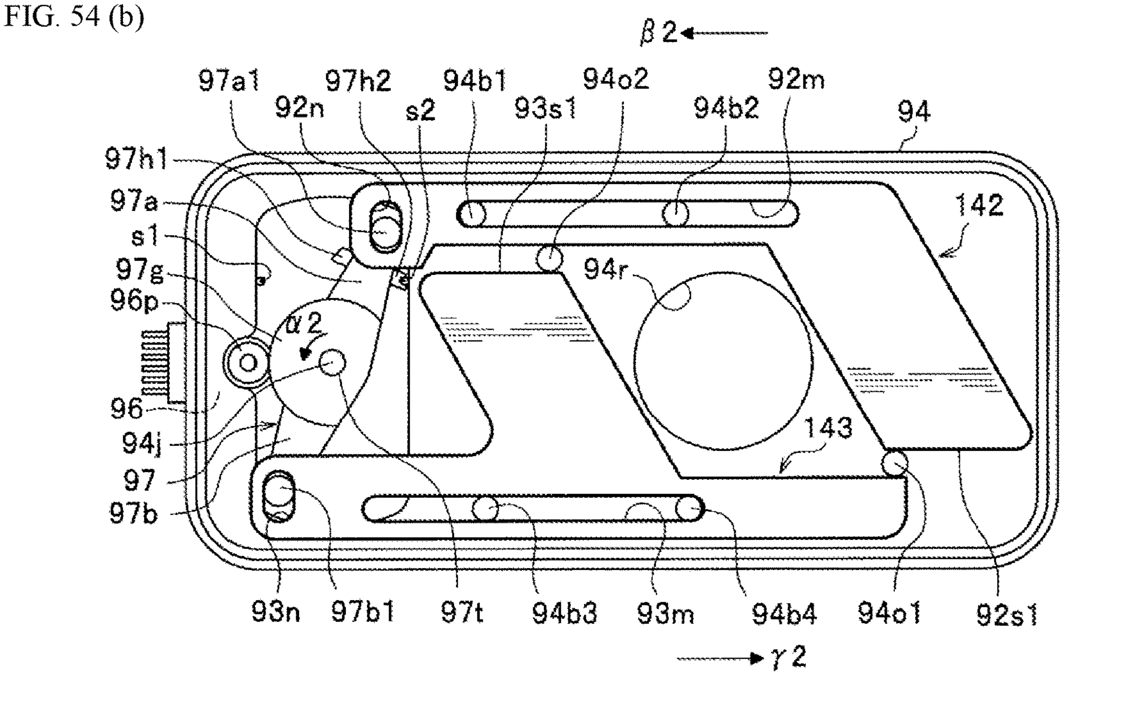

FIG. 54 (*a*) is a front view illustrating the internal structure when the flow rate controlling device according to a further modified example is closed; and FIG. 54 (*b*) is a front view illustrating the structure when the flow rate controlling device according to the further modified example is open.

In this modified example, the first thin plate portion **92*u*1 and the second thin plate portion 92*u*2 of the first blade member 92 and the first thin plate portion 93*u*1 and the second thin plate portion 93*u*2 of the second blade member 93** in the yet another example are absent. The other forms are similar to those in the previous examples, where similar structures are indicated through assigning identical reference codes, and detailed explanations thereof are omitted.

The first blade member 142 and the second blade member 143 in the further modified example each have flat plate shapes, without thin plate portions, unlike in the previous example.

Given this modified example, the first blade member 142 and the second blade member 143 and be disposed outside of the flow path r when the flow rate controlling device is fully opened. Because of this, there is no adverse effect on the fluid that flows through the flow path r, reducing the loss of the fluid flow.

Note that in the case in this Modified Example, as illustrated in FIG. 54 (*a*), when the flow rate controlling device is fully closed, a gap g2 is formed, having to do with control, between the first blade member 142 and the second blade member 143 when the flow rate controlling device is closed.

Figure 55:
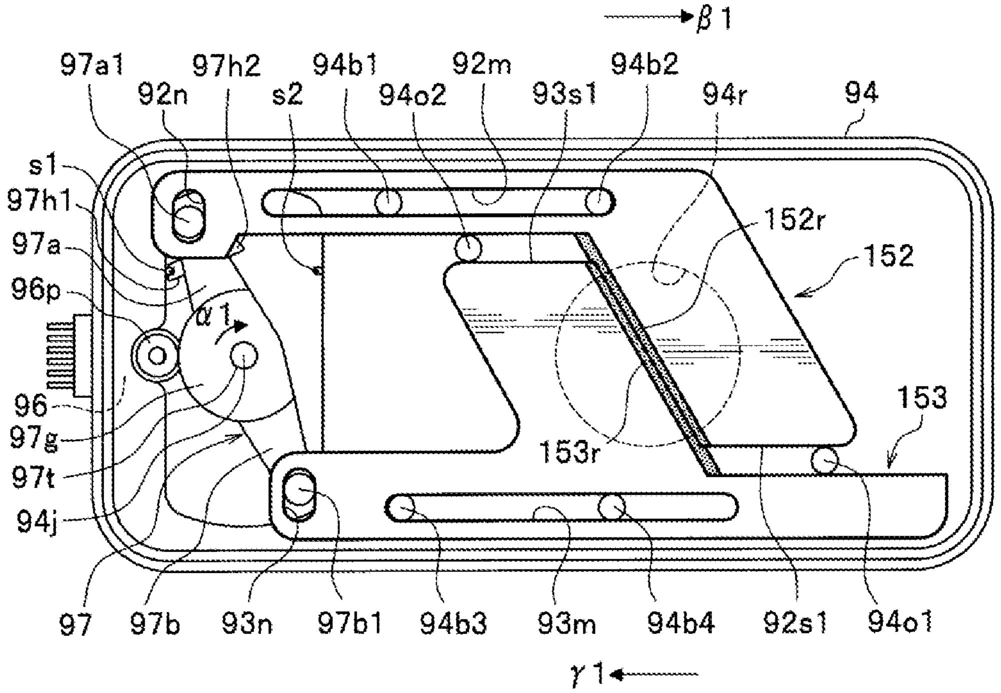
FIG. 55 (*a*) is a front view illustrating the internal structure when the flow rate controlling device according to another example of the third modified example is closed.
Figure 55:
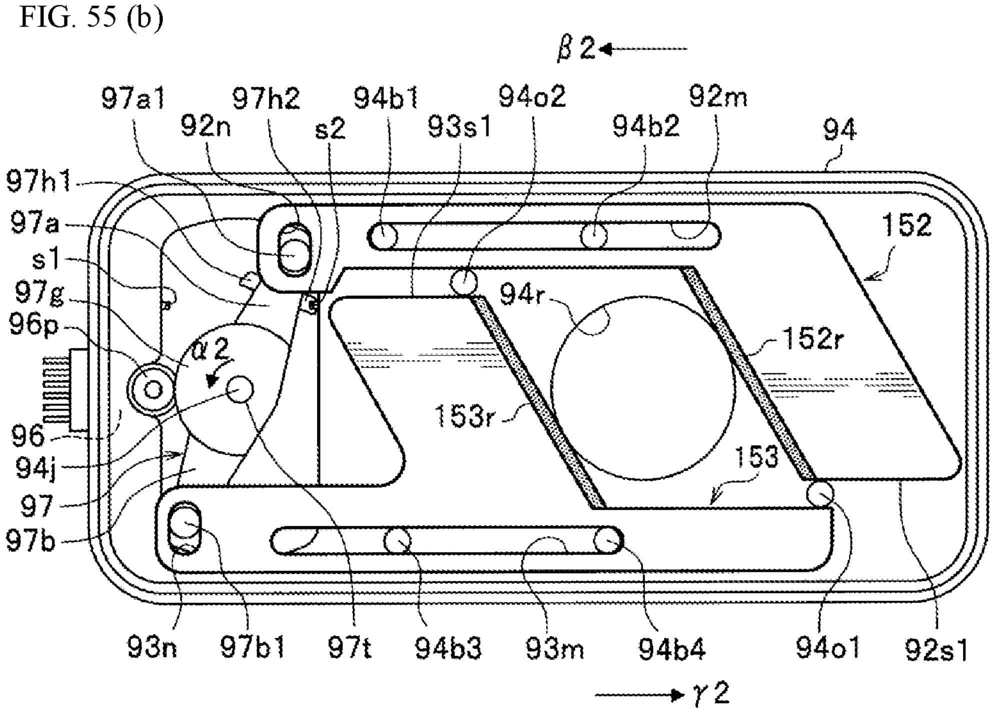
Figure 56:
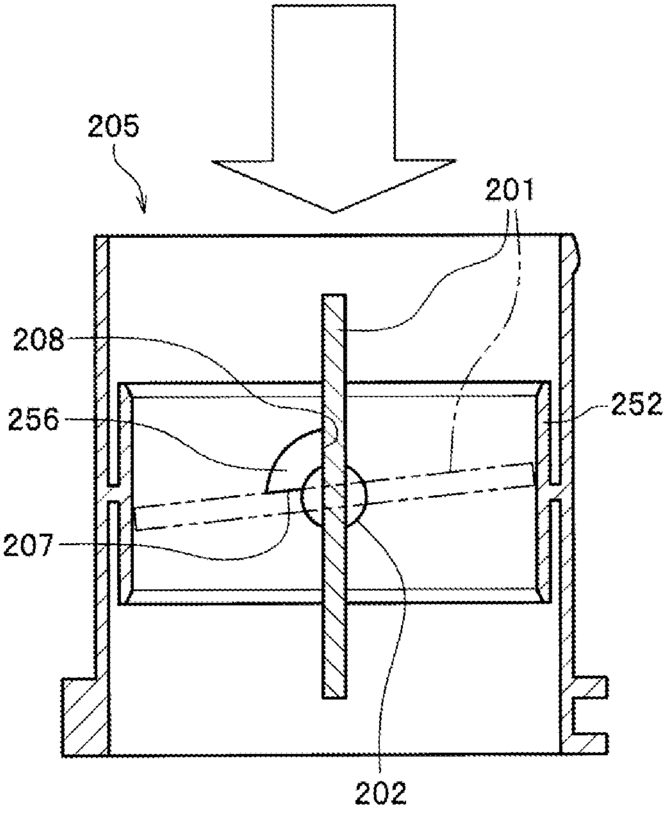
FIG. 56 is a lateral sectional view of the vicinity of a conventional throttle valve of a throttle device for an internal combustion engine as set forth in Japanese Unexamined Patent Application Publication No. 2004-293452.

FIG. 55 (*a*) is a front view illustrating the internal structure when the flow rate controlling device according to another example of the modified example is closed; and FIG. 55 (*b*) is a front view illustrating the structure when the flow rate controlling device according to the other example of when the modified example is open.

A flow rate controlling device of another example of Modified Example 3 has a rubber portion 152*r* attached to a tip end portion of the first blade member 152, which has a flat plate shape that has no thin plate portion, and a rubber portion 153*r* is attached to a tip end portion of a second blade member 153 of a flat plate shape that has no thin plate portion.

Given this other example of Modified Example 3, as illustrated in FIG. 55 (*a*), when the flow rate controlling device is fully closed, the rubber portion 152*r* of the tip end portion of the first blade member 152 and the rubber portion 153*r* of the tip end portion of the second blade member 153 can both deform to block the gap that is formed between the first blade member 152 and the second blade member 153.

Note that the material is arbitrary insofar as the rubber portions 152*r* and 153*r* are rubber, or the like, and can deform flexibly to block the gap between the first blade member 152 and the second blade member 153. Moreover, the rubber portion may be structured provided on either the first blade member 152 or the second blade member 153 alone.

OTHER EXAMPLES

1. The structure may instead be one wherein the direction of fluid flow is from the first base 94 to the second base 95.

In this case, a flat portion region may be formed so as to be sealed through the first and second blade members 92 and 93 contacting the second base 5 side.

2. While the structure is one wherein the first through seventh retaining bosses 95*o*1 through 95*o*7 are formed integrally with the second base member 95 to prevent the driving lever 97, the first blade member 92, and the second blade member 93 from coming off, the structure may instead be one wherein the first through seventh retaining bosses 95*o*1 through 95*o*7 are secured through being fitted into the second base member 95.

3. Conversely, the structure may instead be one wherein a retaining component is provided from above the support shaft boss 94*j* whereon the driving lever 97 is supported, and retaining components are attached from over the second through fourth retaining bosses 95*o*2 through 95*o*4 that are related to the first blade members 92, while, additionally, retaining components are attached from above the fifth through seventh retaining bosses 95*o*5 through 95*o*7 that are related to the second blade members 93, to prevent the driving lever 97, the first blade members 92, and the second blade members 93 from coming off.

Note that the structure wherein the first through seventh retaining bosses 95*o*1 through 95*o*7 are formed integrally with the second base member 95, explained in the yet another example, is preferred from the perspective of ease of assembly, manufacturability, cost, and the like, because this enables the simplest structure.

5. While various structures were explained in the above examples, the modified examples, and the like, the structure may be one wherein the structures that have been described are selected and combined arbitrarily.

The present invention, as described above, is not limited to all of the examples, and the like, described above, but also includes a variety of other examples. For example, while the examples set forth above were explained for ease in understanding the present invention, there is no limitation to necessarily being provided with all of the structures that were described. For example, it is acceptable to include only a portion of the structures that have been described. Moreover, a variety of alternate forms may be employed, insofar as the specific forms according to the present invention satisfy the structures set forth in the patent claims.

The flow rate controlling devices 1 and 1A according to the present invention can be applied to various types of valve devices for controlling flow rates of fluids, such as in a throttle device for an internal combustion engine. Moreover, the present invention can be embodied as a vehicle (for example, a vehicle for transporting passengers or cargo, such as a train, an automobile, or the like) wherein the flow rate controlling device 1 or 1A is provided as a throttle device for an internal combustion engine.

For example, the flow rate controlling device 1 according to the present invention can be used for various types of valves for air-conditioning equipment. That is, the flow rate controlling device 1 or 1A according to the present invention can be applied to various types of valves used with gases.

The invention claimed is:

1. A flow rate controlling device, provided in a pipe, controlling a flow rate of a fluid that flows through said pipe, comprising:

a base, comprising an opening through which the fluid can flow;

a ring member, provided encompassing the opening, when viewed from a direction of flow of the fluid, and able to rotate around the opening;

a motor rotating the ring member;

a plurality of blade members, supported on the base and extending to the outside of the opening, in the radial direction, and able to rotate around rotary shafts that are parallel to an axis of the opening;

grooves are formed in at least one of the ring member or the blade members;

protrusions able to slide within the grooves are formed in at least one of the other of the ring member and the blade members;

a position detection system configured to detect respective positions of the individual blade members, the position detection system including:

a position detector, provided on one of the blade members, having a light-blocking portion that blocks light and a light-passing portion that passes light; and a sensor detecting the light-blocking portion and the light-passing portion; and a position detection sensor detecting a position of the ring member, wherein the motor rotates the ring member to cause the protrusions to slide within the grooves to cause the plurality of blade members to rotate to open and close the opening, wherein the position detection system comprises a positioning hole formed on a base side of the position detection system and an inserting hole for a screw for securing the position detection system, and wherein the positioning hole and the inserting hole adjust a position that is detected in the fully closed state.

2. The flow rate controlling device as set forth in claim 1, wherein:

the plurality of blade members are positioned to the outside of the opening in the radial direction.

3. The flow rate controlling device as set forth in claim 2, wherein:

a rib that forms a cylindrical shape is provided protruding from the base on the upstream side of the fluid, from around the opening;

the ring member is provided encompassing the rib; and in the fully opened state, a portion of each of the plurality of blade members is positioned at a location overlapping the rib.

4. The flow rate controlling device as set forth in claim 1, wherein:

in the fully closed state, one of the blade members overlaps another of the blade members.

5. The flow rate controlling device as set forth in claim 1, wherein:

two thin-wall portions are formed in the blade member, where, in the fully closed state, thin-wall portions of two adjacent blade members overlap each other.

6. The flow rate controlling device as set forth in claim 5, wherein:

an elastic member that contacts the thin-wall portion of a tip end of the blade member when in the fully closed state is provided on the thin-wall portion of the blade member.

7. The flow rate controlling device as set forth in claim 1, wherein:

in the fully closed state, at least a portion between one blade member and another blade member is sealed by an elastic member.

8. The flow rate controlling device as set forth in claim 1, wherein:

a portion in the protrusions that contacts with the grooves exhibits a spherical shape.

9. The flow rate controlling device as set forth in claim 1, wherein:

a portion in the protrusions that contacts with the grooves exhibits a shape that has a curvature.

10. The flow rate controlling device as set forth in claim 1, wherein:

the position detection system detects a fully opened state, a fully closed state, and an intermediate state between the fully opened state in the fully closed state, of the blade member; and the position detection sensor detects a position of the ring member when the blade members are in a fully opened state, and a position of the ring member when the blade members are in a fully closed state.

11. The flow rate controlling device as set forth in claim 1, comprising:

an elastic member, provided on the blade member, deforming elastically when the blade members are fully closed, blocking a space between the blade members, wherein:

the elastic member has a shape for engaging with the blade member.

12. The flow rate controlling device as set forth in claim 11, further comprising at least one retaining member covering a length-direction end portion of the elastic member.

13. The flow rate controlling device as set forth in claim 1, wherein:

the plurality of blade members are provided overlapping in a plurality of layers.

14. The flow rate controlling device as set forth in claim 13, comprising:

deformable seals sealing a gap between the blade members, through elastic deformation through the full closure when the plurality of blade members are fully closed.

15. The flow rate controlling device as set forth in claim 13, comprising:

movable seals sealing between overlapping blade members sealing a space between overlapping adjacent blade members when the plurality of blade members are fully closed and moving further to the outside than the position when fully closed when the plurality of blade members are not fully closed.

16. The flow rate controlling device as set forth in claim 13, wherein the sensor of the position detection system is configured to detect a rotation operation of the blade member.

17. A vehicle comprising a flow rate controlling device as set forth in claim 1.

* * * * *